United States Patent
Ikeda

(10) Patent No.: US 10,423,328 B2
(45) Date of Patent: Sep. 24, 2019

(54) PORTABLE TERMINAL FOR CONTROLLING TWO CURSORS WITHIN A VIRTUAL KEYBOARD ACCORDING TO SETTING OF MOVEMENT BY A SINGLE KEY AT A TIME OR A PLURALITY OF KEYS AT A TIME

(76) Inventor: Hiroyuki Ikeda, Tokyo (JP)

( * ) Notice: Subject to any disclaimer, the term of this patent is extended or adjusted under 35 U.S.C. 154(b) by 420 days.

(21) Appl. No.: 14/369,607

(22) PCT Filed: Sep. 6, 2012

(86) PCT No.: PCT/JP2012/072746
§ 371 (c)(1),
(2), (4) Date: Oct. 2, 2014

(87) PCT Pub. No.: WO2013/099362
PCT Pub. Date: Jul. 4, 2013

(65) Prior Publication Data
US 2015/0026627 A1 Jan. 22, 2015

(30) Foreign Application Priority Data

Dec. 28, 2011 (JP) .................................. 2011-289600
May 8, 2012 (JP) .................................. 2012-106865

(51) Int. Cl.
*G06F 3/0488* (2013.01)
*G06F 1/16* (2006.01)
(Continued)

(52) U.S. Cl.
CPC ........ *G06F 3/04886* (2013.01); *G06F 1/1671* (2013.01); *G06F 3/0236* (2013.01);
(Continued)

(58) Field of Classification Search
CPC ............... G06F 3/04886; G06F 3/0236; G06F 3/04812; G06F 3/04842; G06F 3/04892; G06F 1/1671
See application file for complete search history.

(56) References Cited

U.S. PATENT DOCUMENTS 4,984,152 A * 1/1991 Muller .................. G06F 3/0481
345/157
5,850,212 A * 12/1998 Nishibori ............ G06F 3/04892
345/160
(Continued)

FOREIGN PATENT DOCUMENTS

JP      11-194870 A    7/1999
JP      2003-58305 A    2/2003
(Continued)

OTHER PUBLICATIONS

International Search Report (PCT/ISA/210) dated Nov. 20, 2012, with English translation (Five (5) pages).
(Continued)

*Primary Examiner* — Abdullah Al Kawsar
*Assistant Examiner* — Jeremy L Stanley
(74) *Attorney, Agent, or Firm* — Crowell & Moring LLP

(57) ABSTRACT

A portable terminal that can be held stably and can perform entry operation quickly at the time of character entry is provided. On a character entry screen including a keyboard screen, a first cursor and a second cursor are displayed. A first indicating button 20 for indicating the direction of movement of the first cursor and giving an instruction to select a key currently indicated by the first cursor on the keyboard screen and a second indicating button 30 for indicating the direction of movement of the second cursor and giving an instruction to select a key currently indicated by the second cursor on the keyboard screen are provided at the lower edge on the front side of the portable terminal. A (Continued)

control means of the portable terminal controls the entry of a character based on a signal from the first indicating button 20 and a signal from the second indicating button 30.

21 Claims, 56 Drawing Sheets

(51) Int. Cl.
| | |
|---|---|
| *G06F 3/023* | (2006.01) |
| *G06F 3/0489* | (2013.01) |
| *G06F 3/0481* | (2013.01) |
| *G06F 3/0484* | (2013.01) |

(52) U.S. Cl.
CPC ...... *G06F 3/04812* (2013.01); *G06F 3/04842* (2013.01); *G06F 3/04892* (2013.01)

(56) References Cited

U.S. PATENT DOCUMENTS

| | | | | |
|---|---|---|---|---|
| 8,065,624 B2 * | 11/2011 | Morin | .................... | G06F 3/0237 715/773 |
| 8,116,824 B2 * | 2/2012 | Choi | .................... | G06F 1/1616 345/173 |
| 8,698,764 B1 * | 4/2014 | Karakotsios | .......... | G06F 1/1692 345/173 |
| 8,854,323 B2 * | 10/2014 | Harada | ............... | G06F 3/04883 345/156 |
| 2001/0040551 A1 | 11/2001 | Yates et al. | | |
| 2004/0257341 A1 * | 12/2004 | Bear | .................... | G06F 1/1632 345/157 |
| 2005/0162402 A1 * | 7/2005 | Watanachote | ...... | G06F 3/03547 345/173 |
| 2006/0238517 A1 * | 10/2006 | King | .................... | G06F 1/1626 345/173 |
| 2006/0257839 A1 * | 11/2006 | Miyaji | .................... | G06Q 30/02 434/323 |
| 2007/0046647 A1 * | 3/2007 | Ohta | .................... | G06F 3/0488 345/173 |
| 2007/0152979 A1 * | 7/2007 | Jobs | .................... | G06F 3/0236 345/173 |
| 2008/0122796 A1 * | 5/2008 | Jobs | .................... | G06F 3/0488 345/173 |
| 2008/0288878 A1 * | 11/2008 | Hayashi | .......... | H04M 1/274525 715/762 |
| 2009/0100129 A1 * | 4/2009 | Vigil | .................... | G06F 3/0227 709/203 |
| 2009/0179854 A1 * | 7/2009 | Weber | .................... | G06F 1/1626 345/156 |
| 2009/0213081 A1 * | 8/2009 | Case, Jr. | ............... | G06F 1/1616 345/173 |
| 2009/0219246 A1 * | 9/2009 | Suzuki | .................. | G06F 3/0338 345/156 |
| 2010/0005387 A1 * | 1/2010 | Toki | .................... | G06F 3/0481 715/246 |
| 2010/0038151 A1 * | 2/2010 | Chen | .................... | G06F 3/0416 178/18.03 |
| 2010/0064238 A1 * | 3/2010 | Ludwig | ................. | G06F 3/0346 715/770 |
| 2010/0103127 A1 * | 4/2010 | Park | .................... | G06F 3/04886 345/173 |
| 2010/0185971 A1 * | 7/2010 | Ito | .......................... | G06F 3/0489 715/773 |
| 2010/0225599 A1 * | 9/2010 | Danielsson | ........... | G06F 3/0237 345/173 |
| 2010/0281431 A1 * | 11/2010 | Kano | .................... | G06F 3/0489 715/835 |
| 2010/0287480 A1 * | 11/2010 | Hicks, III | ........... | H04L 12/2809 715/751 |
| 2010/0293460 A1 * | 11/2010 | Budelli | ............... | G06F 3/04883 715/702 |
| 2010/0295780 A1 * | 11/2010 | Vaisanen | ............... | G06F 3/0488 345/157 |
| 2010/0325572 A1 * | 12/2010 | Morris | ................ | G06F 3/03541 715/773 |
| 2011/0191709 A1 * | 8/2011 | Lu | .......................... | G06F 3/0481 715/773 |
| 2012/0078614 A1 * | 3/2012 | Galor | ...................... | G06F 3/011 704/9 |
| 2012/0098743 A1 * | 4/2012 | Lai | ......................... | G06F 3/0236 345/157 |
| 2012/0268388 A1 * | 10/2012 | Razzaghi | .............. | G06F 3/0236 345/173 |
| 2012/0326980 A1 * | 12/2012 | Sonsino | .............. | G06F 3/04892 345/158 |
| 2013/0024820 A1 * | 1/2013 | Kirkpatrick | ......... | G06F 3/04883 715/863 |
| 2013/0050098 A1 * | 2/2013 | Ide | ...................... | G06F 3/04886 345/173 |
| 2013/0113717 A1 * | 5/2013 | Van Eerd | ............ | G06F 3/04883 345/173 |
| 2013/0174079 A1 * | 7/2013 | Morley | ............... | G06F 3/04886 715/773 |
| 2013/0249832 A1 * | 9/2013 | Nakamura | ............ | G06F 17/276 345/173 |
| 2013/0307781 A1 * | 11/2013 | Ghassabian | ........... | G06F 3/0487 345/168 |
| 2014/0109016 A1 * | 4/2014 | Ouyang | .................... | G06F 17/24 715/856 |
| 2015/0231491 A1 * | 8/2015 | Hwang | ............... | A63F 13/2145 345/161 |
| 2016/0291923 A1 * | 10/2016 | Sirpal | .................... | G06F 3/1438 |

FOREIGN PATENT DOCUMENTS

| | | |
|---|---|---|
| JP | 2006-209418 A | 8/2006 |
| JP | 2007-148589 A | 6/2007 |
| JP | 2010-86064 A | 4/2010 |
| JP | 2011-146891 A | 7/2011 |
| WO | WO 2007/060773 A1 | 5/2007 |
| WO | WO 2008/152679 A1 | 12/2008 |
| WO | WO 2009/087992 A1 | 7/2009 |

OTHER PUBLICATIONS

European Office Action issued in counterpart European Application No. 12 862 871.6 dated Jan. 18, 2019 (six (6) pages).
European Search Report dated Aug. 5, 2015, Seven (7) pages.

\* cited by examiner

FIG. 11
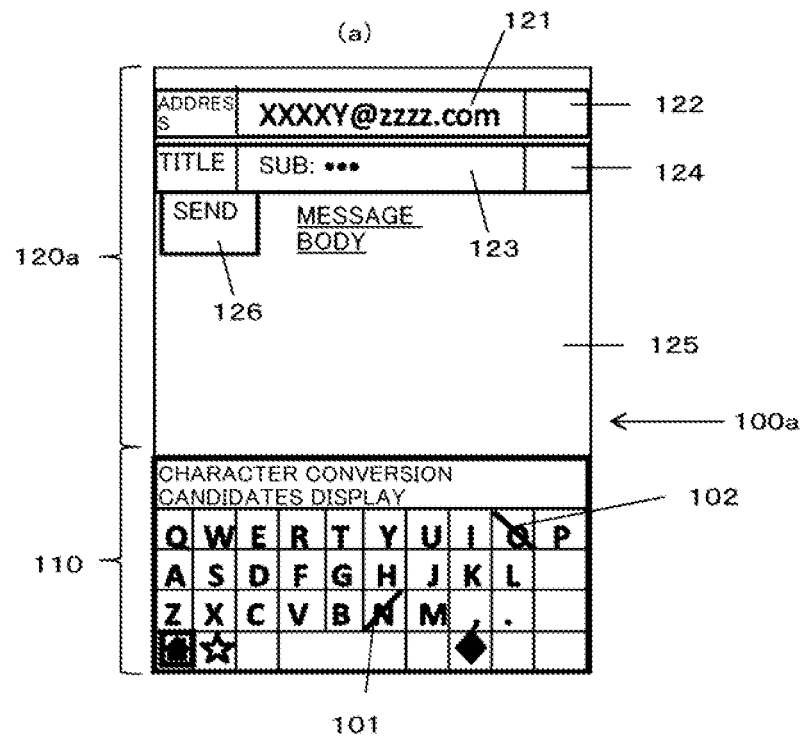
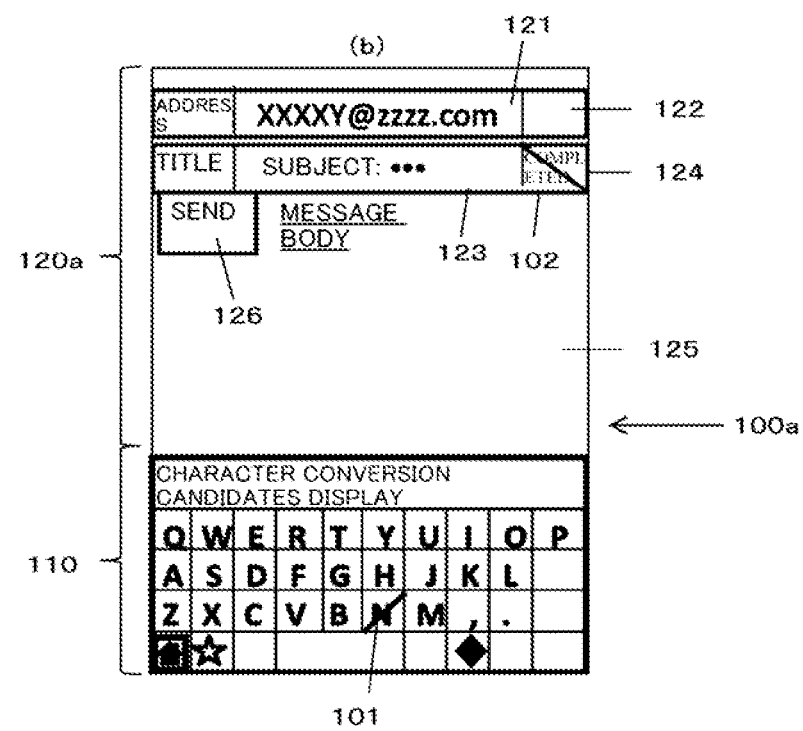

FIG. 12
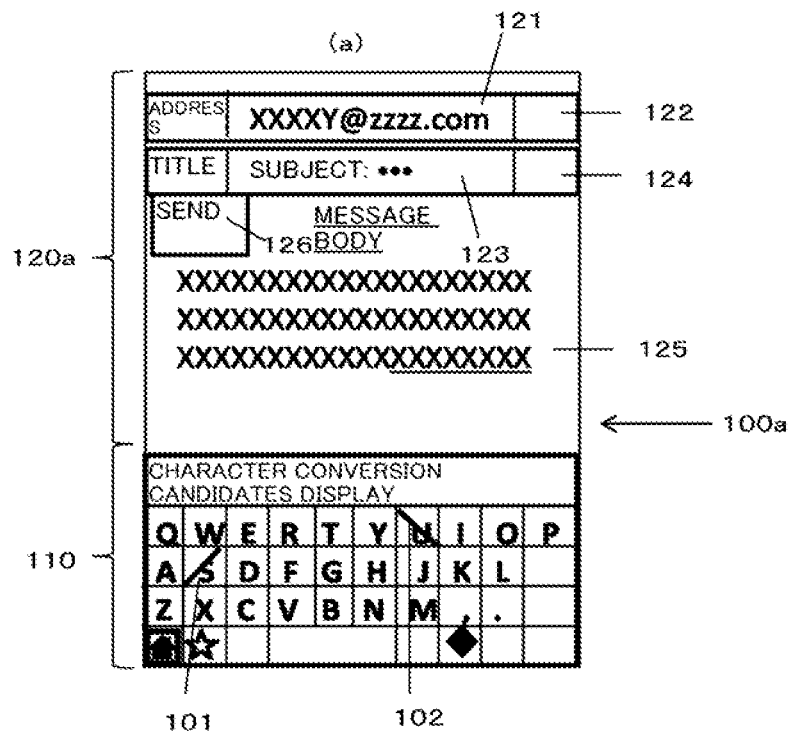
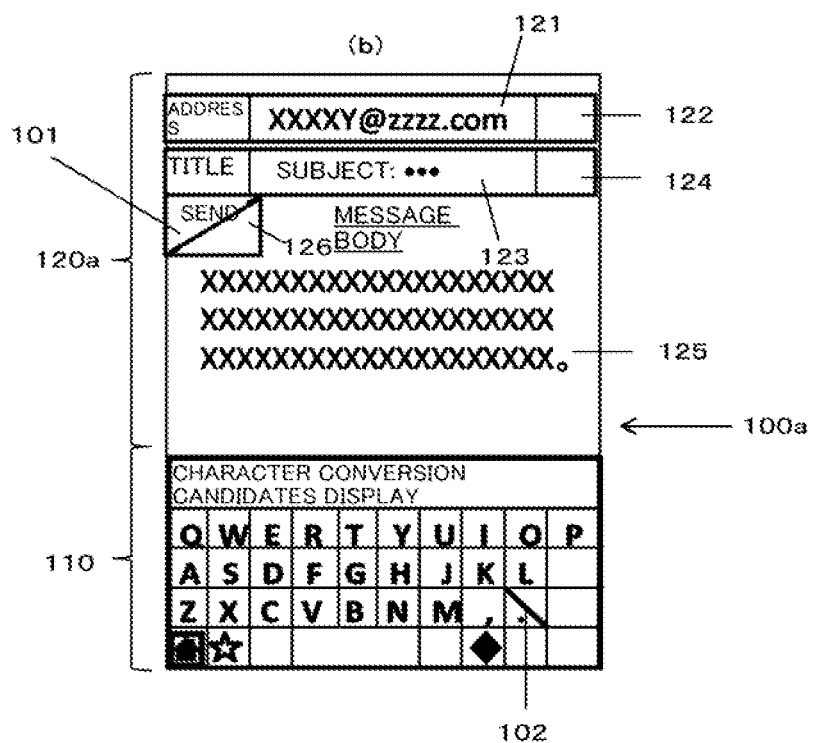

FIG. 15

(a) CHARACTER CONVERSION CANDIDATES DISPLAY

| Q | W | E | R | T | Y | U | I | O | P | @ |
| A | S | D | F | G | H | J | K | L | ; | : |
| Z | X | C | V | B | N | M | , | . | / |   |
| 🏠 | ☆ |   |   |   |   | ◆ |   |   |   |   |

(b) CHARACTER CONVERSION CANDIDATES DISPLAY

| Q | W | E | R | T | Y | U | I | O | P | @ |
| A | S | D | F | G | H | J | K | L | ; | : |
| Z | X | C | V | B | N | M | , | . | / |   |
| 🏠 | ☆ |   |   |   |   | ◆ |   |   |   |   |

(c) CHARACTER CONVERSION CANDIDATES DISPLAY

| Q | W | E | R | T | Y | U | I | O | P | @ |
| A | S | D | F | G | H | J | K | L | ; | : |
| Z | X | C | V | B | N | M | , | . | / |   |
| 🏠 | ☆ |   |   |   |   | ◆ |   |   |   |   |

(d) CHARACTER CONVERSION CANDIDATES DISPLAY

| Q | W | E | R | T | Y | U | I | O | P |
| A | S | D | F | G | H | J | K | L |   |
| Z | X | C | V | B | N | M | , | . |   |
| 🏠 | ☆ |   |   |   |   | ◆ |   |   |   |

(e) CHARACTER CONVERSION CANDIDATES DISPLAY

| Q | W | E | R | T | Y | U | I | O | P |
| A | S | D | F | G | H | J | K | L |   |
|   | Z | X | C | V | B | N | M |   |   |
| 🏠 | ☆ |   |   |   |   | ◆ |   |   |   |

| Q | W | E | R | T | Y | U | I | O | P | @ | 1 | 2 | 3 | × |
| A | S | D | F | G | H | J | K | L | ; | : |   | 4 | 5 | 6 | ÷ |
| Z | X | C | V | B | N | M | , | . | / |   |   | 7 | 8 | 9 | − |
| 🏠 | ☆ |   |   |   |   |   | ◆ |   |   |   | . | 0 | = | + |

(b)

| Q | W | E | R | T | Y | U | I | O | P | @ |   | 1 | 2 | 3 | × |
| A | S | D | F | G | H | J | K | L | ; | : |   | 4 | 5 | 6 | ÷ |
| Z | X | C | V | B | N | M | , | . | / |   |   | 7 | 8 | 9 | − |
| 🏠 | ☆ |   |   |   |   |   | ◆ |   |   |   | . | 0 | = | + |

(c)

| Q | W | E | R | T | Y | U | I | O | P | @ | 1 | 2 | 3 | × |
| A | S | D | F | G | H | J | K | L | ; | : | 4 | 5 | 6 | ÷ |
| Z | X | C | V | B | N | M | , | . | / |   | 7 | 8 | 9 | − |
| 🏠 | ☆ |   |   |   |   | ◆ |   |   | . | 0 | = | + |

| CHARACTER CONVERSION CANDIDATES DISPLAY | | | | | | | | | | |
|---|---|---|---|---|---|---|---|---|---|---|
| 1 | 2 | 3 | 4 | 5 | 6 | 7 | 8 | 9 | 0 | |
| あ | か | さ | た | な | は | ま | や | ら | わ | |
| い | き | し | ち | に | ひ | み | | り | を | |
| う | く | す | つ | ぬ | ふ | む | | ゆ | る | ん |
| ☆ | え | け | せ | て | ね | へ | め | | れ | |
| 🏠 | お | こ | そ | と | の | ほ | も | | よ | ろ |

(b)

| CHARACTER CONVERSION CANDIDATES DISPLAY | | | | | | | | | | | | | | |
|---|---|---|---|---|---|---|---|---|---|---|---|---|---|---|
| あ | か | さ | た | な | は | ま | や | ら | わ | | MR | CM- | M+ | C·CE |
| い | き | し | ち | に | ひ | み | | り | を | | 1 | 2 | 3 | × |
| う | く | す | つ | ぬ | ふ | む | | ゆ | る | ん | 4 | 5 | 6 | ÷ |
| ☆ | え | け | せ | て | ね | へ | め | | れ | | 7 | 8 | 9 | − |
| 🏠 | お | こ | そ | と | の | ほ | も | | よ | ろ | . | 0 | = | + |

FIG. 32
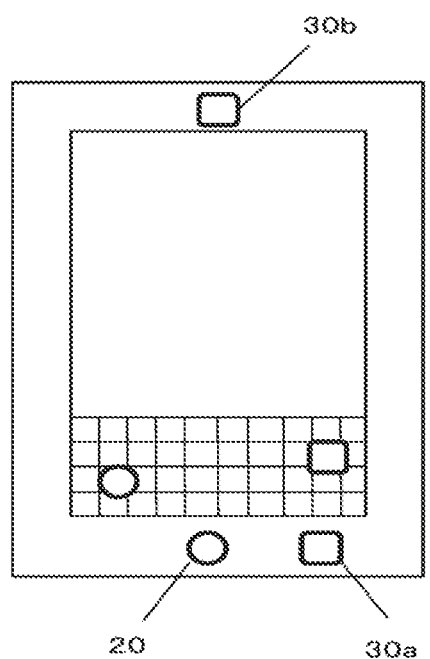
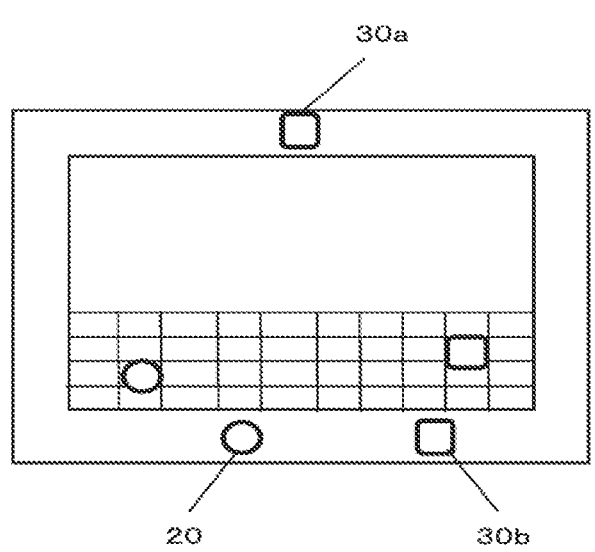

FIG. 34
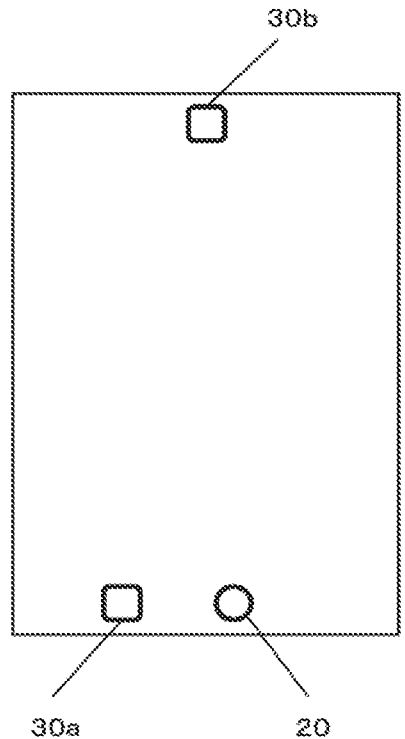
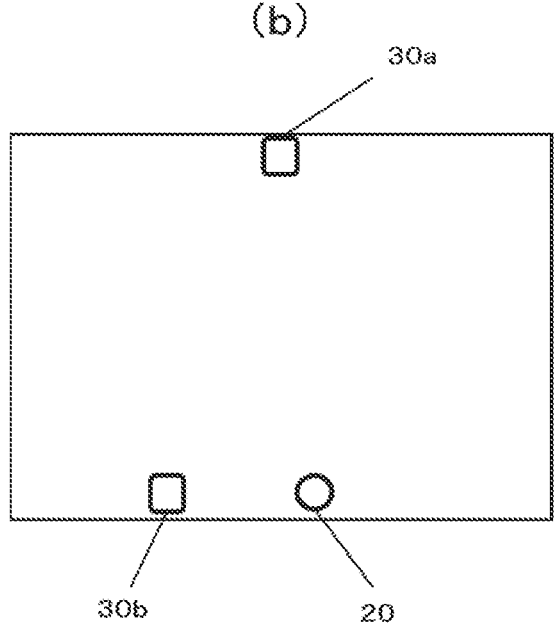

FIG. 36
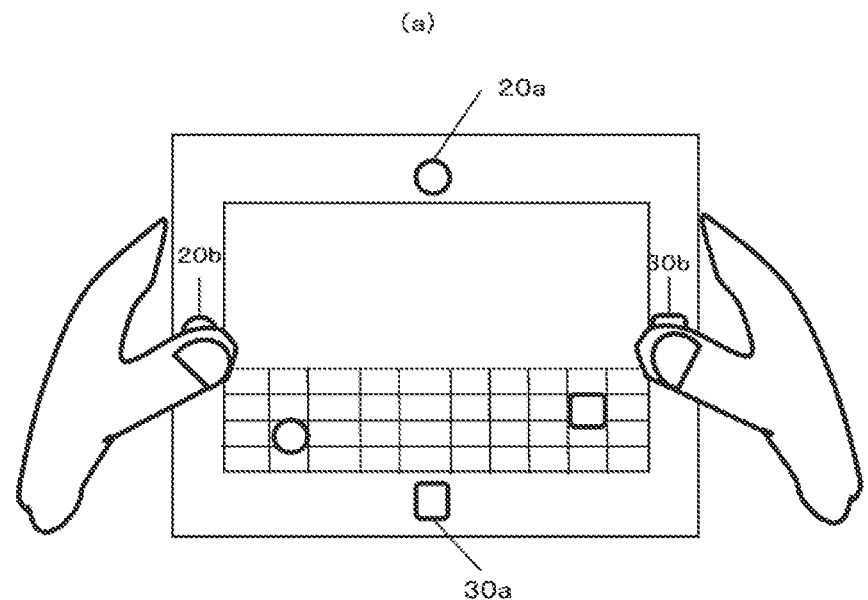
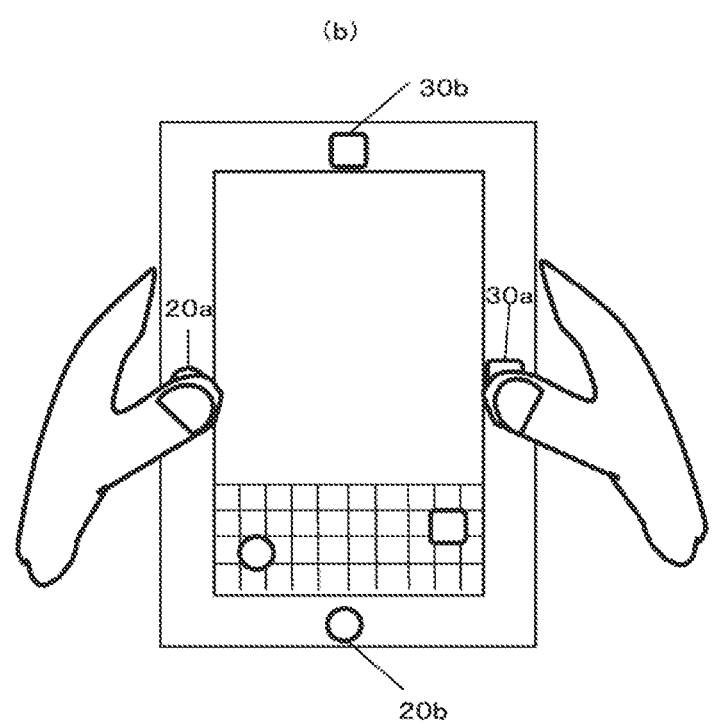

FIG. 39
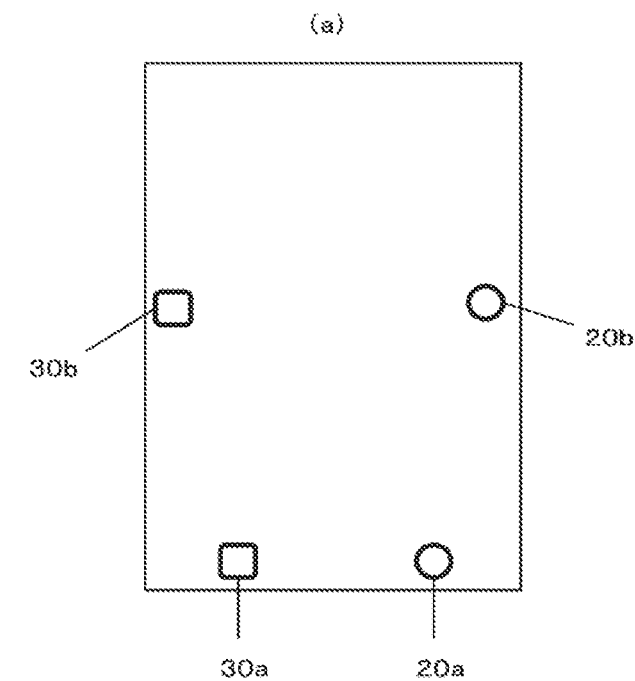
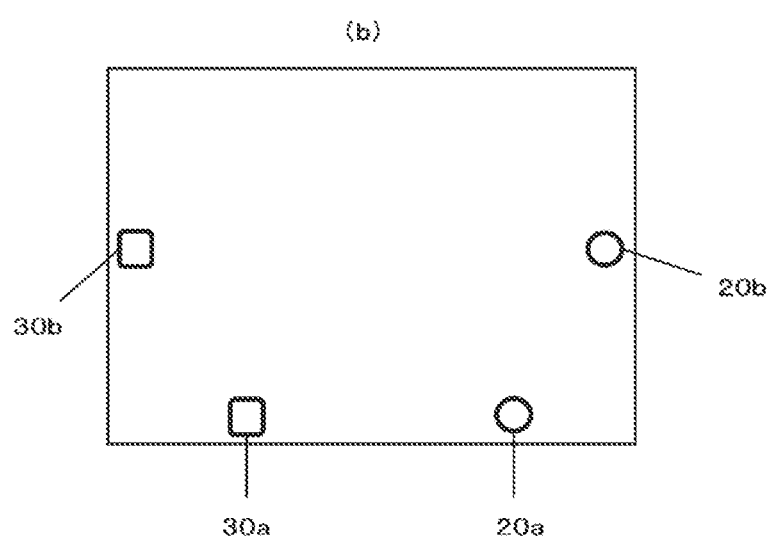

FIG. 40
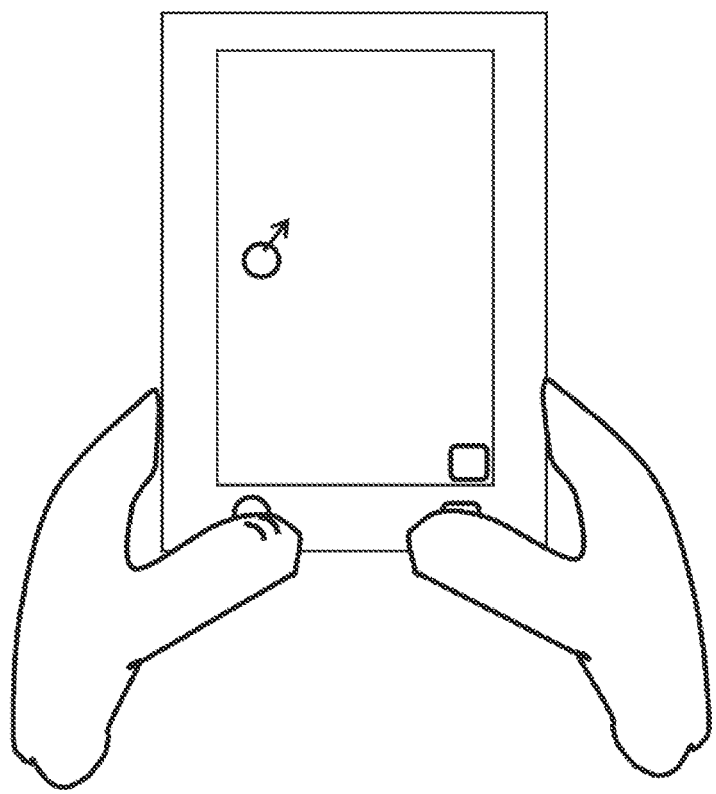
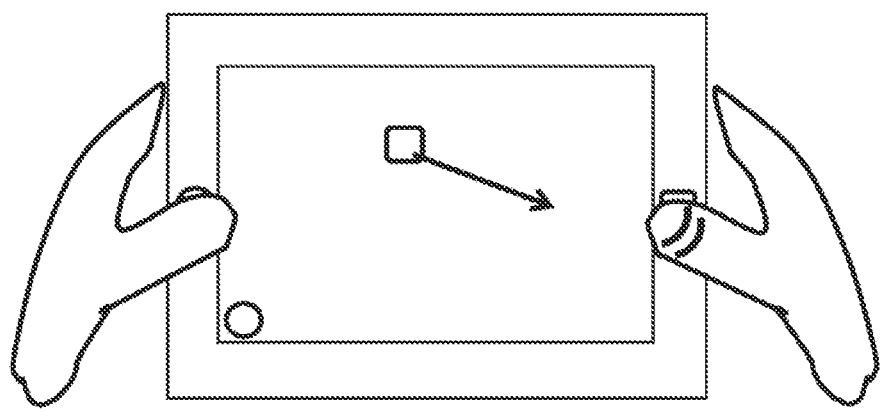

FIG. 41
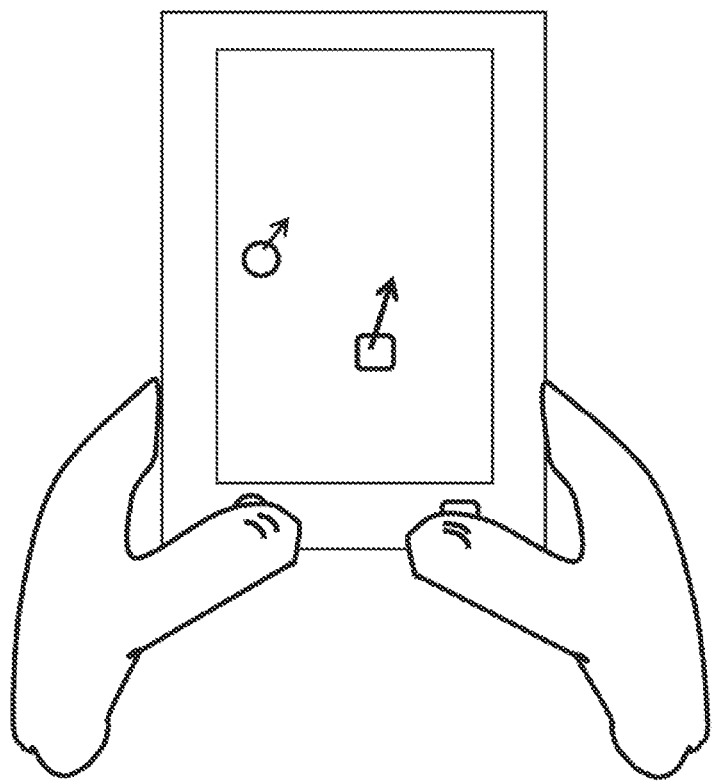
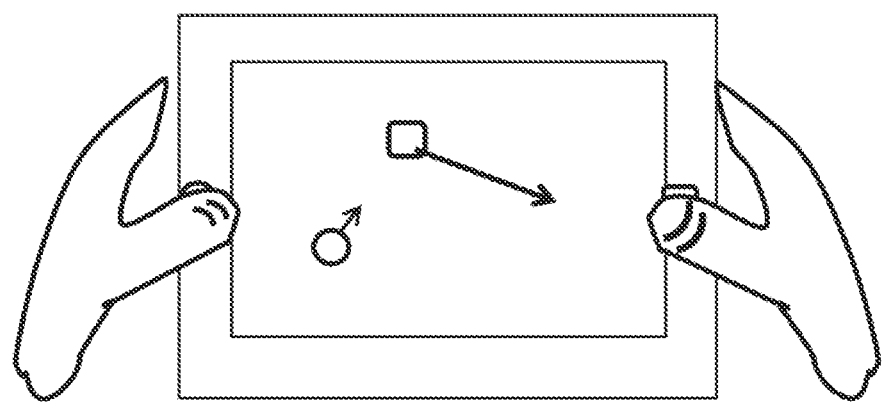

FIG. 42
(a) 20(30)
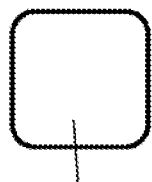
ELECTROSTATIC PAD
(b) 20(30)
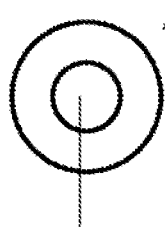
TRACKBALL
(c) 20(30)
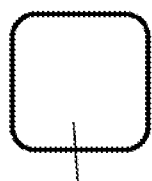
PRESSING-TYPE

| CALL | | END |
|---|---|---|
| 1 | 2 | 3 |
| 4 | 5 | 6 |
| 7 | 8 | 9 |
| | 0 | |

(b)

| 1 | 2 | 3 |
|---|---|---|
| 4 | 5 | 6 |
| 7 | 8 | 9 |
| | 0 | |
| CALL | | END |

|   | 1 | 2 | 3 | 4 | 5 | 6 | 7 | 8 | 9 | 0 |   |
|---|---|---|---|---|---|---|---|---|---|---|---|
|   | Q | W | E | R | T | Y | U | I | O | P | @ |
|   | A | S | D | F | G | H | J | K | L | Ñ | : |
|   | Z | X | C | V | B | N | M | , | . | / | ; |
| 🏠 | ☆ |   |   |   |   |   | ? |   |   |   |   |

113

(b)

| Q | W | E | R | T | Y | U | I | O | P | @ |
|---|---|---|---|---|---|---|---|---|---|---|
| A | S | D | F | G | H | J | K | L | Ñ | : |
| Z | X | C | V | B | N | M | , | . | / | ; |
| 🏠 | ☆ |   |   |   |   | ? |   |   |   |   |

(c)

| Q | W | E | R | T | Y | U | I | O | P | @ |
|---|---|---|---|---|---|---|---|---|---|---|
| A | S | D | F | G | H | J | K | L | Ñ | : |
| Z | X | C | V | B | N | M | , | . | / | ; |
| 🏠 | ☆ |   |   |   |   | ? |   |   |   |   |

(d)

| Q | W | E | R | T | Y | U | I | O | P | @ |   | 1 | 2 | 3 | × |
|---|---|---|---|---|---|---|---|---|---|---|---|---|---|---|---|
| A | S | D | F | G | H | J | K | L | Ñ | : |   | 4 | 5 | 6 | ÷ |
| Z | X | C | V | B | N | M | , | . | / | ; |   | 7 | 8 | 9 | − |
| 🏠 | ☆ |   |   |   |   | ? |   |   |   |   |   | . | 0 | = | + |

(e)

| F1 | F2 | F3 | F4 | F5 | F6 | F7 | F8 | F9 | F10 |   | MR | CM- | M+ | C | CE |
|----|----|----|----|----|----|----|----|----|-----|---|----|-----|----|---|----|
| Q | W | E | R | T | Y | U | I | O | P | @ | 1 | 2 | 3 | × |
| A | S | D | F | G | H | J | K | L | Ñ | : | 4 | 5 | 6 | ÷ |
| Z | X | C | V | B | N | M | , | . | / | ; | 7 | 8 | 9 | − |
| 🏠 | ☆ |   |   |   |   | ? |   |   |   | . | 0 | = | + |

FIG. 51
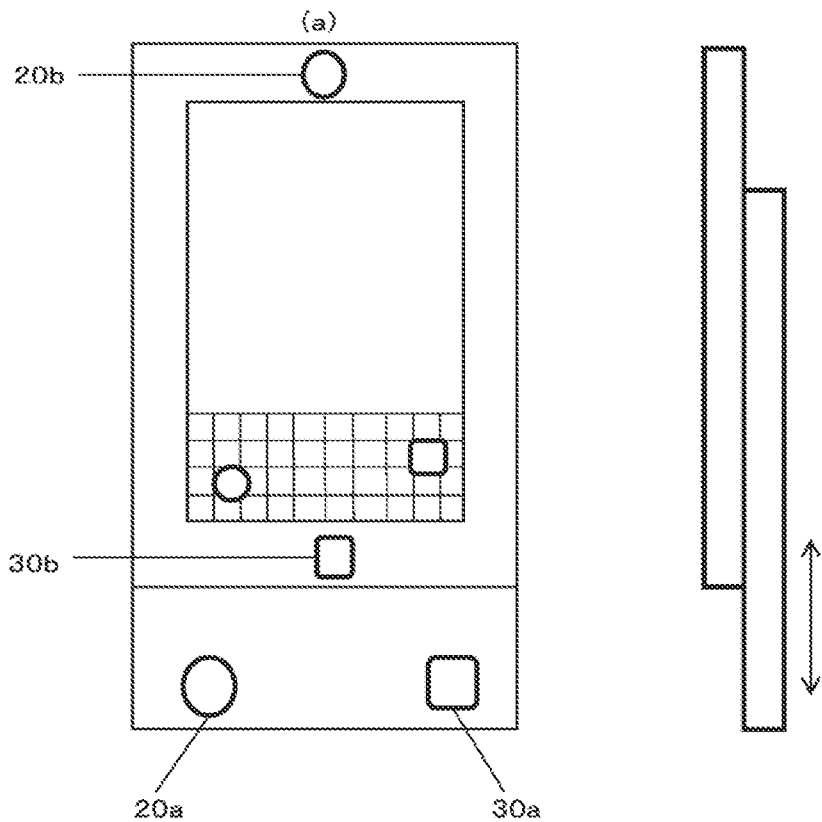
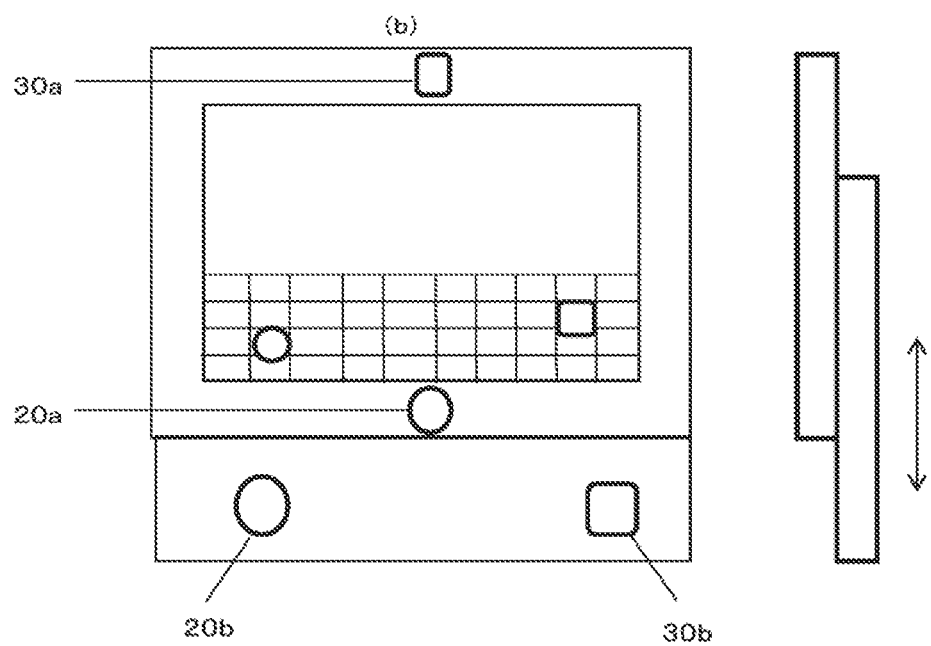

FIG. 53
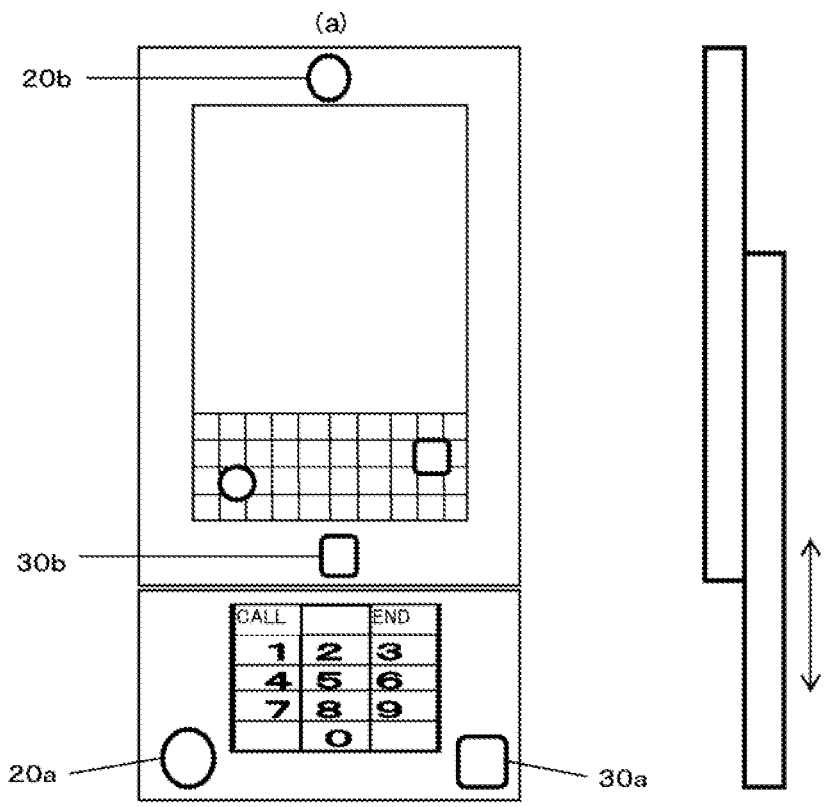
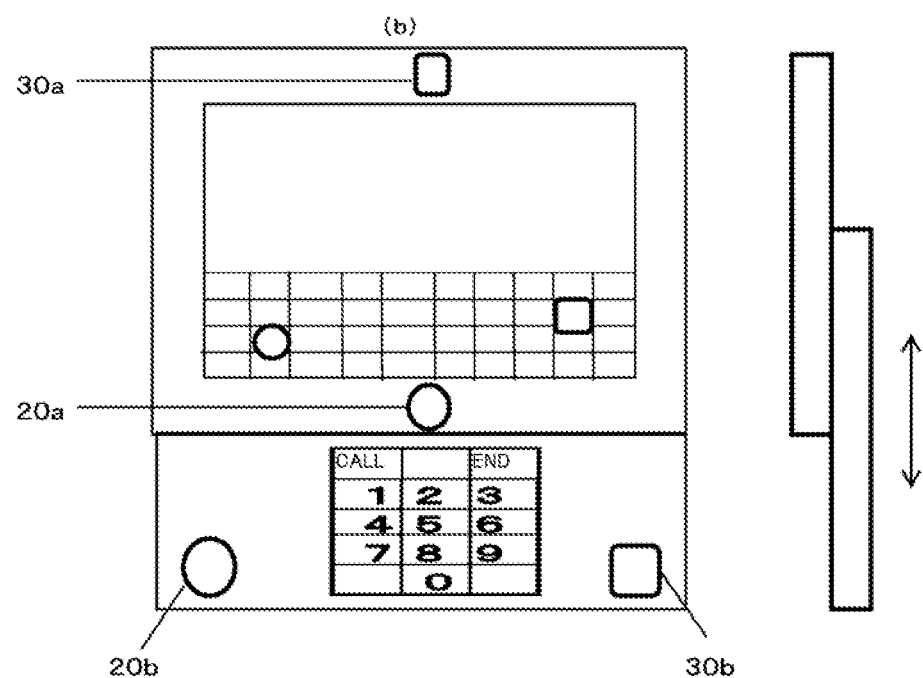

FIG. 56
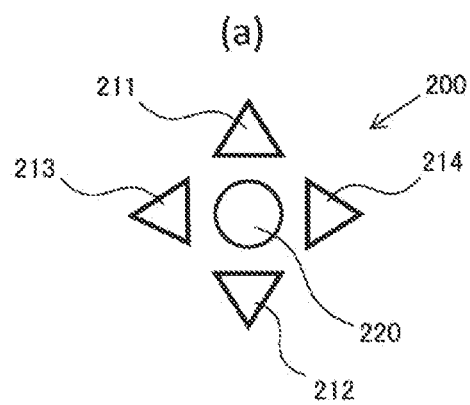
(a)
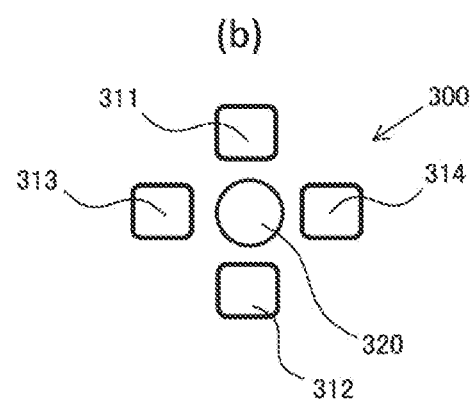
(b)

PORTABLE TERMINAL FOR CONTROLLING TWO CURSORS WITHIN A VIRTUAL KEYBOARD ACCORDING TO SETTING OF MOVEMENT BY A SINGLE KEY AT A TIME OR A PLURALITY OF KEYS AT A TIME

TECHNICAL FIELD

The present invention relates to portable terminals having a character entry function, such as a mobile telephone, a smartphone, a personal digital assistant (PDA), and a tablet terminal.

BACKGROUND ART

As for a mobile telephone, the user holds the mobile telephone with one hand and enters characters by operating character entry buttons with the other hand (refer to, for example, PTL 1). Moreover, as for a smartphone having a touch panel function, the user holds the smartphone with one hand and enters characters by touching keys on a touch on panel with the other hand.

CITATION LIST

Patent Literature

PTL 1: JP-A-2003-58305

SUMMARY OF INVENTION

Technical Problem

As described above, when character entry is performed on the mobile telephone, the smartphone, and so forth, since the mobile telephone or the like is held with one hand and character entry is performed with the other hand, it is impossible to hold the mobile telephone or the like stably and perform entry operation quickly. In particular, when character entry using the touch panel function is performed, a finger inadvertently touches adjacent keys, which often causes an error in entry.

The present invention has been made in view of the above-described circumstances, and an object thereof is to provide a portable terminal that can be held stably and allows entry operation to be performed accurately and quickly at the time of character entry.

Solution to Problem

The present invention to attain the above-described object is directed to a portable terminal having a character entry function of displaying a character entry screen with a keyboard screen including a plurality of character key images on a display of a display means and performing the entry of a character by using the character key images of the keyboard screen, the portable terminal including: a first indicating means provided in a predetermined place of the portable terminal, the first indicating means for indicating the direction of movement of a first cursor that is displayed on the character entry screen and giving an instruction to select a character key image currently indicated by the first cursor on the keyboard screen; a second indicating means provided in a predetermined place of the portable terminal, the second indicating means for indicating the direction of movement of a second cursor that is displayed on the character entry screen and giving an instruction to select a character key image currently indicated by the second cursor on the keyboard screen; a cursor movement control means for controlling movement of the first cursor on the character entry screen based on a signal concerning the direction of movement of the first cursor, the signal which is output from the first indicating means when the direction of movement of the first cursor is indicated by using the first indicating means, and controlling movement of the second cursor on the character entry screen based on a signal concerning the direction of movement of the second cursor, the signal which is output from the second indicating means when the direction of movement of the second cursor is indicated by using the second indicating means; and an entry control means for controlling the entry of a character related to a character key image based on a signal concerning selection of the character key image, the signal which is output from the first indicating means when the character key image currently indicated by the first cursor is selected by using the first indicating means, and controlling an entry of a character related to a character key image based on a signal concerning selection of the character key image, the signal which is output from the second indicating means when the character key image currently indicated by the second cursor is selected by using the second indicating means.

In the portable terminal of the present invention, the first cursor and the second cursor are displayed on the character entry screen, and the first indicating means for indicating the direction of movement and the like of the first cursor and the second indicating means for indicating the direction of movement and the like of the second cursor are provided in predetermined places of the portable terminal. As a result, since the user holds the periphery of a portion of the portable terminal in which she first indicating means is provided and the periphery of a portion of the portable terminal in which the second indicating means is provided with his/her respective hands at the time of character entry, the user can hold the portable terminal stably with both hands. Moreover, since the user can operate the first indicating means and the second indicating means by using thumbs, index fingers, and so forth of his/her respective hands in a state in which the user holds the portable terminal with both hands in this manner, the user can perform entry operation accurately and quickly.

Moreover, in the portable terminal of the present invention, it is preferable that the first cursor and the second cursor differ from each other in at least one of the elements: a shape, a color, a line drawn on the inside, and pattern. This makes it possible for the user to determine easily whether each cursor displayed on the character entry screen corresponds to the first indicating means or the second indicating means based on the different element.

Furthermore, in the portable terminal of the present invention, when controlling the movements of the first cursor and the second cursor on the keyboard screen, the cursor movement control means may move the cursors in a key image unit. As a result, since the user can easily and accurately perform operation to move each cursor to the position of an intended key image on the keyboard screen, it is possible to reduce errors in operation.

In addition, in the portable terminal of the present invention, the display of the display means may be a touch panel, and, when the user directly touches a character key image on the keyboard screen with a finger, the entry control means may control the entry of a character for the touched character key image. This makes it possible for the use to perform the entry of a character by using both a character entry method using the cursor and a character entry method using the touch panel.

Moreover, in the portable terminal of the present invention, when a screen other than the character entry screen is displayed on the display of the display means, the first indicating means and the second indicating means may be used respectively as an indicating means for giving an instruction to display a predetermined menu screen and an indicating means for giving an instruction to return to the most recently displayed screen. As a result, there is no need to provide extra indicating means such as a "menu button" and a "Back button" in addition the first indicating means and the second indicating means.

Furthermore, in the portable terminal of the present invention, it is preferable that the portable terminal includes the first indicating means for a vertically-oriented state and the second indicating means for a vertically-oriented state which are used when the entry of a character is performed with the display of the display means being brought to a vertically-oriented state, and the first indicating means for a horizontally-oriented state and the second indicating means for a horizontally-oriented state which are used when the entry of a character is performed with the display of the display means being brought to a horizontally-oriented state. As a result, when the user uses the portable terminal in any one of the vertically-oriented state and the horizontally-oriented state, the user can perform entry operation accurately and quickly by using the first indicating means and the second indicating means in accordance with the state of the portable terminal while holding the portable terminal stably with both hands.

In addition, in the portable terminal of the present invention, it is preferable that the keyboard screen includes a plurality of function key images, the first indicating means is provided to give an instruction to select a function key image currently indicated by the first cursor on the keyboard screen, the second indicating means is provided to give an instruction to select a function key image currently indicated by the second cursor on the keyboard screen, and the entry control means controls processing to implement a function provided to a function key image based on a signal concerning selection of the function key image, the signal which is output from the first indicating means when the function key image currently indicated by the first cursor is selected by using the first indicating means, and controls processing to implement a function provided to a function key image based on a signal concerning selection of the function key image, the signal which is output from the second indicating means when the function key image currently indicated by the second cursor is selected by using the second indicating means. This makes it possible for the user to select an intended function key image accurately and quickly by operating the first indicating means and the second indicating means by using thumbs, index fingers, and so forth of his/her respective hands in a state in which the user holds the portable terminal with both hands.

Moreover, in the portable terminal of the present invention, the display of the display means may be a touch panel, and, when the user directly touches a function key image on the keyboard screen with a finger, the entry control means may control processing to implement a function provided to the touched function key image. This makes it possible for the user to give an instruction to implement a function provided to a function key image by using both a function key image selection method using the cursor and a function key image selection method using the touch panel.

Advantageous Effects of Invention

With the portable terminal according to the present invention, it is possible to hold the portable terminal stably with both hands and perform entry operation accurately and quickly at the time of character entry.

BRIEF DESCRIPTION OF DRAWINGS

FIG. 11 is a diagram for explaining the procedure of operation on the e-mail sending and creation screen that is performed when e-mail is created;

FIG. 12 is a diagram for explaining the procedure of operation on the e-mail sending and creation screen that is performed when e-mail is created;

FIG. 15 is a diagram depicting examples of a QWERTY keyboard screen that is displayed when the kanji hiragana character entry mode is selected;

FIG. 16 is a diagram depicting examples of a QWERTY keyboard screen that is displayed when the kanji hiragana character entry mode is selected;

FIG. 17 is a diagram depicting examples of a QWERTY keyboard screen that is displayed when an English half-width character entry mode is selected;

FIG. 18 is a diagram depicting examples of a QWERTY keyboard screen that is displayed when the English half-width character entry mode is selected;

FIG. 19 is a diagram depicting examples of a QWERTY keyboard screen that is displayed when the English half-width character entry mode is selected;

FIG. 20 is a diagram depicting examples of a QWERTY keyboard screen that is displayed when the English half-width character entry mode is selected;

FIG. 21 is a diagram depicting examples of a 50-character hiragana syllabary layout keyboard screen;

FIG. 32 is a diagram depicting specific examples in which, in a portable terminal provided with one first indicating button and two second indicating buttons, these indicating buttons are disposed on the front side of a portable terminal;

FIG. 34 is a diagram depicting specific examples in which, in the portable terminal provided with one first indicating button and two second indicating buttons, these indicating buttons are disposed on the back side of the portable terminal;

FIG. 36 is a diagram depicting how the portable terminal depicted in FIG. 35(a) looks when the portable terminal is held;

FIG. 39 is a diagram depicting specific examples in which, in the portable terminal provided with the two sets of the first indicating button and the second indicating button, these indicating buttons are disposed on the back side of the portable terminal;

FIG. 40 is a diagram depicting examples of operation of two indicating buttons functioning as a cursor operation button when a character entry screen is not displayed on a display of a display means;

FIG. 41 is a diagram depicting examples of operation of the two indicating buttons functioning as the cursor operation button when the character entry screen is not displayed on the display of the display means;

FIG. 42(a) is a diagram depicting an indicating button adopting an electrostatic pad, FIG. 42(b) is a diagram depicting an indicating button adopting a trackball, and FIG. 42(c) is a diagram depicting an indicating button having an integrated pressing-type structure;

FIG. 43 is a diagram depicting examples of a keyboard screen included in a telephone number entry screen when the telephone number entry screen is used as the character entry screen;

FIG. 45 is a diagram depicting examples of a Spanish layout keyboard screen;

FIG. 46 is a diagram depicting examples of a French layout keyboard screen;

FIG. 47 is a diagram depicting examples of a Korean layout keyboard screen;

FIG. 51 is a diagram depicting examples of the arrangement of the first indicating button and the second indicating button when the portable terminal of the present invention is a slider portable terminal;

FIG. 53 is a diagram depicting examples of the arrangement of the first indicating button and the second indicating button when the portable terminal of the present invention is a slider portable terminal;

FIG. 56 is a diagram for explaining other examples of the first indicating button and the second indicating button.

DESCRIPTION OF EMBODIMENTS

Figure 1:
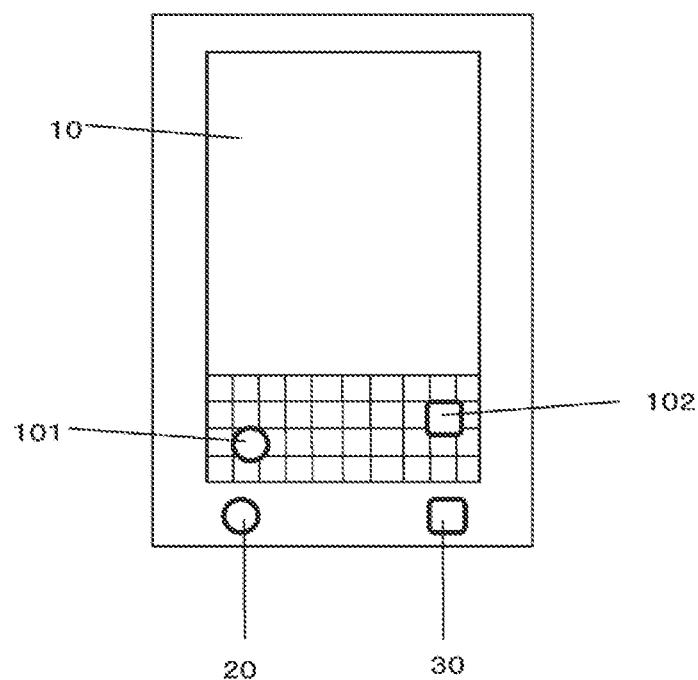
FIG. 1 is a schematic front view of a portable terminal which is an embodiment of the present invention.
Figure 2:
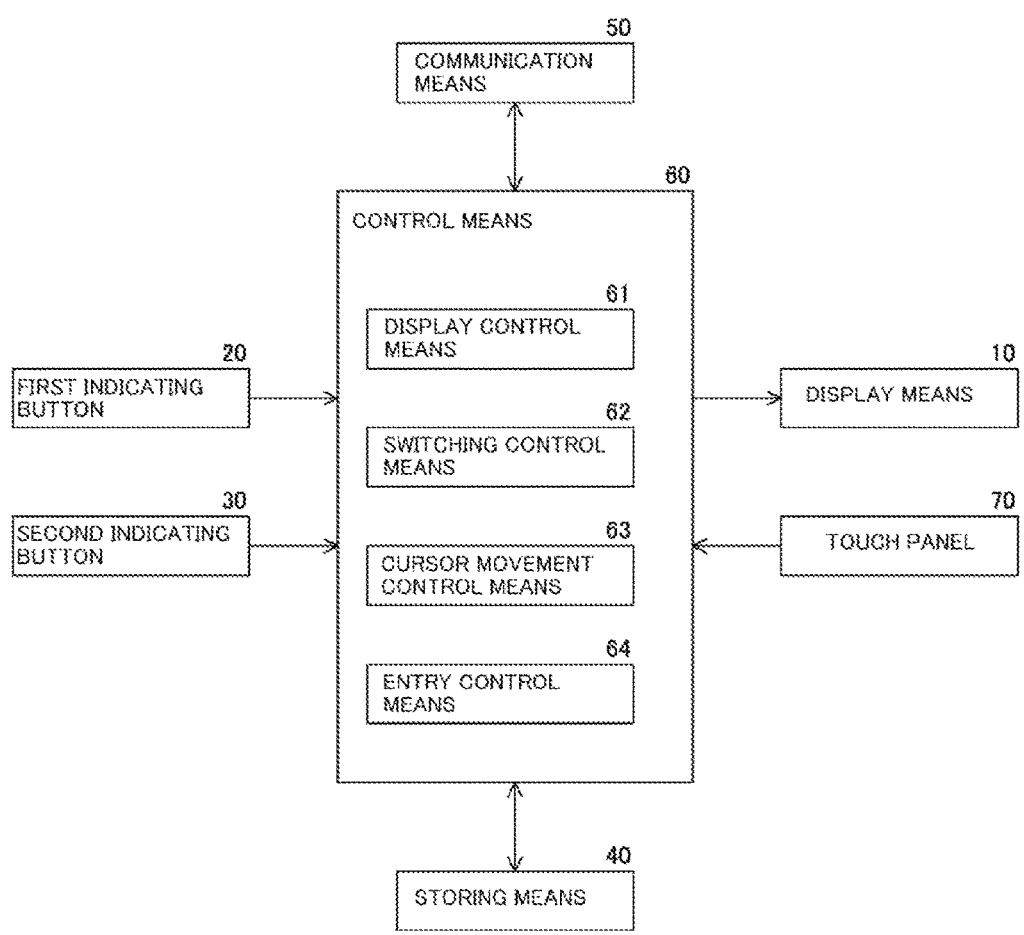
FIG. 2 is a schematic block diagram of the portable terminal.

Hereinafter, with reference to the drawings, best modes for carrying out the invention according to the present application will be described. FIG. 1 is a schematic front view of a portable terminal which is an embodiment of the present invention, and FIG. 2 is a schematic block diagram of the portable terminal.

The portable terminal of this embodiment is a tablet terminal that can carry and handle various types of information, and has various functions such as a communication function of performing transmission and reception of information with the outside by connecting to the Internet and a character entry function of performing the entry of a character. The portable terminal includes, as depicted in FIGS. 1 and 2, a display means 10, a plurality of operation buttons, a storing means 40, a communication means 50, and a control means 60. Moreover, this portable terminal is formed to have a virtually rectangular shape when viewed from the front side.

The display means 10 is provided on the front side of the portable terminal. As the display means 10, a liquid crystal display device is used, and a display of the display means 10 is formed as a touch panel 70. On the display of the display means 10, various types of screens such as a home screen, an application screen, and a character entry screen are displayed. The home screen is a screen that is displayed when the portable terminal is turned on. On the application screen, icons of application programs are displayed, and, by tapping an intended icon, it is possible to start an application program corresponding to the icon.

Figure 3:
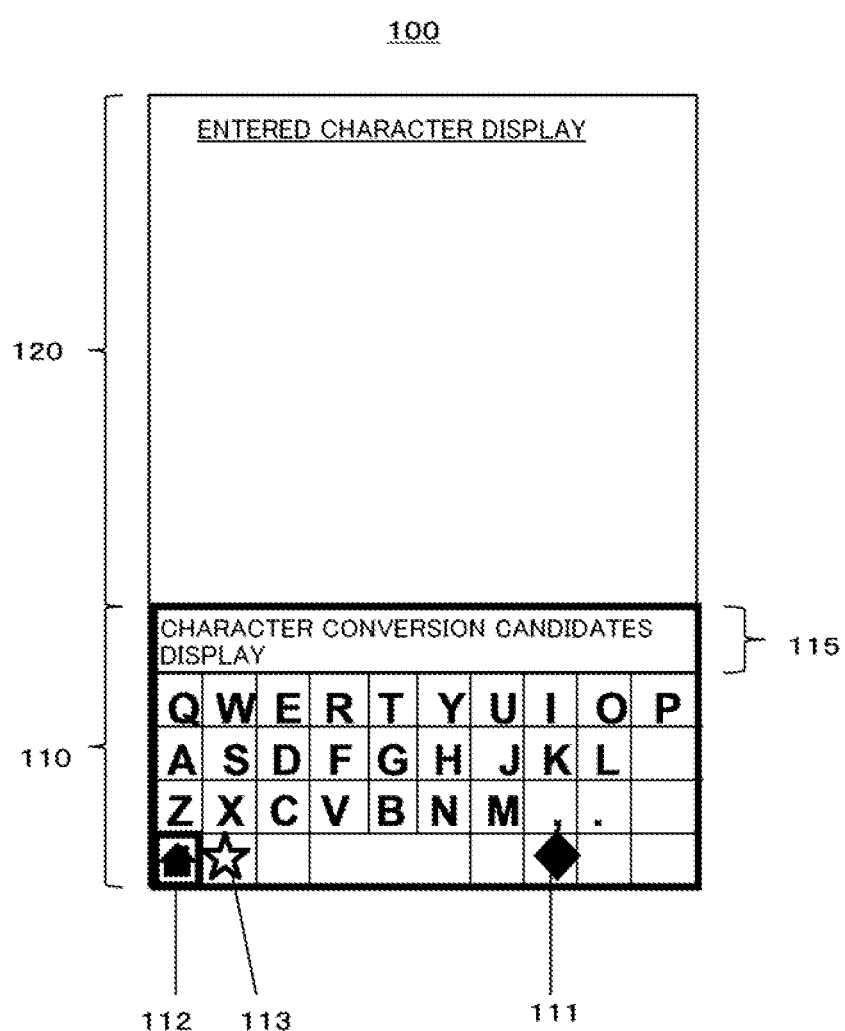
FIG. 3 is a diagram depicting an example of a character entry screen.
Figure 4:
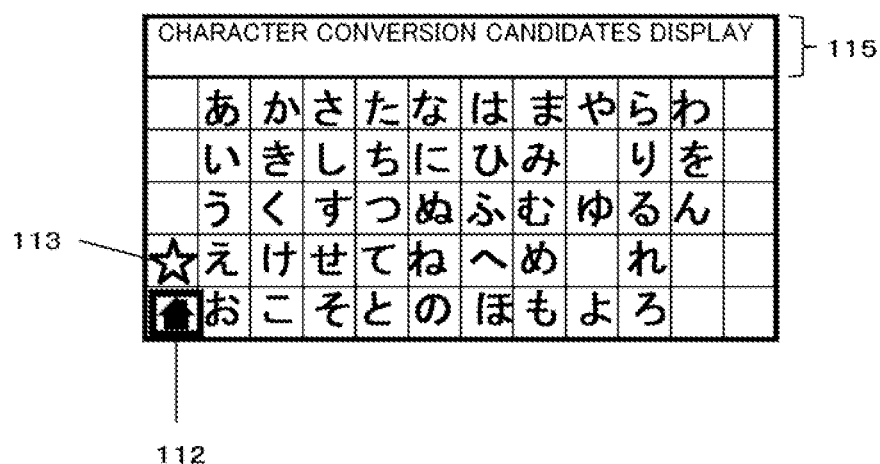
FIG. 4 is a diagram depicting an example of a 50-character hiragana syllabary layout keyboard screen.

The character entry screen includes a keyboard screen. The user can enter a character by using key images of the keyboard screen. FIG. 3 is a diagram depicting an example of the character entry screen. As depicted in FIG. 3, a character entry screen 100 includes a keyboard screen 110 and an entered character display screen 120. Examples of the entered character display screen 120 include a search screen and an e-mail creation and sending screen. Moreover, examples of the entered character display screen 120 include screens of office software such as Microsoft Word®, Microsoft Excel®, Microsoft PowerPoint®, Microsoft Outlook®, Microsoft Word for Mac®, Microsoft Excel for Mac®, Microsoft PowerPoint for Mac®, Microsoft Outlook for Mac®, and Google Docs®. On the keyboard screen 110, a plurality of character key images related to characters (including symbols) and a plurality of function key images to which particular functions are provided are provided. The character key images, the function key images, and so forth are collectively referred to as key images. Incidentally, hereinafter, the "character key image" will be also referred to simply as the "character key" and the "function key image" will be also referred to simply as the "function key". In addition, the "key image" will be also referred to simply as the "key". On the keyboard screen 110 depicted in FIG. 3, as character key layout, QWERTY layout is adopted. Moreover, the function keys include a character entry mode switching key 111, a Home key 112, a keyboard switching key 113, a Space key, an Enter key, a Shift key, and so forth. The character entry mode switching key 111 is provided to perform switching between a kanji hiragana character entry mode and an English half-width character entry mode. The Home key 112 is provided to end the character entry screen 100 and give an instruction to display the home screen. The keyboard switching key 113 is provided to perform switching between the QWERTY keyboard screen depicted in FIG. 3 and a 50-character hiragana syllabary layout keyboard screen. When the kanji hiragana character entry mode is selected on the QWERTY keyboard screen, it is possible to enter Japanese words by using Roman letters. Here, an example of the 50-character hiragana syllabary layout keyboard screen is depicted in FIG. 4. The 50-character hiragana syllabary layout keyboard screen is a keyboard screen expressly meant for entry of kanji and hiragana characters, and the Home key 112 and the keyboard switching key 113 are also provided thereon. Moreover, when the kanji hiragana character entry mode is selected on the QWERTY keyboard screen and when the 50-character hiragana syllabary layout keyboard screen is displayed as the keyboard screen, as depicted in FIGS. 3 and 4, a character conversion candidate displaying section 115 for displaying conversion candidates of the entered characters is displayed in an upper part of the keyboard screen. Incidentally, in FIGS. 3 and 4 depicting the keyboard screen, the Space key, the Enter key, the Shift key, and so forth are not depicted. These keys are not depicted also in drawings depicting other types of keyboard screens which will be described later.

As described above, in this embodiment, switching between the QWERTY keyboard screen and the 50-character hiragana syllabary layout keyboard screen is performed by the keyboard switching key 113; instead, for example, in place of the 50-character hiragana syllabary layout keyboard screen, a simplified hiragana layout keyboard screen having keys: "あ", "か", "さ", "た", "な", "は", "ま", "や", "ら", and "わ", the simplified hiragana layout keyboard screen used in a mobile telephone and so forth, may be adopted and switching between the QWERTY keyboard screen and the simplified hiragana layout keyboard screen may be performed by the keyboard switching key 113. Moreover, in this embodiment, switching between the kanji hiragana character entry mode and the English half-width character entry mode is performed by the character entry mode switching key 111; instead, for example, entry mode switching between a plurality of entry modes including other entry modes such as a half-width numeric character entry mode in addition to these entry modes may be performed.

Incidentally, in this embodiment, it is assumed that the character entry screen 100 is displayed in a state in which the character entry screen 100 is vertically oriented on the display of the display means 10 and the user performs the entry of a character by bringing the portable terminal to a vertically-oriented state.

The plurality of operation buttons include, as depicted in FIGS. 1 and 2, a power-supply button (not depicted in the drawing), a first indicating button (a first indicating means) 20, and a second indicating button (a second indicating means) 30. The power-supply button is provided to turn on and off the portable terminal and is provided on the lateral side of the portable terminal, for example.

The first indicating button 20 and the second indicating button 30 are provided in predetermined places of the portable terminal. Specifically, as depicted in FIG. 1, the first indicating button 20 and the second indicating button 30 are disposed on left and right at the lower edge on the side of the portable terminal where the display is located (the front side). In this embodiment, two cursors (a first cursor 101 and a second cursor 102) are displayed on the character entry screen 100, and the first cursor 101 is operated by using the first indicating button 20 and the second cursor 102 is operated by using the second indicating button 30. The first cursor 101 and the second cursor 102 are mainly used to select each key of the keyboard screen 110.

Figure 5:
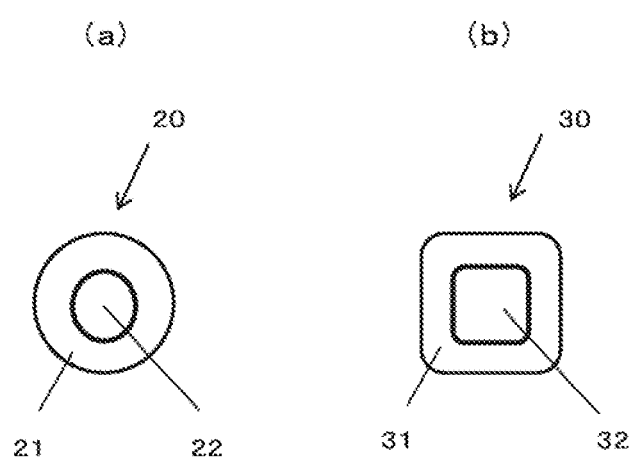
FIG. 5 is a diagram for explaining a first indicating button and a second indicating button.

FIG. 5 is a diagram for explaining the first indicating button 20 and the second indicating button 30. As the first indicating button 20 and the second indicating button 30, buttons having a pressing-type structure are used. The first indicating button 20 has, as depicted in FIG. 5(*a*), a ring-shaped movement direction indicating section 21 and a selection indicating section 22 provided in the center of the movement direction indicating section 21. The movement direction indicating section 21 is provided to indicate the direction of movement of the first cursor 101 when the character entry screen 100 is displayed on the display of the display means 10. When the movement direction indicating section 21 is operated and the direction of movement of the first cursor 101 is indicated, a signal concerning the direction of movement of the first cursor 101 is output to the control means 60 from the movement direction indicating section 21. The selection indicating section 22 is provided to give an instruction to select the key currently indicated by the first cursor 101 on the keyboard screen 110. When the selection indicating section 22 is operated and an instruction to select, the key currently indicated by the first cursor 101 is given, a signal concerning the selection of the key is output to the control means 60 from the selection indicating section 22. A method of operating the movement direction indicating section 21 is the same as the usual method of operating an arrow key and so forth. For example, when an upper portion of the movement direction indicating section 21 is pressed, the first cursor 101 moves upward on the character entry screen 100; when a lower portion of the movement direction indicating section 21 is pressed, the first cursor 101 moves downward on the character entry screen 100. When a right portion of the movement direction indicating section 21 is pressed, the first cursor 101 moves rightward on the character entry screen 100; when a left portion of the movement direction indicating section 21 is pressed, the first cursor 101 moves leftward on the character entry screen 100. In addition, when a portion of the movement direction indicating section 21 other than the upper, lower, right, and left portions thereof is pressed, the first cursor 101 moves on the character entry screen 100 in a direction corresponding to the pressed portion.

Moreover, the second indicating button 30 has, as depicted in FIG. 5(*b*), a rectangular ring-shaped movement direction indicating section 31 and a selection indicating section 32 provided in the center of the movement, direction indicating section 31. The movement direction indicating section 31 is provided to indicate the direction of movement of the second cursor 102 when the character entry screen 100 is displayed on the display of the display means 10. When the movement direction indicating section 31 is operated and the direction of movement of the second cursor 102 is indicated, a signal concerning the direction of movement of the second cursor 102 is output to the control means 60 from the movement direction indicating section 31. The selection indicating section 32 is provided to give an instruction to select the key currently indicated by the second cursor 102 on the keyboard screen 110. When the selection indicating section 32 is operated and an instruction to select the key currently indicated by the second cursor 102 is given, a signal concerning the selection of the key is output to the control means 60 from the selection indicating section 32. A method of operating the movement direction indicating section 31 is also the same as the method of operating the movement direction indicating section 21 of the first indicating button 20. Incidentally, in this embodiment, the first indicating button 20 and the second indicating button 30 are formed to have different shapes, but the first indicating button 20 and the second indicating button 30 may be formed to have the same shape.

Incidentally, by operating the movement direction indicating sections 21 and 31, it is possible to move the corresponding cursors not only in the range of the keyboard screen 110 on the character entry screen 100 but also over the entire surface of the character entry screen 100 freely. That is, the first cursor 101 and the second cursor 102 can move in the same way as the movement of a cursor of a mouse by the usual mouse operation. Therefore, for example, when the e-mail creation and sending screen is displayed as the entered character display screen 120, the first cursor 101 or the second cursor 102 can be used to select a send button by moving the first cursor 101 or the second cursor 102 to the position of the send button on the e-mail creation and sending screen.

As described above, the first indicating button 20 and the second indicating button 30 function as a cursor operation button when the character entry screen 100 is displayed on the display of the display means 10. On the other hand, when a screen other than the character entry screen 100 is displayed on the display of the display means 10, the first indicating button 20 and the second indicating button 30 are used as a screen display indicating button (an indicating means) to give an instruction to display a predetermined screen, such as a "menu button" and a "Back button" provided in a normal smartphone and so forth. For example, when a screen other than the character entry screen 100 is displayed on the display of the display means 10, if the selection indicating section 22 of the first indicating button 20 is pressed, a menu screen including usable menus is displayed, and, if the selection indicating section 32 of the second indicating button 30 is pressed, the most recently displayed screen is displayed. Incidentally, in general, the first indicating button 20 or the second indicating button 30 can also be used as a screen display indicating button other than the above-described "menu button" and "Back button", for example, a "home button" for giving an instruction to display the home screen.

Figure 6:
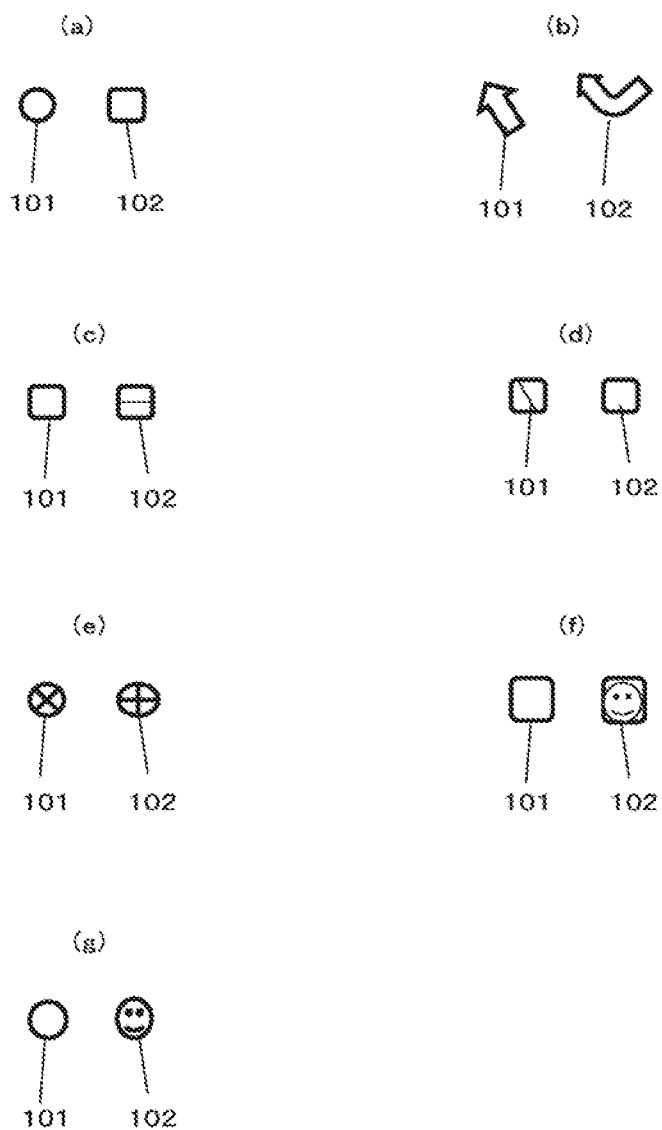
FIG. 6 is a diagram depicting examples of a display mode of two cursors.

Moreover, in this embodiment, since the first cursor 101 and the second cursor 102 are displayed on the character entry screen 100, the first cursor 101 and the second cursor 102 are displayed in such a way that the first cursor 101 and the second cursor 102 differ from each other in at least one of the elements: a shape, a color, a line drawn on the inside, and a pattern so that the user can easily distinguish between these two cursors 101 and 102. FIG. 6 is a diagram depicting examples of a display mode of the two cursors 101 and 102. For example, in an example of FIG. 6 (*a*), the first cursor 101 is displayed as a circle, and the second cursor 102 is displayed as a quadrangle. In an example of FIG. 6(*b*), the first cursor 101 is displayed as a linear arrow directed in an upper-left direction, and the second cursor 102 is displayed as a curved arrow directed first downward and then upward. Moreover, in an example of FIG. 6(*c*), the first cursor 101 is displayed as a quadrangle, and the second cursor 102 is displayed as a quadrangle with a horizontal line drawn inside. In an example of FIG. 6(*d*), the first cursor 101 is displayed as a quadrangle with an oblique line drawn inside, and the second cursor 102 is displayed as a quadrangle. In an example of FIG. 6(*e*), the first cursor 101 is displayed as an ellipse with x drawn inside, and the second cursor 102 is displayed as an ellipse with a cross drawn inside. Furthermore, in an example of FIG. 6(*f*), the first cursor 101 is displayed as a quadrangle, and the second cursor 102 is displayed as a quadrangle inside which a pattern is drawn. In an example of FIG. 6(*g*), the first cursor 101 is displayed as a circle, and the second cursor 102 is displayed as a circle inside which a pattern is drawn. In this embodiment, as in the example of FIG. 6(*a*), the first cursor 101 is displayed as a circle, and the second cursor 102 is displayed as a quadrangle.

Incidentally, in the portable terminal of this embodiment, a plurality of types of display modes of the first cursor 101 and the second cursor 102 are preset, and the user can select an intended display mode for each of the first cursor 101 and the second cursor 102.

In the storing means 40, an OS, various application programs, and so forth are stored. Moreover, the storing means 40 is used as working memory. For example, in the storing means 40, keyboard display area information (including position information, shape information, size information, and so forth) for displaying the keyboard screen 110 in a predetermined display area on the screen of the display means 10, cursor display area information (including position information, shape information, size information, color/pattern information, and so forth) for each of the first cursor 101 and the second cursor 102, the cursor display area information for displaying the cursor in a predetermined display position (display area) on the display of the display means 10, and so forth are stored. Moreover, the communication means 50 performs information communication with the outside.

The control means 60 performs centralized control of the individual sections of the portable terminal. Hereinafter, of the contents of control that is performed by the control means 60, the content of control related to character entry will be mainly described. The control means 60 includes, as depicted in FIG. 2, a display control means 61, a switching control means 62, a cursor movement control means 63, and an entry control means 64. The display control means 61 creates various screens such as the home screen, the application screen, and the character entry screen 100 and displays the screens on the display of the display means 10. The display control means 61 stores and manages the keyboard display area information in the storing means 40 when displaying the keyboard screen 110 on the display of the display means 10. The switching control means 62 switches between making the first indicating button 20 and the second indicating button 30 function as the cursor operation button and making the first indicating button 20 and the second indicating button 30 function as the screen display indicating button. For example, the switching control means 62 determines whether or not the screen that is displayed on the display of the display means 10 is the character entry screen 100, and, if the switching control means 62 determines that the character entry screen 100 is displayed on the display, the switching control means 62 sets a flag indicating that the first indicating button 20 and the second indicating button 30 are made to function as the cursor operation button. Then, while this flag is set, the cursor movement control means 63 and the entry control means 64 process the signal from the first indicating button 20 and the signal from the second indicating button 30 as the signal from the cursor operation button.

The cursor movement control means 63 controls the display of each of the cursors 101 and 102 and, when the character entry screen 100 is displayed on the display of the display means 10, controls the movement, of the first cursor 101 on the character entry screen 100 based on a signal concerning the direction of movement of the first cursor 101, the signal which is output from the movement direction indicating section 21 when the direction of movement of the first cursor 101 is indicated by using the movement direction indicating section 21 of the first indicating button 20, and controls the movement of the second cursor 102 on the character entry screen 100 based on a signal concerning the direction of movement of the second cursor 102, the signal which is output from the movement direction indicating section 31 when the direction of movement of the second cursor 102 is indicated by using the movement direction indicating section 31 of the second indicating button 30. Moreover, the cursor movement control means 63 manages the position information of the first cursor 101 on the screen and the position information of the second cursor 102 on the screen. That is, the cursor movement control means 63 stores each cursor display area information in the storing means 40 and manages the cursor display area information when displaying the cursors 101 and 102 on the display of the display means 10.

Here, in this embodiment, as for the cursor movement on the keyboard screen 110, setting (free movement setting) that allows the cursor to move freely and setting (key unit movement setting) that allows the cursor to move in a key unit by using each key as one movement range can be selected. When the key unit movement setting is enabled, the cursor movement control means 63 controls the movement of the cursor in such a way that, when the movement direction indicating section 21 or the movement direction indicating section 31 is pressed, the cursor is moved in a key unit in the direction in which the movement direction indicating section 21 or the movement direction indicating section 31 is pressed. By making such key unit movement setting, since the user can easily and accurately perform operation to move each of the cursors 101 and 102 to the position of an intended key on the keyboard screen 110, it is possible to reduce errors in operation.

Figure 7:
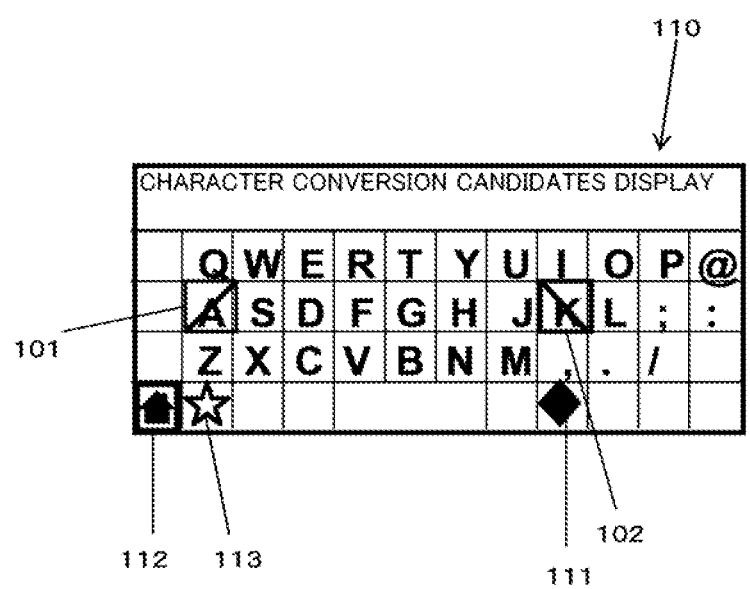
FIG. 7 is a diagram depicting an example of a display mode of a first cursor and a second cursor when the first cursor and the second cursor move in a key image unit on a keyboard screen.

Incidentally, when the key unit movement setting is enabled, it is preferable to display the first cursor 101 and the second cursor 102 in such a way that the first cursor 101 and the second cursor 102 differ from each other in at least one of the elements: a color, a line drawn on the inside, and a pattern, not displaying the first cursor 101 and the second cursor 102 in different shapes. FIG. 7 is a diagram depicting an example of a display mode of the first cursor 101 and the second cursor 102 when the first cursor 101 and the second cursor 102 move in a key unit on the keyboard screen 110. In the example of FIG. 7, the first cursor 101 is displayed as a quadrangle inside which an oblique line from top right to bottom left is drawn, and the second cursor 102 is displayed as a quadrangle inside which an oblique line from top left to bottom right is drawn. As described above, by displaying the first cursor 101 and the second cursor 102 in such a way that the first cursor 101 and the second cursor 102 differ from each other in at least one of the elements: a color, a line drawn on the inside, and a pattern, even when the key unit movement setting is enabled, the user can easily distinguish between the first cursor 101 and the second cursor 102.

When the character entry screen 100 is displayed on the display of the display means 10, the entry control means 64 controls the entry of a character related to a character key based on a signal concerning the selection of the character key, the signal which is output from the selection indicating section 22 when the character key currently indicated by the first cursor 101 is selected by using the selection indicating section 22 of the first indicating button 20, and controls the entry of a character related to a character key based on a signal concerning the selection of the character key, the signal which is output from the selection indicating section 32 when the character key currently indicated by the second cursor 102 is selected by using the selection indicating section 32 of the second indicating button 30. Moreover, when the character entry screen 100 is displayed on the display of the display means 10, the entry control means 64 performs processing to implement the function provided to a function key based on a signal concerning the selection of the function key, the signal which is output from the selection indicating section 22 when the function key currently indicated by the first cursor 101 is selected by using the selection indicating section 22 of the first indicating button 20, and performs processing to implement the function provided to a function key based on a signal concerning the selection of the function key, the signal which is output from the selection indicating section 32 when the function key currently indicated by the second cursor 102 is selected by using the selection indicating section 32 of the second indicating button 30.

Moreover, when the user directly touches a character key of the keyboard screen 110 with a finger and a signal concerning the selection of the touched character key is sent from the touch panel 70, the entry control means 64 controls the entry of a character related to the character key, and, when the user directly touches a function key of the keyboard screen 110 with a finger and a signal concerning the selection of the touched function key is sent from the touch panel 70, the entry control means 64 performs processing to implement the function provided to the function key. As described above, when the display of the display means 10 is a touch panel, it is possible to perform the entry of a character by using both the character entry method using the first cursor 101 and the second cursor 102 and the character entry method using the touch panel and give an instruction to implement the function provided to a function key by using both the function key selection method using the first cursor 101 and the second cursor 102 and the function key selection method using the touch panel.

Incidentally, in this embodiment, when the kanji hiragana character entry mode is selected on the QWERTY keyboard screen, a plurality of operations are set as operation for performing conversion of the entered character and confirmation thereof is the same as usual operation. That is, when the kanji hiragana character entry mode is selected, the entry control means 64 performs conversion on the entered character in an unconfirmed state that is displayed in a predetermined field of the entered character display screen 120 when the Space key of the keyboard screen 110 is selected and causes the converted character to be displayed in the character conversion candidate displaying section 115. Then, when the Enter key is selected, the entry control means 64 confirms that the entered character in an unconfirmed state is the character displayed in the character conversion candidate displaying section 115. Here, it is also possible to perform the selection of the Space key and the Enter key by using the first cursor 101 or the second cursor 102 or by directly touching the key with a finger by using the touch panel 70. Moreover, in this embodiment, also by concurrently pressing the selection indicating section 22 of the first indicating button 20 and the selection indicating section 32 of the second indicating button 30 one time, the entry control means 64 performs conversion of the entered character. Then, by repeating such operation at some interval, it is possible to change the converted characters one after the other. Furthermore, in this embodiment, by pressing the selection indicating section of any one of the first indicating button 20 and the second indicating button 30 two times in a row or concurrently pressing the selection indicating section 22 of the first indicating button 20 and the selection indicating section 32 of the second indicating button 30 two times in a row, the entry control means 64 confirms the conversion of the entered character. Moreover, in this embodiment, also in a case where the 50-character hiragana syllabary layout keyboard screen displayed as the keyboard screen, as is the case with those described above, a plurality of operations are set as operation for performing conversion of the entered character and confirmation thereof.

Incidentally, the operation for performing conversion of the entered character and confirmation thereof is not limited to the operation described above. For example, by pressing the selection indicating section of any one of the first indicating button 20 and the second indicating button 30 two times in a row, the entry control means 64 may be made to perform conversion of a character, and, by concurrently pressing the selection indicating section 22 of the first indicating button 20 and the selection indicating section 32 of the second indicating button 30 one time, the entry control means 64 may be made to confirm the character. Moreover, in general, it is possible to designate various commands by, for example, the combinations of the press of the first indicating button 20 and the press of the second indicating button 30.

Moreover, even when the entry operation is being performed, when the Home key 112 of the keyboard screen 110 is selected, the entry control means 64 outputs, to the display control means 61, a signal to the effect that the home screen is displayed. When receiving the signal, the display control means 61 displays the home screen on the display of the display means 10 in place of the character entry screen 100. Then, the switching control means 62 determines that the screen displayed on the display of the display means 10 is not the character entry screen 100 and clears the flag indicating that the first indicating button 20 and the second indicating button 30 are made to function as the cursor operation button. As a result, the first indicating button 20 and the second indicating button 30 are switched from the function as the cursor operation button to the function as the screen display indicating button.

Figure 8:
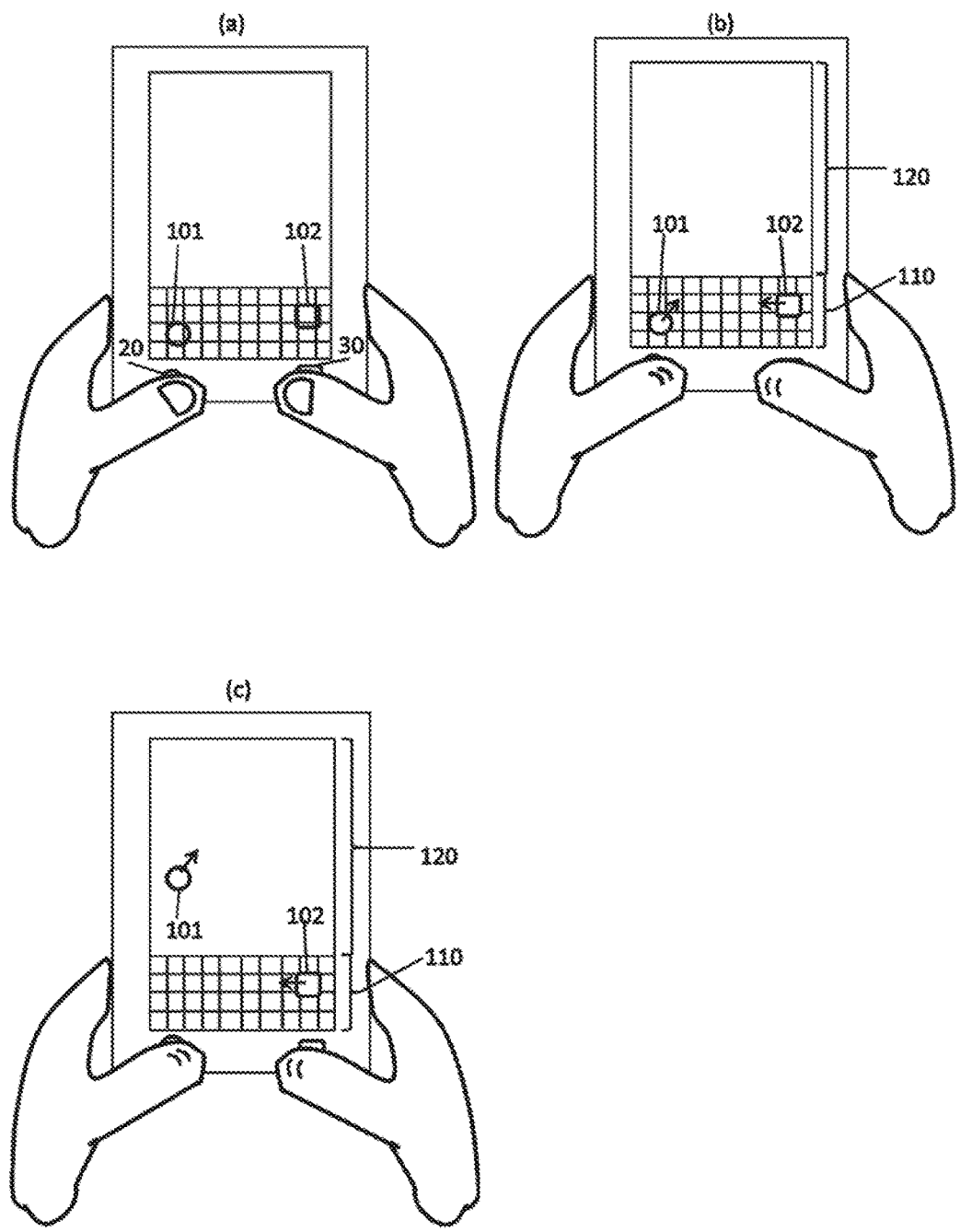
FIG. 8 is a diagram for explaining how to hold the portable terminal of this embodiment and how to operate the two indicating buttons at the time of character entry operation.

Next, how to hold the portable terminal of this embodiment and how to operate the two indicating buttons 20 and 30 at the time of character entry operation will be described. FIG. 8 is a diagram for explaining how to hold the portable terminal, of this embodiment and how to operate the two indicating buttons 20 and 30 at the time of character entry operation.

When performing character entry, as depicted in FIG. 8(a), the user puts a thumb of his/her left hand on the first indicating button 20 and holds the left lateral side or the back side of the portable terminal with the remaining fingers, and puts a thumb of his/her right, hand on the second indicating button 30 and holds the right lateral side or the back side of the portable terminal with the remaining fingers. As described above, since the user holds the periphery of a portion of the portable terminal in which the first indicating button 20 is provided and the periphery of a portion of the portable terminal in which the second indicating button 30 is provided with his/her respective hands, the user can hold the portable terminal stably with both hands. Moreover, operation of each of the indicating buttons 20 and 30 is performed by the thumb put thereon. That is, as depicted in FIGS. 8(b) and (c), the user moves the first cursor 101 by operating the first indicating button 20 on which the thumb is put by using the thumb of the left hand in a state in which the user holds the portable terminal with both hands. And, the user moves the second cursor 102 by operating the second indicating button 30 on which the thumb is put by using the thumb of the right hand. As described above, since it is possible to select intended character key and function key accurately and quickly by operating the first indicating button 20 and the second indicating button 30 with both hands, it is possible to perform entry operation quickly. Here, as depicted in FIG. 8(c), it is possible to move the cursors 101 and 102 not only in the range of the keyboard screen 110 but also in the range of the entered character display screen 120. Incidentally, when the cursors 101 and 102 move from the keyboard screen 110 to the entered character display screen 120, the shapes of the cursors may be automatically changed to the shape of an arrow or the like. Also in this case, it is preferable to change the shapes of the first cursor 101 and the second cursor 102 to shapes which are different from each other to distinguish between the first cursor 101 and the second cursor 102.

Incidentally, how to hold the portable terminal and how to operate the two indicating buttons 20 and 30 at the time of character entry operation are not limited to the above-described method. For example, the user may hold the portable terminal in a way appropriate to the user and operate each of the indicating buttons 20 and 30 by using a thumb, an index finger, and so forth, for example. Moreover, the user may perform the entry of a character by operating one indicating button by using a thumb of one hand and using only a cursor corresponding to the indicating button while holding the portable terminal with both hands.

Figure 9:
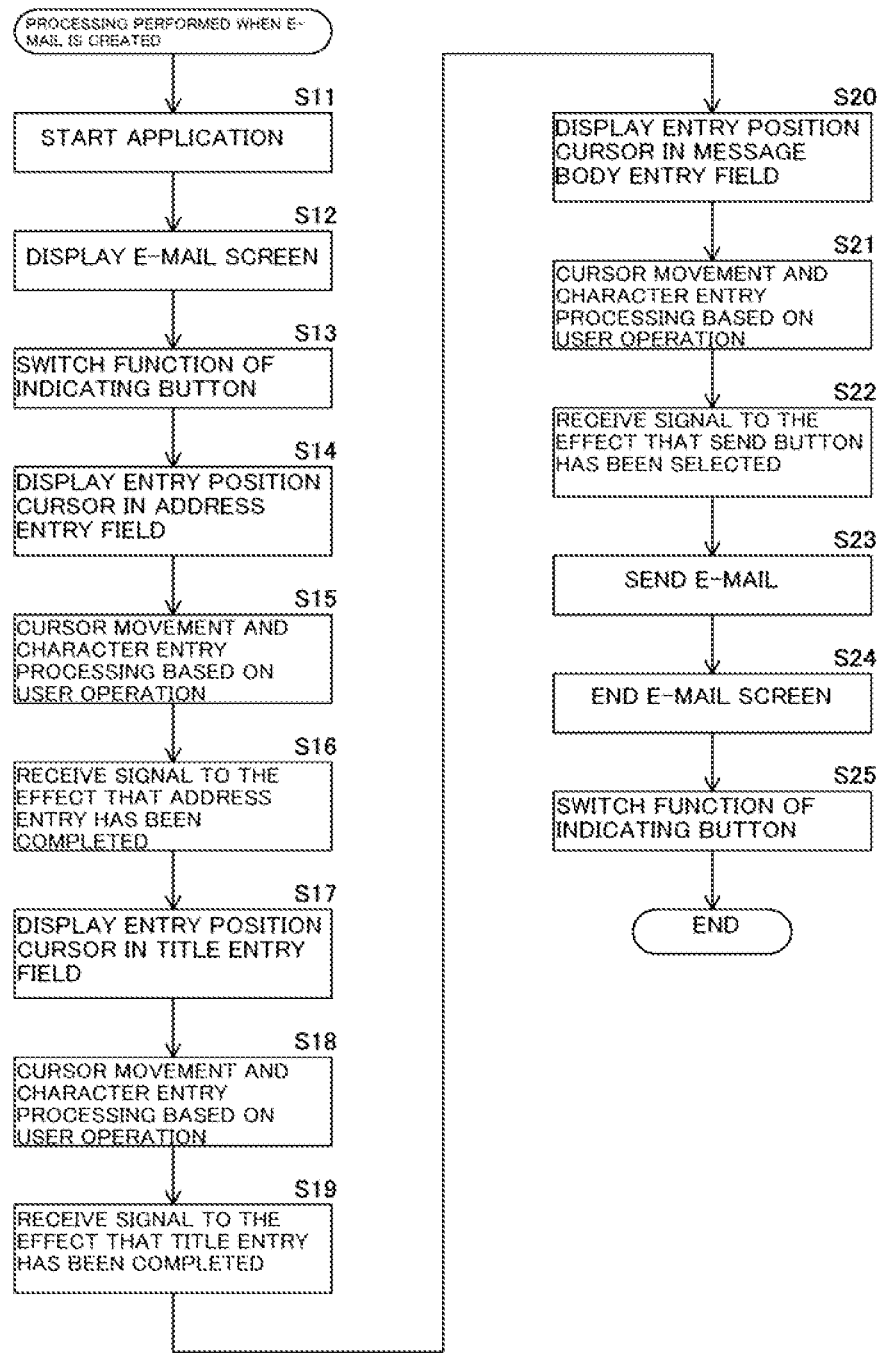
FIG. 9 is a flowchart for explaining the procedure that is performed when e-mail is created.
Figure 10:
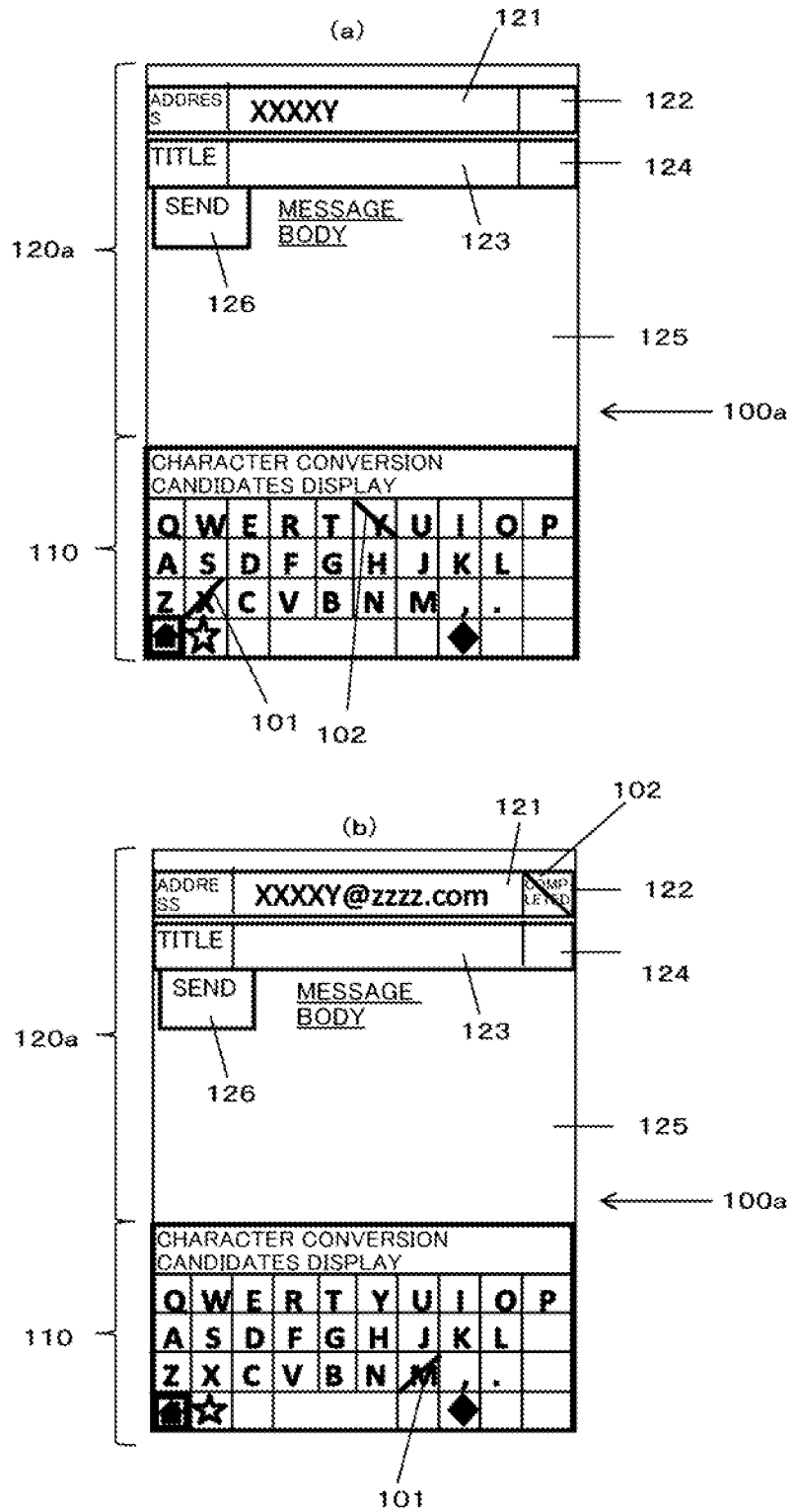
FIG. 10 is a diagram for explaining the procedure of operation on an e-mail sending and creation screen that is performed when e-mail is created.

Next, the procedure that is performed when the user performs character entry by operating the first indicating button 20 and the second indicating button 30 will be described. Here, as a specific example, the procedure that is performed when e-mail is created will be described. FIG. 9 is a flowchart for explaining the procedure that is performed when e-mail is created. FIGS. 10 to 12 are diagrams for explaining the procedure of operation on the e-mail sending and creation screen that is performed when e-mail is created.

First, the user selects an icon of an application program of e-mail on the application screen. When receiving a signal to the effect that the icon has been selected, the control means 60 starts the application program (S11) and displays an e-mail sending and creation screen 100a depicted in FIG. 10(a) on the display of the display means 10 (S12). The e-mail sending and creation screen 100a includes the keyboard screen 110 and a message creation display screen 120a as the entered character display screen. The message creation display screen 120a has an address entry field 121, an address entry completion button 122, a title entry field 123, a title entry completion button 124, a message body entry field 125, and a send button 126. The address entry field 121 is a field in which an e-mail address of the party at the other end to which e-mail is sent entered. The address entry completion button 122 is a button for indicating the completion of the entry in the address entry field 121. The title entry field 123 is a field in which a title of e-mail is entered. The title entry completion button 124 is a button for indicating the completion of the entry in the title entry field 123. Moreover, the message body entry field 125 is a field in which a message body of e-mail is entered. The send button 126 is a button for giving an instruction to send e-mail. Incidentally, in FIGS. 10 to 12, the address entry completion button 122 is provided near the address entry field 121 and the title entry completion button 124 is provided near the title entry field 123, but these completion buttons 122 and 124 may be provided on the keyboard screen 110.

When the e-mail sending and creation screen 100a is displayed on the display of the display means 10 as a result of the processing in step S12 described above, the control means 60 sets a flag indicating that the first indicating button 20 and the second indicating button 30 are made to function as the cursor operation button. As a result, the first indicating button 20 and the second indicating button 30 function as the cursor operation button (S13).

Moreover, when the e-mail sending and creation screen 100a is displayed on the display of the display means 10, the control means 60 causes an entry position cursor (not depicted in the drawing) to be displayed in the address entry field 121 (S14). The entry position cursor indicates a field on which character entry can be performed and the entry position of a character. As depicted in FIG. 10(a), the user enters an e-mail address in the address entry field 121 by operating the first indicating button 20 and the second indicating button 30. Then, the control means 60 performs cursor movement and character entry processing that controls the movement of the first cursor 101 and the second cursor 102 and the entry of a character based on the signals from the first indicating button 20 and the second indicating button 30 (S15). When finishing the entry in the address entry field 121, as depicted in FIG. 10(b), the user selects the address entry completion button 122 by, for example, moving the second cursor 102 to the position of the address entry completion button 122 and pressing the selection indicating section 32 of the second indicating button 30. When receiving a signal to the effect that the address entry completion button 122 has been selected (S16), the control means 60 causes the entry position cursor to be displayed in the title entry field 123 (S17). As a result, the field on which character entry can be performed is switched from the address entry field 121 to the title entry field 123.

Next, the user enters a title in the title entry field 123 by operating the first indicating button 20 and the second indicating button 30 as depicted in FIG. 11(a). Then, the control means 60 performs the cursor movement and character entry processing based on the signals from the first indicating button 20 and the second indicating button 30 (S18). When finishing the entry in the title entry field 123, the user selects the title entry completion button 124 by, for example, moving the second cursor 102 to the position of the title entry completion button 124 and pressing the selection indicating section 32 of the second indicating button 30 as depicted in FIG. 11(b). When receiving the signal to the effect that the title entry completion button 124 has been selected (S19), the control means 60 causes the entry position cursor to be displayed in the message body entry field 125 (S20). As a result, the field on which character entry can be performed is switched from the title entry field 123 to the message body entry field 125.

Then, the user enters a message body of e-mail in the message body entry field 125 by operating the first indicating button 20 and the second indicating button 30 as depicted in FIG. 12(a). At this time, the control means 60 performs the cursor movement and character entry processing based on the signals from the first indicating button 20 and the second indicating button 30 (S21). When finishing the entry in the message body entry field 125, the user selects the send button 126 by, for example, moving the first cursor 101 to the position of the send button 126 and pressing the selection indicating section 22 of the first indicating button 20 as depicted in FIG. 12(b). When receiving the signal to the effect that the send button 126 has been selected (S22), the control, means 60 performs processing to send the e-mail (S23), ends the e-mail sending and creation screen 100*a* (S24), and causes a predetermined screen other than the character entry screen to be displayed. As a result, the control means 60 clears the flag indicating that the first indicating button 20 and the second indicating button 30 are made to function as the cursor operation button. Then, the first indicating button 20 and the second indicating button 30 function as the screen display indicating button (S25).

Figure 13:
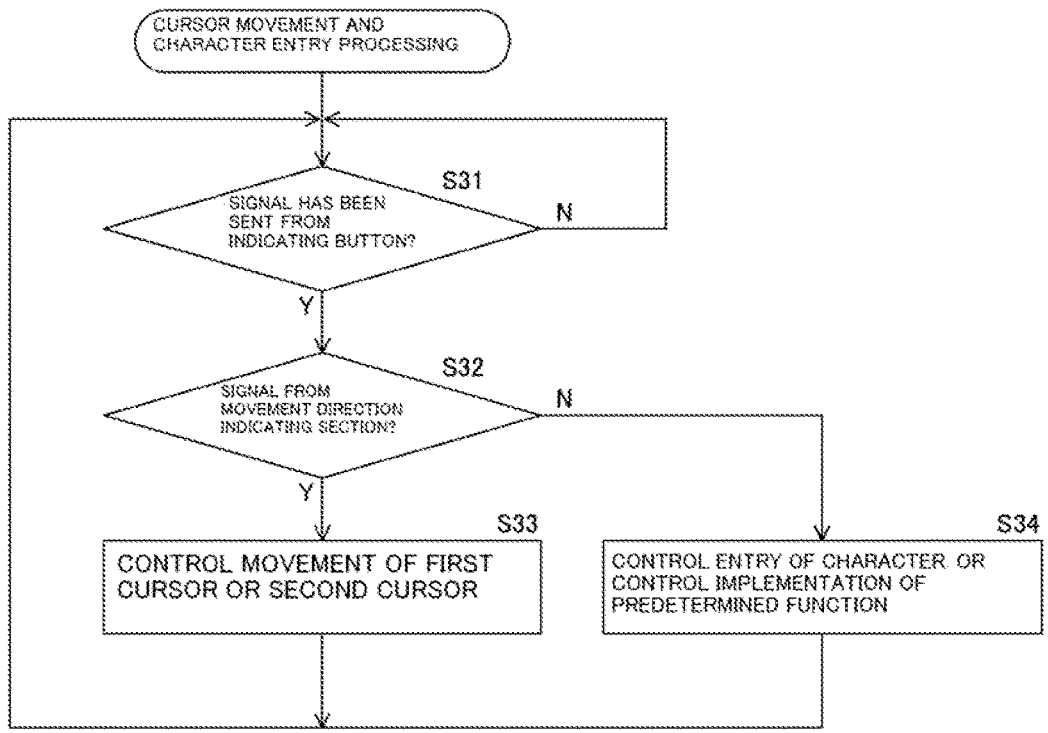
FIG. 13 is a flowchart for explaining the procedure of cursor movement and character entry processing that is performed by a control means.

Next, the procedure of the cursor movement and character entry processing that is performed by she control means 60 will be described. FIG. 13 is a flowchart for explaining the procedure of the cursor movement and character entry processing that is performed by the control means 60. Here, a case where the user enters a character by operating the first indicating button 20 and the second indicating button 30 will be considered.

First, the control means 60 determines whether or not a signal from the first indicating button 20 or a signal from the second indicating button 30 has been sent thereto (S31). If the control means 60 determines that the signal has been sent thereto, the control means 60 determines whether the signal is a signal from the movement direction indicating section 21 or 31 or a signal from the selection indicating section 22 or 32 (S32).

If the control means 60 determines that the signal is a signal from the movement direction indicating section 21 or 31 in the processing in step S32, the control means 60 controls the movement of the first cursor 101 or the second cursor 102 based on the signal (S33). Specifically, if the signal concerning the direction of movement of the first cursor 101 has been sent from the movement, direction indicating section 21 of the first indicating button 20, the control means 60 controls the movement of the first cursor 101 on the character entry screen 100 based on the signal; if the signal concerning the direction of movement of the second cursor 102 has been sent from the movement direction indicating section 31 of the second indicating button 30, the control means 60 controls the movement of the second cursor 102 on the character entry screen 100 based on the signal.

On the other hand, if the control means 60 determines that the signal is a signal from the selection indicating section 22 or 32 in the processing in step S32, the control means 60 controls the entry of a character and performs processing to implement a predetermined function based on the signal (S34). Specifically, if the signal concerning the selection of the character key currently indicated by the first cursor 101 has been sent from the selection indicating section 22 of the first indicating button 20 or the signal concerning the selection of the character key currently indicated by the second cursor 102 has been sent from the selection indicating section 32 of the second indicating button 30, the control means 60 causes a character related to the character key to be displayed in a position currently indicated by the entry position cursor.

Moreover, if the signal concerning the selection of the function key currently indicated by the first cursor 101 has been sent from the selection indicating section 22 of the first indicating button 20 or the signal concerning the selection of the function key currently indicated by the second cursor 102 has been sent from the selection indicating section 32 of the second indicating button 30, the control means 60 performs processing to implement the function provided to the function key. For example, when the function key is the Space key, if an entered character in an unconfirmed state is located in the position indicated by the entry position cursor, the control means 60 performs conversion on the entered character in an unconfirmed state and causes the converted character to be displayed in the character conversion candidate displaying section 115. Here, the entered character in an unconfirmed state is underlined, for example. Moreover, when the function key is the Enter key, if an entered character in an unconfirmed state is located in the position indicated by the entry position cursor, the control means 60 confirms that the entered character in an unconfirmed state is the character displayed in the character conversion candidate displaying section 115. Furthermore, when the signals have been sent concurrently from the selection indicating section 22 of the first indicating button 20 and the selection indicating section 32 of the second indicating button 30, if an entered character in an unconfirmed state is located in the position indicated by the entry position cursor, the control means 60 performs conversion on the entered character in an unconfirmed state and causes the converted character to be displayed in the character conversion candidate displaying section 115. Then, when the signal has been sent from any one of the first indicating button 20 and the second indicating button 30 two times in a row or the signals have been sent concurrently from the selection indicating section 22 of the first indicating button 20 and the selection indicating section 32 of the second indicating button 30 two times in a row, if an entered character in an unconfirmed state is located in the position indicated by the entry position cursor, the control means 60 confirms that the entered character in an unconfirmed state is the character displayed in the character conversion candidate displaying section 115.

In the portable terminal of this embodiment, the first cursor and the second cursor are displayed on the character entry screen, and the first indicating button for indicating the direction of movement and the like of the first cursor and the second indicating button for indicating the direction of movement and the like of the second cursor are provided in predetermined places of the portable terminal. As a result, since the use holds the periphery of a portion of the portable terminal in which the first indicating button is provided and the periphery of a portion of the portable terminal in which the second indicating button is provided with his/her respective hands at the time of character entry, the user can hold the portable terminal stably with both hands. Moreover, since the user can operate the first indicating button and the second indicating button by using the thumbs of his/her respective hands in a state in which the user holds the portable terminal with both hands in this manner, the user can perform entry operation accurately and quickly. Furthermore, by performing character entry by using the two indicating buttons, as compared to a case where a character is entered by use of a finger on the touch panel, it is possible to reduce errors in entry.

Moreover, in the portable terminal of this embodiment, the first cursor and the second cursor differ from each other in at least one of the elements: a shape, a color, a line drawn on the inside, and a pattern. This makes it possible for the user to determine easily whether each cursor displayed on the character entry screen corresponds to the first indicating button or the second indicating button based on the different element.

Furthermore, in the portable terminal of this embodiment, when controlling the movements of the first cursor and the second cursor on the keyboard screen, the cursor movement control means can move the cursors in a key unit. As a result, since the user can easily and accurately perform operation to move each cursor to the position of an intended key on the keyboard screen, it is possible to reduce errors in operation.

In addition, in the portable terminal of this embodiment, when a screen other than the character entry screen is displayed on the display of the display means, the first indicating button and the second indicating button are used as the screen display indicating button for giving an instruction to display a predetermined screen. As a result, there is no need to provide extra screen display indicating buttons such as a "menu button" and a "Back button." in addition to the first indicating button and the second indicating button.

Incidentally, in the portable terminal of this embodiment, as described above, the user performs character entry by moving the two cursors by operating the first indicating button and the second indicating button and selecting a key of the keyboard screen by using the two cursors. As a result, it is possible to make the display range of the keyboard screen smaller on the display of the display means. This is because, since a key is selected by using the two cursors, even when the display range of the keyboard screen is made smaller, there is no possibility that it becomes difficult to enter a character and the number of errors in entry is increased. By making the display range of the keyboard screen smaller, it is possible to make larger the display range of a screen other than the keyboard screen in the character entry screen. Moreover, in place of making the display range of the keyboard screen smaller, it is also possible to display a screen provided with more keys as the keyboard screen by making the display range of each key of the keyboard screen smaller. That is, in the portable terminal of this embodiment, as the keyboard screen that is displayed in the character entry screen, a various types of keyboard screens can be adopted.

Figure 14:
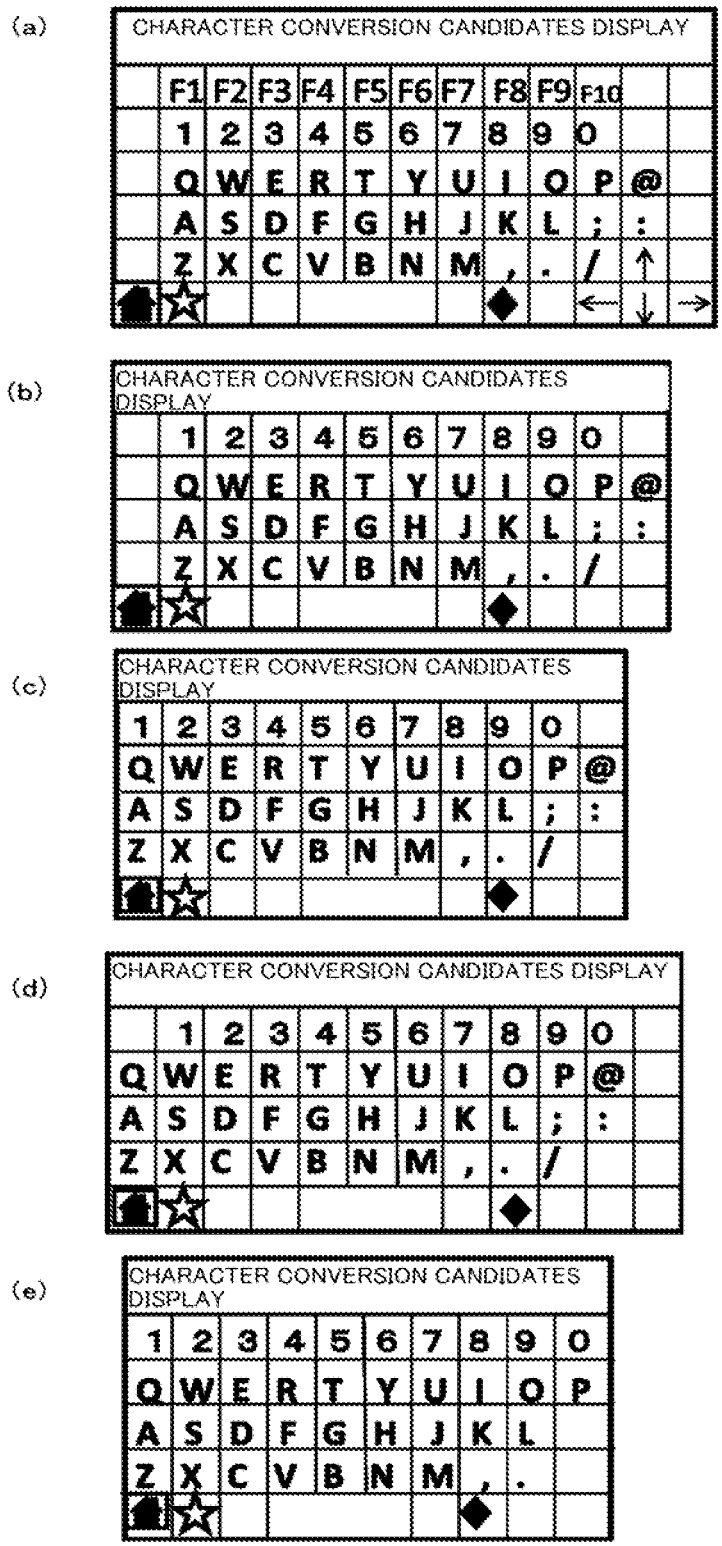
FIG. 14 is a diagram depicting examples of a QWERTY keyboard screen that is displayed when a kanji hiragana character entry mode is selected.
Figure 16:
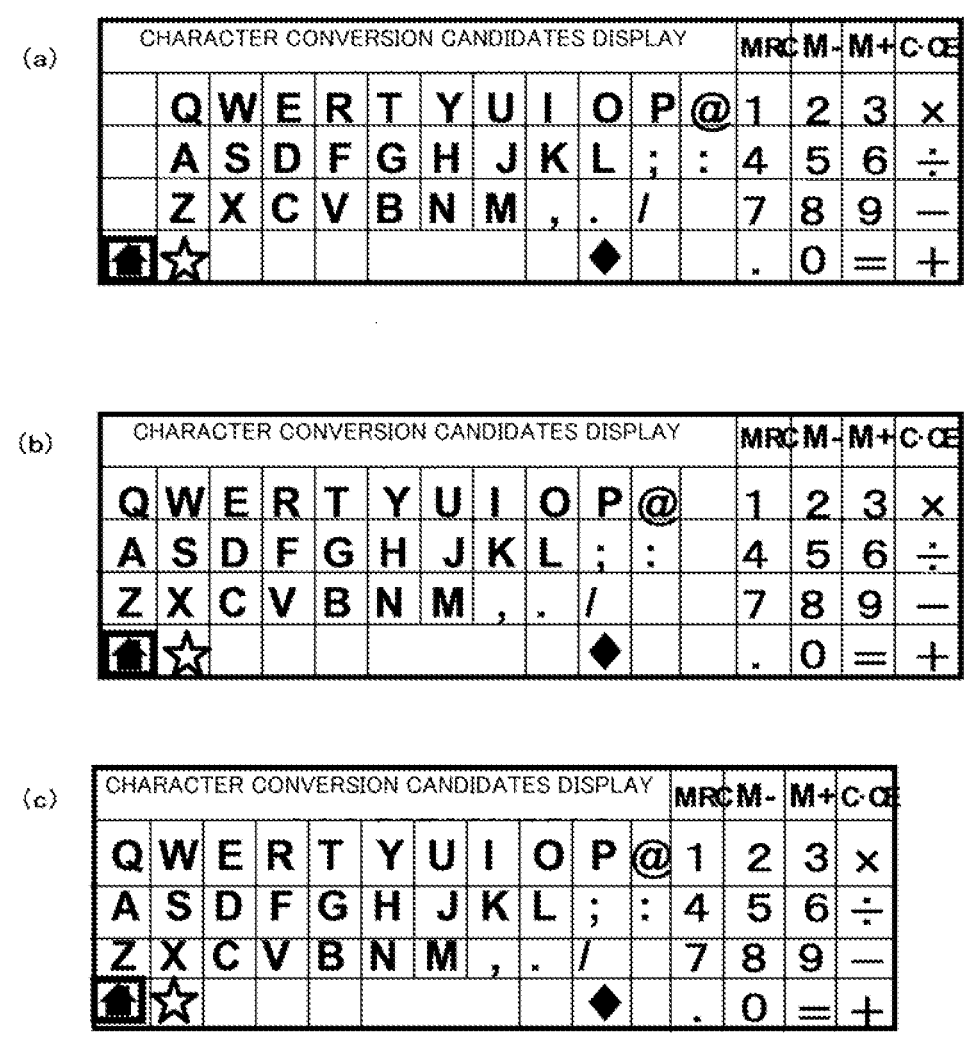
Figure 17:
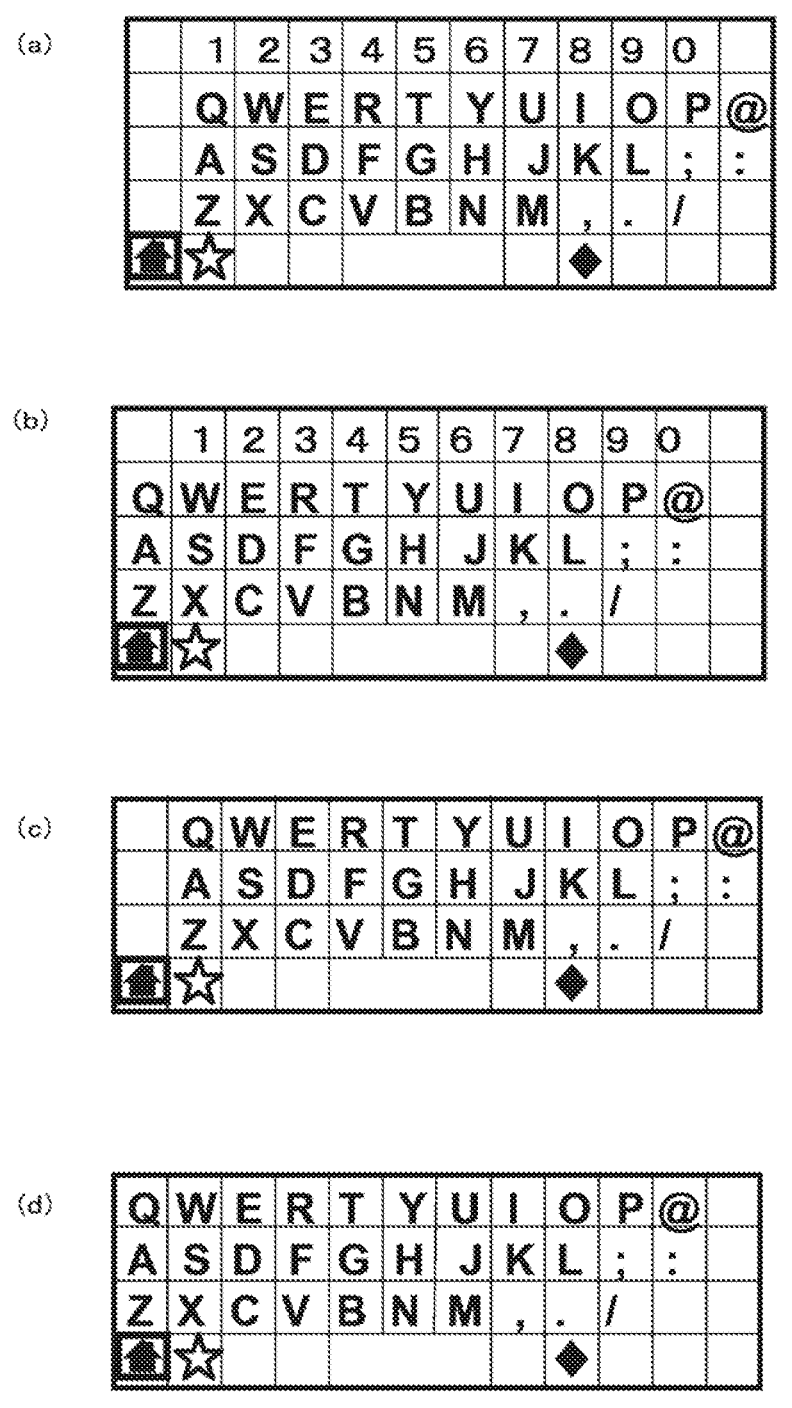
Figure 18:
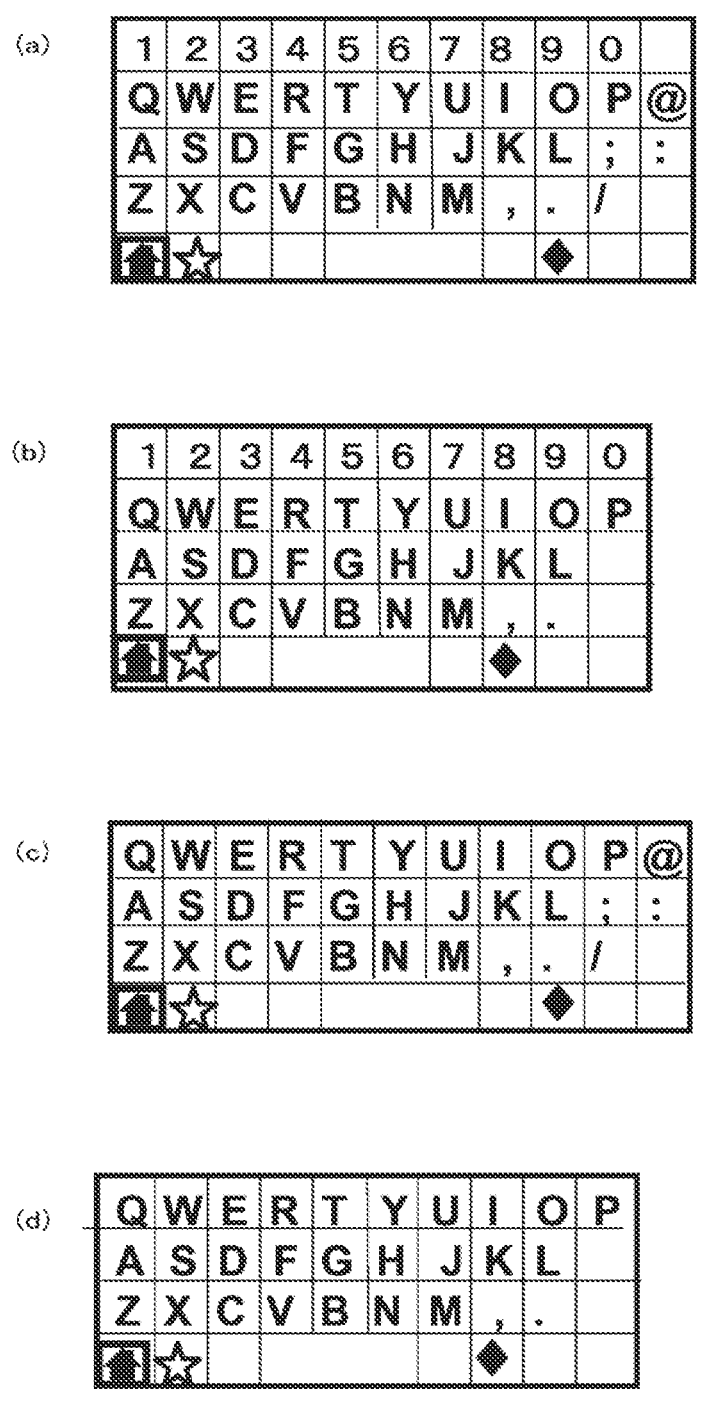
Figure 20:
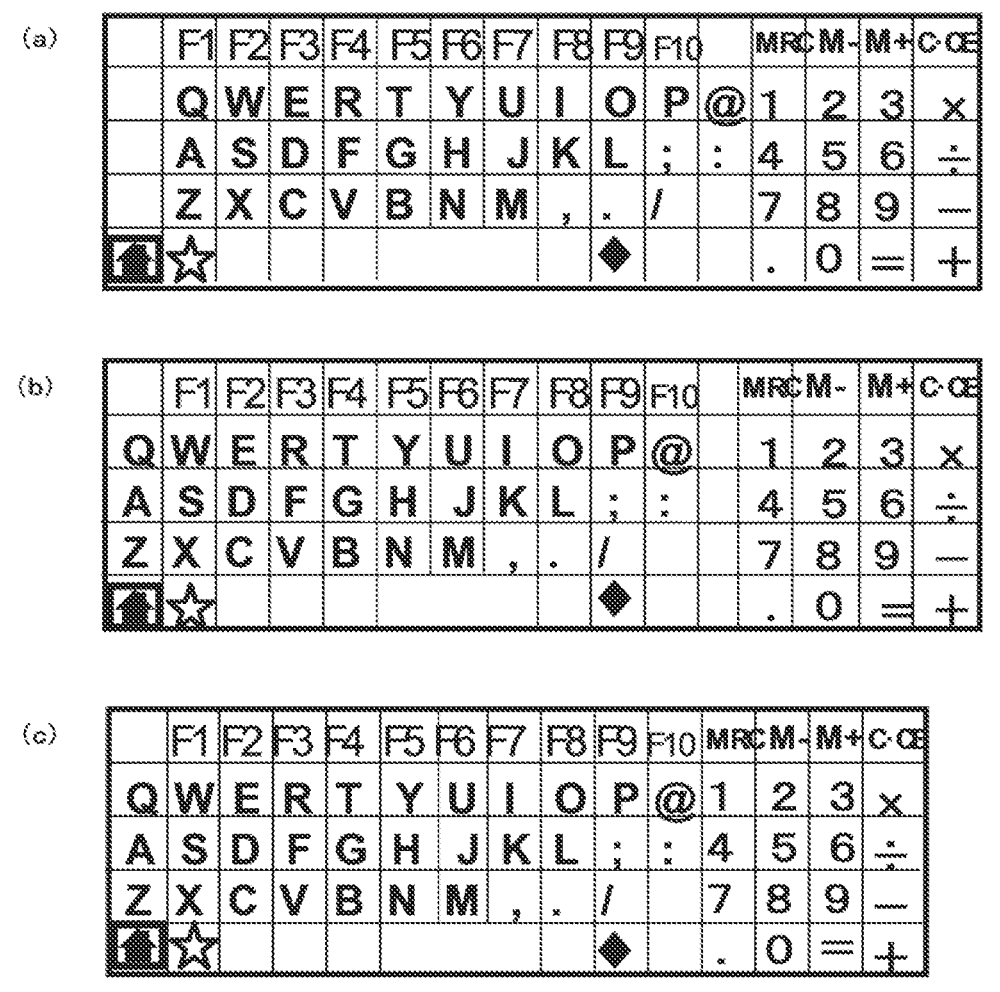

Now, specific examples of the keyboard screen that can be used in the portable terminal of this embodiment are depicted in FIGS. 14 to 21. FIGS. 14 to 20 are diagrams depicting examples of the QWERTY keyboard screen. Of these examples, FIGS. 14 to 16 are diagrams depicting examples of the keyboard screen that is displayed when the kanji hiragana character entry mode is selected, and FIGS. 17 to 20 are diagrams depicting examples of the keyboard screen that is displayed when the English half-width character entry mode is selected. Here, on the keyboard screen that is displayed when the English half-width character entry mode is selected, unlike the keyboard screen that is displayed when the kanji hiragana character entry mode is selected, the character conversion candidate displaying section 115 is not displayed. Moreover, FIG. 21 is a diagram depicting an example of the 50-character hiragana syllabary layout keyboard screen. As described above, as the keyboard screen, it is possible to use not only a keyboard screen with a simple key configuration but also a keyboard screen with a full keyboard configuration, the keyboard screen provided with a function key, a numerical keypad, and so forth.

Incidentally, the present invention is not limited to the embodiment described above and can be modified in various ways within the scope of the spirit thereof.

Figure 22:
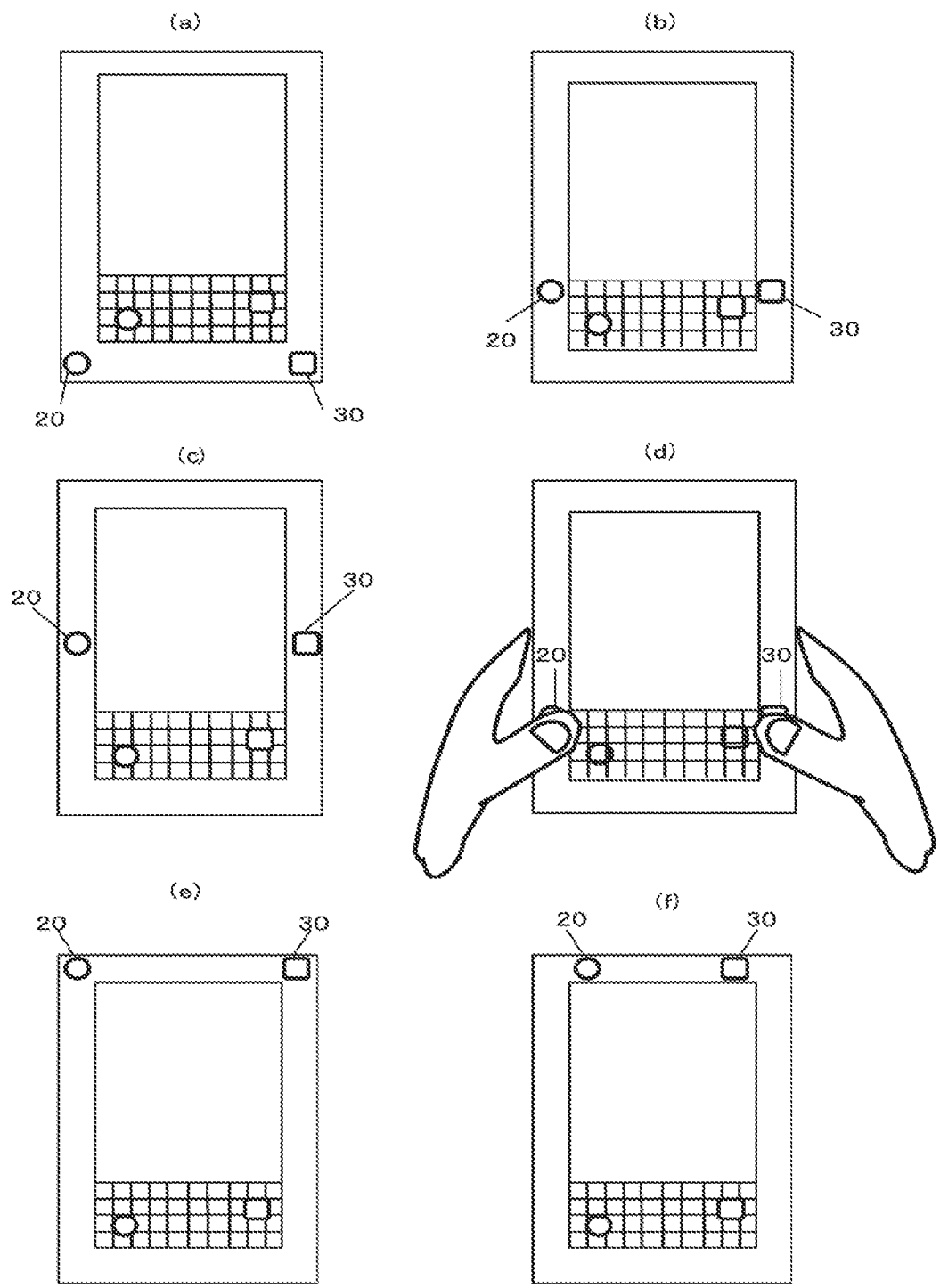
FIG. 22 is a diagram depicting specific examples in which the first indicating button and the second indicating button are disposed on the front side of the portable terminal.
Figure 23:
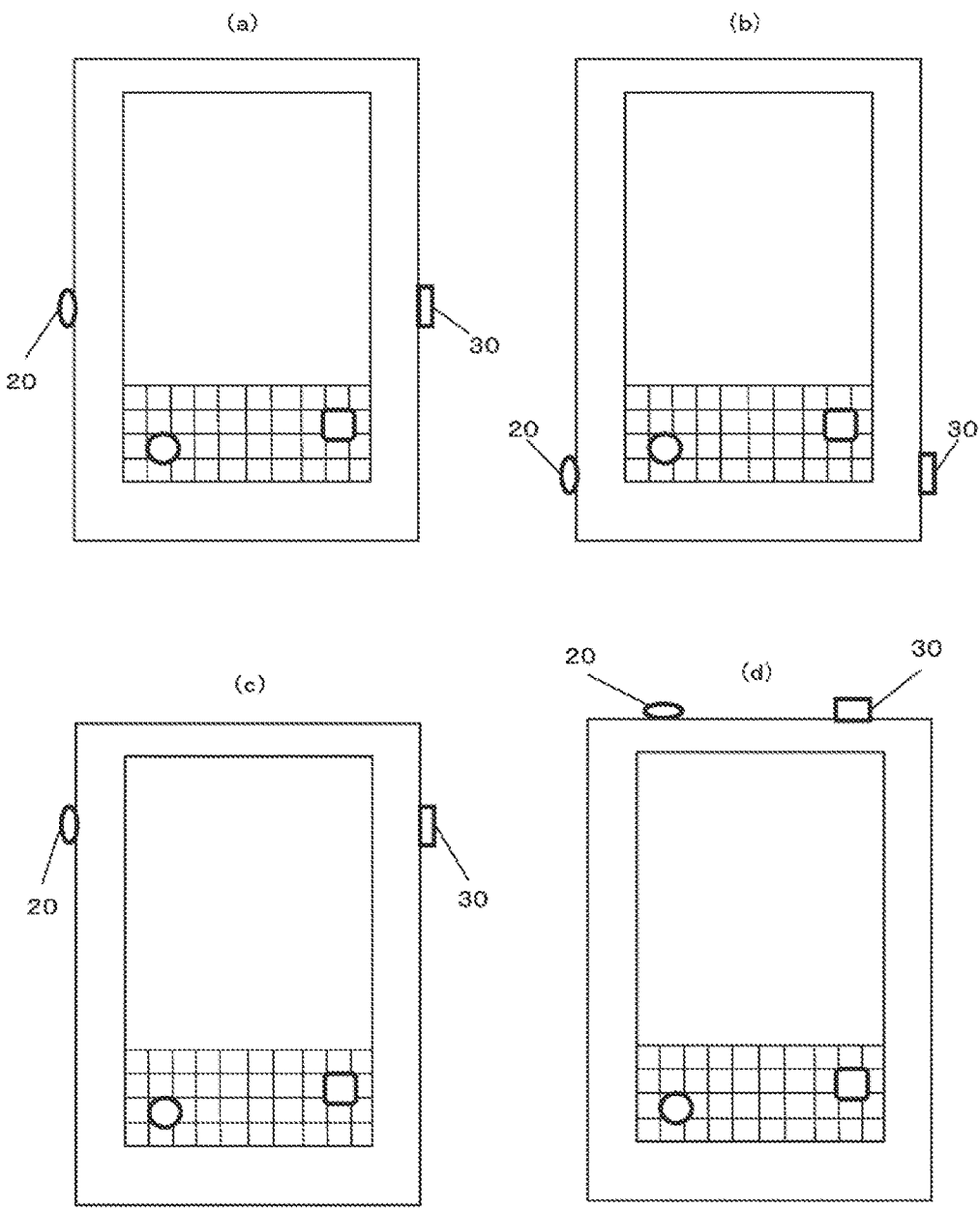
FIG. 23 is a diagram depicting specific examples in which the first indicating button and the second indicating button are disposed on the lateral side of the portable terminal.
Figure 24:
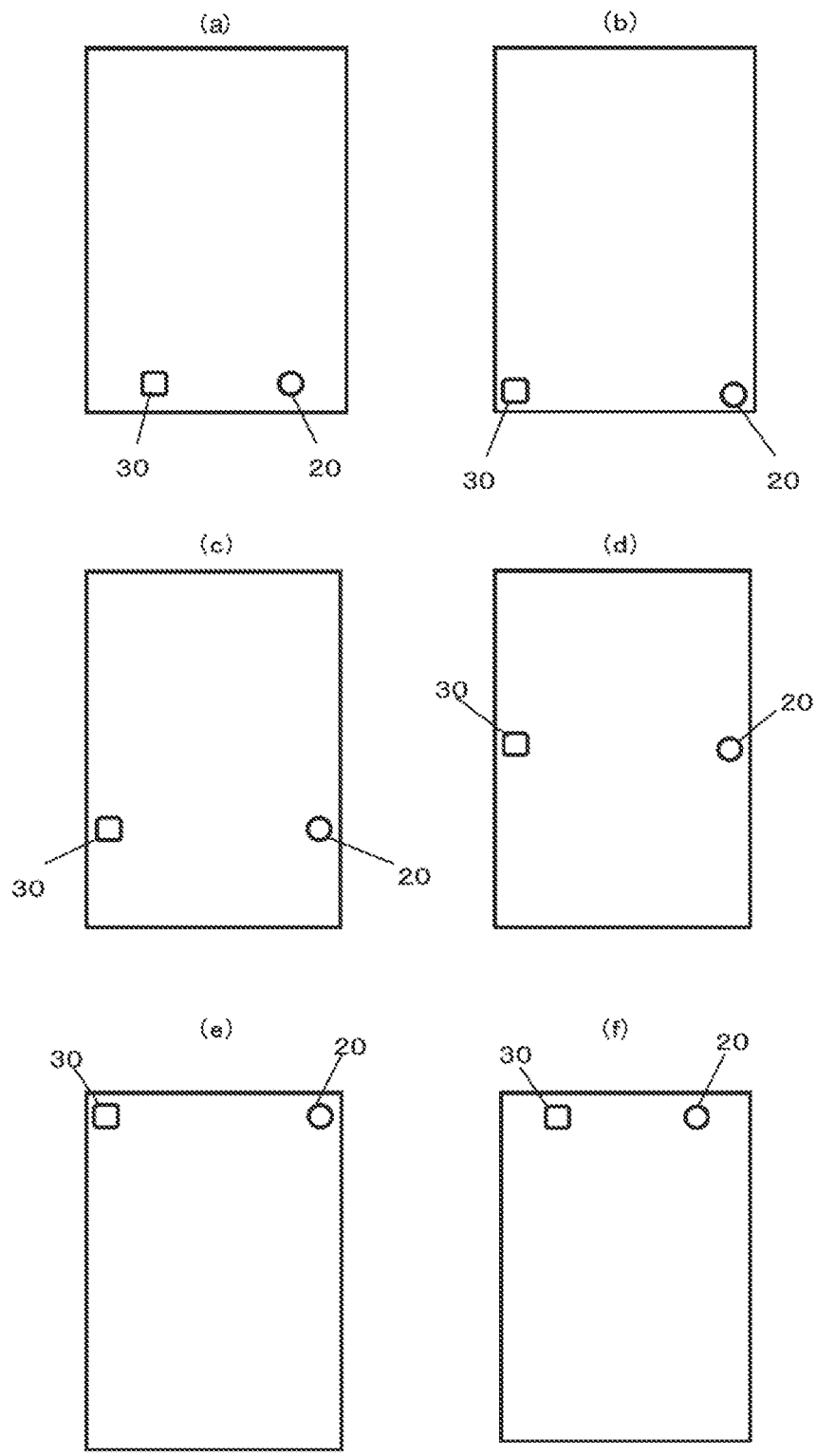
FIG. 24 is a diagram depicting specific examples in which the first indicating button and the second indicating button are disposed on the back side of the portable terminal.

For example, in the embodiment described above, a case where the first indicating button 20 and the second indicating button 30 are disposed on left and right at the lower edge on the front side of the portable terminal as depicted in FIG. 1 has been described, but the first indicating button 20 and the second indicating button 30 may be provided in predetermined places on the front side, the lateral side, or the back side of the portable terminal. FIG. 22 is a diagram depicting specific examples in which the first indicating button 20 and the second indicating button 30 are disposed on the front side of the portable terminal. In FIG. 22 (*a*), the first indicating button 20 and the second indicating button 30 are provided at lower left and right corners, respectively, on the front side of the portable terminal. In FIGS. 22 (*b*) and (*c*), the first indicating button 20 and the second indicating button 30 are provided at left and right, edges, respectively, on the front side of the portable terminal. Here, how the portable terminal depicted in FIG. 22(*b*) looks when the portable terminal, is held with both hands is depicted in FIG. 22(*d*). In FIGS. 22(*e*) and (*f*), the first indicating button 20 and the second indicating button 30 are provided at the upper edge on the front side of the portable terminal. Moreover, FIG. 23 is a diagram depicting specific examples in which the first indicating button 20 and the second indicating button 30 are disposed on the lateral side of the portable terminal in FIGS. 23(*a*), (*b*), and (*c*), the first indicating button 20 and the second indicating button 30 are provided on the left and right lateral sides, respectively, of the portable terminal. In FIG. 23(*d*), the first indicating button 20 and the second indicating button 30 are provided on left and right on the upper lateral side of the portable terminal. Furthermore, FIG. 24 is a diagram depicting specific examples in which the first indicating button 20 and the second indicating button 30 are disposed on the back side of the portable terminal. In FIG. 24 (*a*), the first indicating button 20 and the second indicating button 30 are provided on right and left at the lower edge on the back side of the portable terminal. In FIG. 24 (*b*), the first indicating button 20 and the second indicating button 30 are provided at lower right and left corners, respectively, on the back side of the portable terminal. In FIGS. 24(*c*) and (*d*), the first indicating button 20 and the second indicating button 30 are provided at right and left edges, respectively, on the back side of the portable terminal. In FIGS. 24(*e*) and (*f*), the first indicating button 20 and the second indicating button 30 are provided at the upper edge on the back side of the portable terminal. Here, in these examples, the first indicating button 20 and the second indicating button 30 are disposed symmetrically. However, when the first indicating button 20 and the second indicating button 30 are disposed on the back side of the portable terminal, if the movement, direction indicating section of the first indicating button 20 is pressed upward, downward, leftward, or rightward, or other directions when viewed from the front side (the display side) of the portable terminal, the first cursor 101 corresponding to the indicating button moves, on the character entry screen 100, in the direction in which the movement direction indicating section of the first indicating button 20 is pressed. The same goes for the second indicating button 30. Incidentally, when the first indicating button 20 and the second indicating button 30 are disposed on the lateral side or the back side of the portable terminal, the user usually operates the indicating buttons 20 and 30 by using fingers, such as index fingers, other than thumbs.

Figure 25:
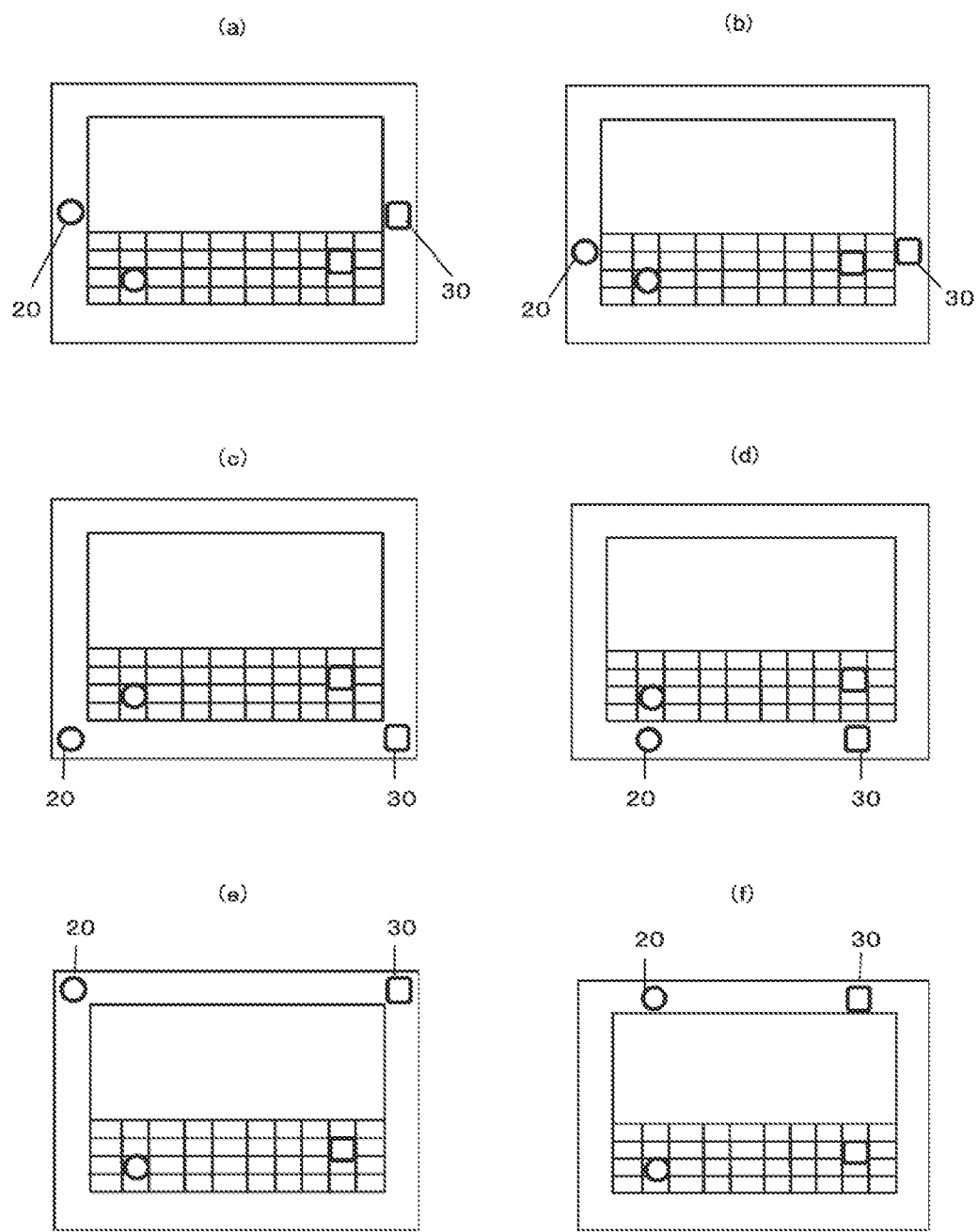
FIG. 25 is a diagram depicting specific examples in which the first indicating button and the second indicating button are disposed on the front side of a portable terminal when the entry of a character is performed with the portable terminal being brought to a horizontally-oriented state.
Figure 26:
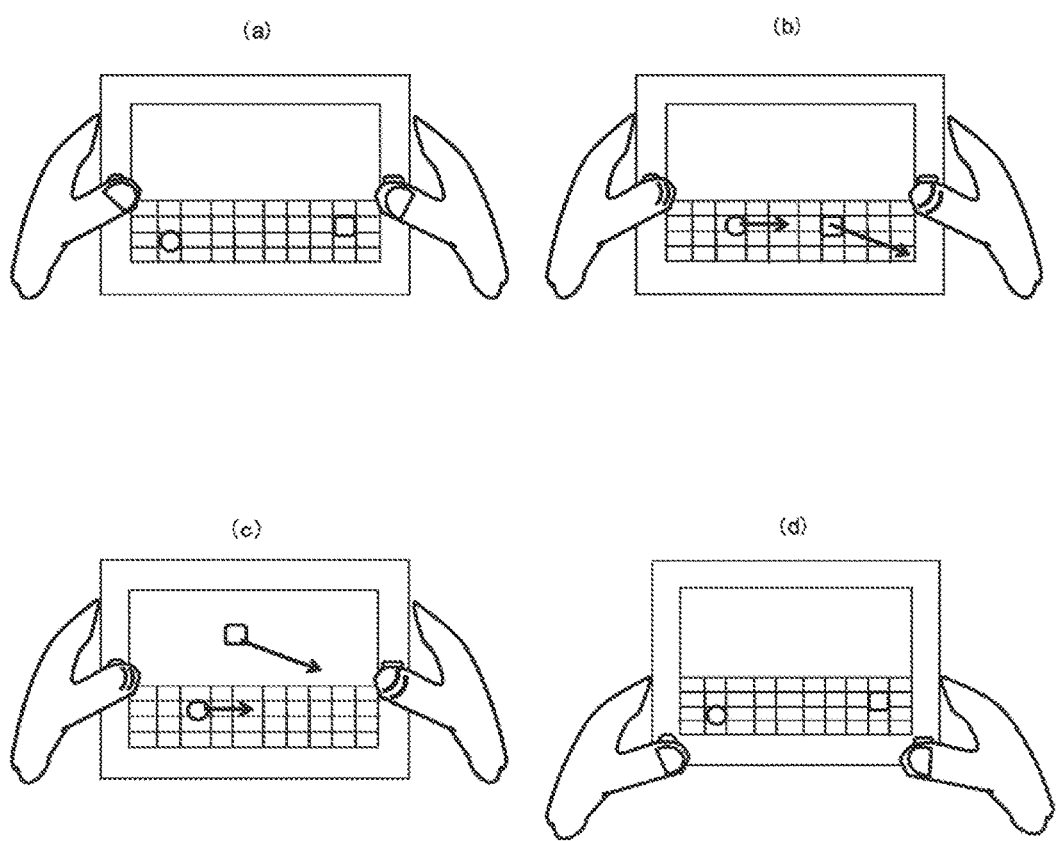
FIG. 26 is a diagram depicting how the portable terminal depicted in FIG. 25 looks when the portable terminal is held with both hands.
Figure 27:
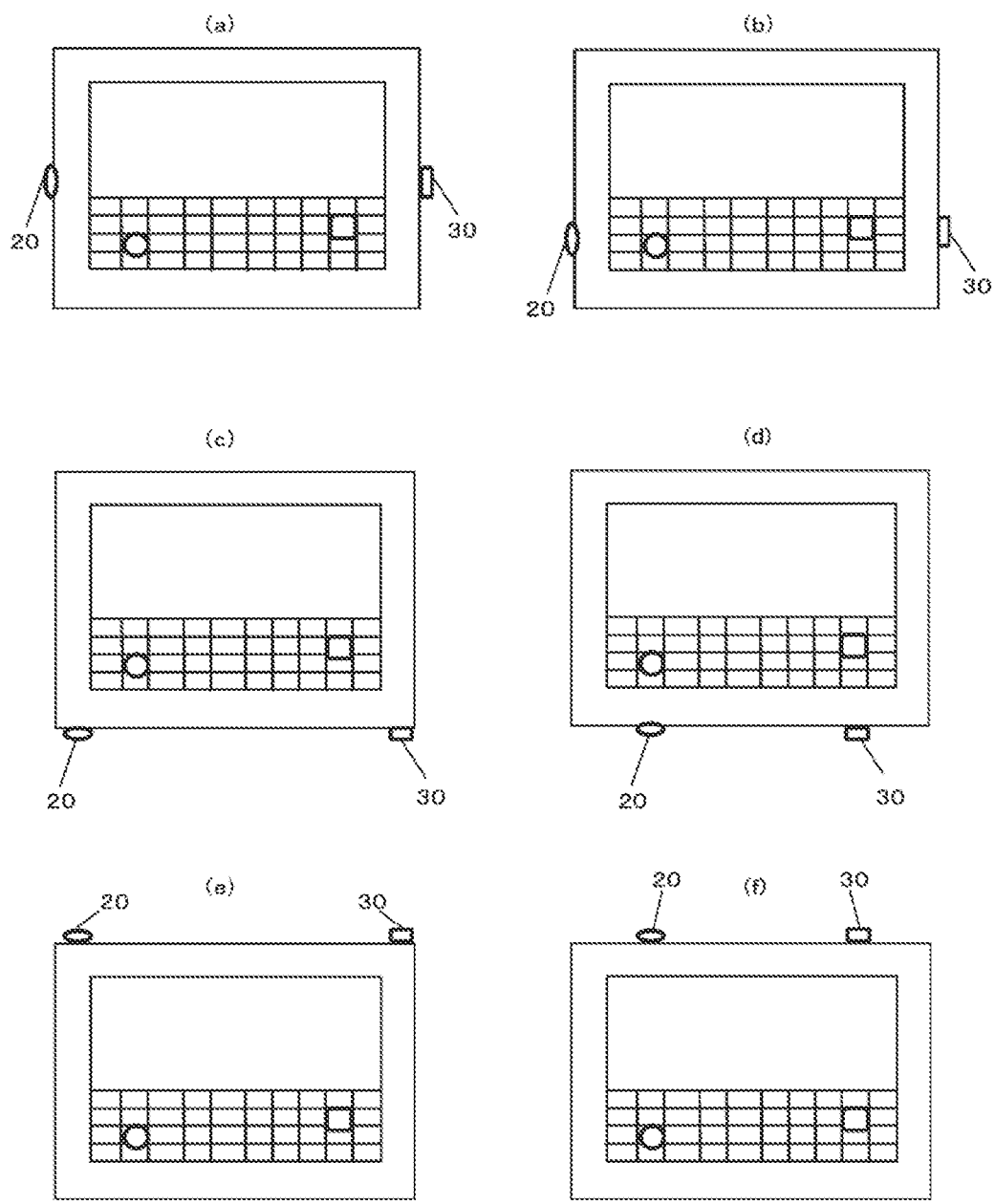
FIG. 27 is a diagram depicting specific examples in which the first indicating button and the second indicating button are disposed on the lateral side of the portable terminal when the entry of a character is performed with the portable terminal being brought to a horizontally-oriented state.
Figure 28:
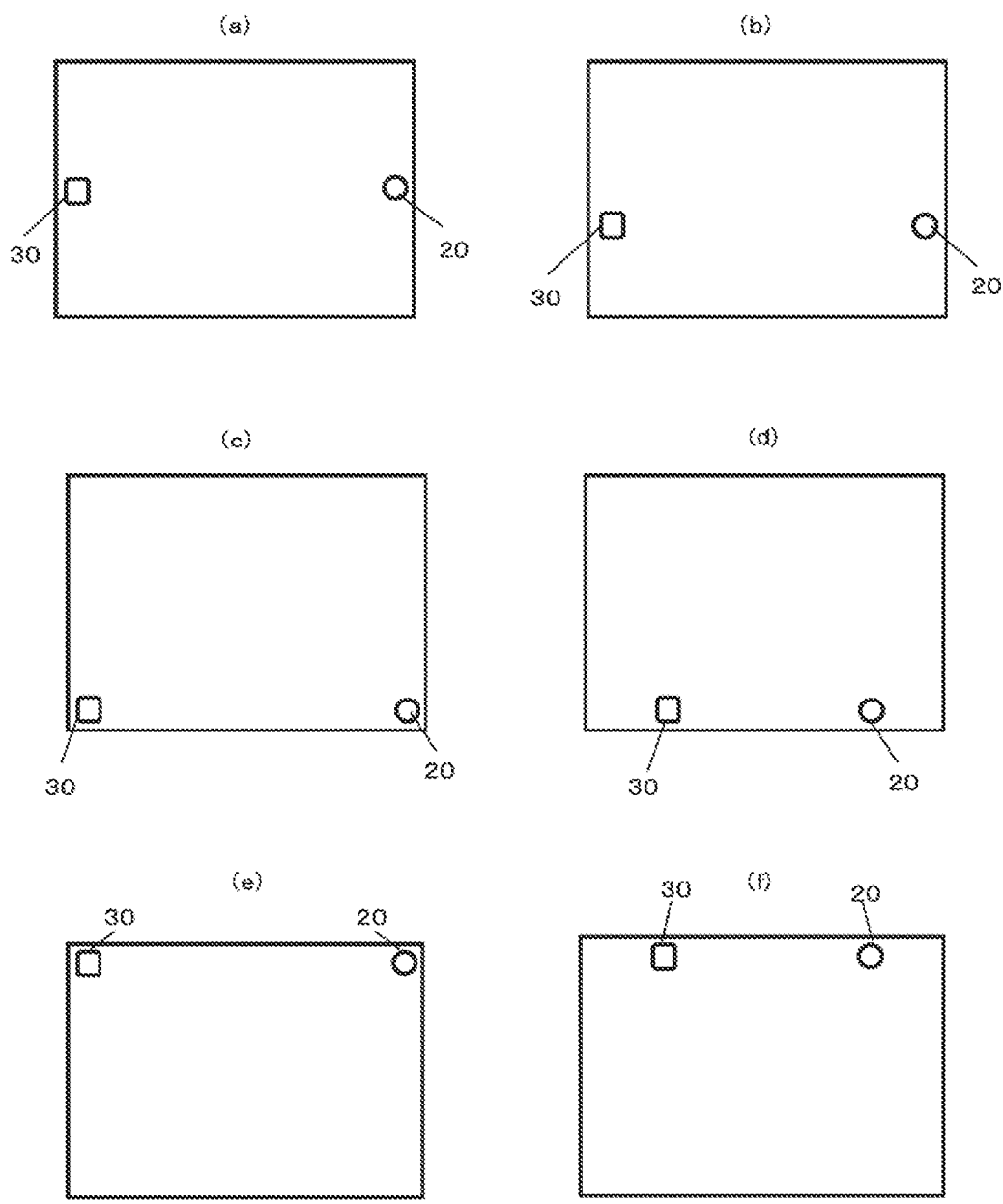
FIG. 28 is a diagram depicting specific examples in which the first indicating button and the second indicating button are disposed on the back side of the portable terminal when the entry of a character is performed with the portable terminal being brought to a horizontally-oriented state.

Moreover, in the embodiment described above, a case where the character entry screen 100 is displayed on the display of the display means 10 in a vertically-oriented state and the user performs the entry of a character by bringing the portable terminal to a vertically-oriented state has been described; when the character entry screen 100 is displayed on the display of the display means 10 in a horizontally-oriented state, it is necessary simply to provide the first indicating button 20 and the second indicating button 30 in positions that allow the portable terminal to be held stably when the entry of a character is performed with the portable terminal, being brought to a horizontally-oriented state. Also in this case, the first indicating button 20 and the second indicating button 30 can be provided in predetermined places on the front side, the lateral side, or the back side of the portable terminal. FIG. 25 is a diagram depicting specific examples in which the first indicating button 20 an the second indicating button 30 are disposed on the front side of the portable terminal when the entry of a character is performed with the portable terminal, being brought to a horizontally-oriented state. In FIGS. 25(*a*) and (*b*), the first indicating button 20 and the second indicating button 30 are provided at left and right edges, respectively, on the front side of the portable terminal. Here, how the portable terminal depicted in FIG. 25 (*a*) looks when the portable terminal is held with both hands is depicted in FIGS. 26(*a*) to (*c*). In FIG. 25(*c*), the first indicating button 20 and the second indicating button 30 are provided at lower left and right corners, respectively, on the front side of the portable terminal. How the portable terminal depicted in FIG. 25(*c*) looks when the portable terminal is held with both hands is depicted in FIG. 26(*d*). In FIG. 25(*d*), the first indicating button 20 and the second indicating button 30 are provided on left and right at the lower edge on the front side of the portable terminal. In FIGS. 25(*e*) and (*f*), the first indicating button 20 and the second indicating button 30 are provided at the upper edge on the front side of the portable terminal. Moreover, FIG. 27 is a diagram depicting specific examples in which the first indicating button 20 and the second indicating button are disposed on the lateral side of the portable terminal when the entry of a character is performed with the portable terminal being brought to a horizontally-oriented state. In FIGS. 27(*a*) and (*b*), the first indicating button 20 and the second indicating button 30 are provided on the left and right lateral sides, respectively, of the portable terminal. In FIGS. 27(*c*) and (*d*), the first indicating button 20 and the second indicating button 30 are provided on left and right, on the lower lateral side of the portable terminal. In FIGS. 27 (*e*) and (*f*), the first indicating button 20 and the second indicating button 30 are provided on the upper lateral side of the portable terminal. Furthermore, FIG. 28 is a diagram depicting specific examples in which the first indicating button 20 and the second indicating button 30 are disposed on the back side of the portable terminal when the entry of a character is performed with the portable terminal being brought to a horizontally-oriented state. In FIGS. 28 (*a*) and (*b*), the first indicating button 20 and the second indicating button 30 are provided at the right and left edges, respectively, on the back side of the portable terminal. In FIG. 28 (*c*), the first indicating button 20 and the second indicating button 30 are provided at lower right and left corners, respectively, on the back side of the portable terminal. In FIG. 28(*d*), the first indicating button 20 and the second indicating button 30 are provided on right and left at the lower edge on the back side of the portable terminal. In FIGS. 28 (*e*) and (*f*), the first indicating button 20 and the second indicating button 30 are provided at the upper edge on the back side of the portable terminal. Here, in these examples, the first indicating button 20 and the second indicating button 30 are disposed symmetrically. However, when the first indicating button 20 and the second indicating button 30 are disposed on the back side of the portable terminal, if the movement direction indicating section of the first indicating button 20 is pressed upward, downward, leftward, or rightward, or other directions when viewed from the front side (the display side) of the portable terminal, the first cursor 101 corresponding to the indicating button moves, on the character entry screen 100, in the direction in which the movement direction indicating section of the first indicating button 20 is pressed. The same goes for the second indicating button 30. Incidentally, when the first indicating button 20 and the second indicating button 30 are disposed on the lateral side or the back side of the portable terminal, the user usually operates the indicating buttons 20 and 30 by using fingers, such as index fingers, other than thumbs.

Figure 29:
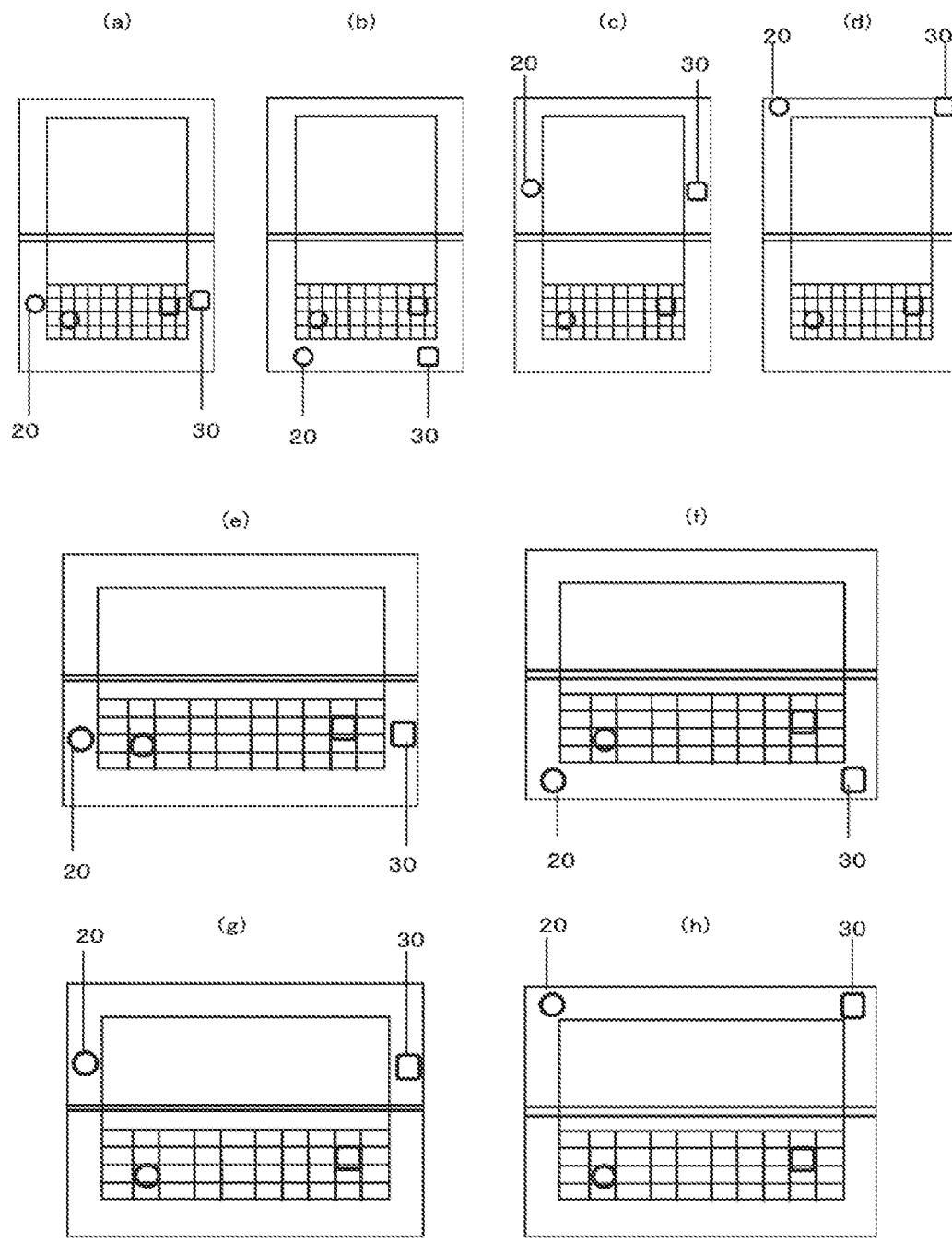
FIG. 29 is a diagram depicting specific examples in which the first indicating button and the second indicating button are disposed on the front side of a portable terminal in a clamshell, portable terminal.
Figure 30:
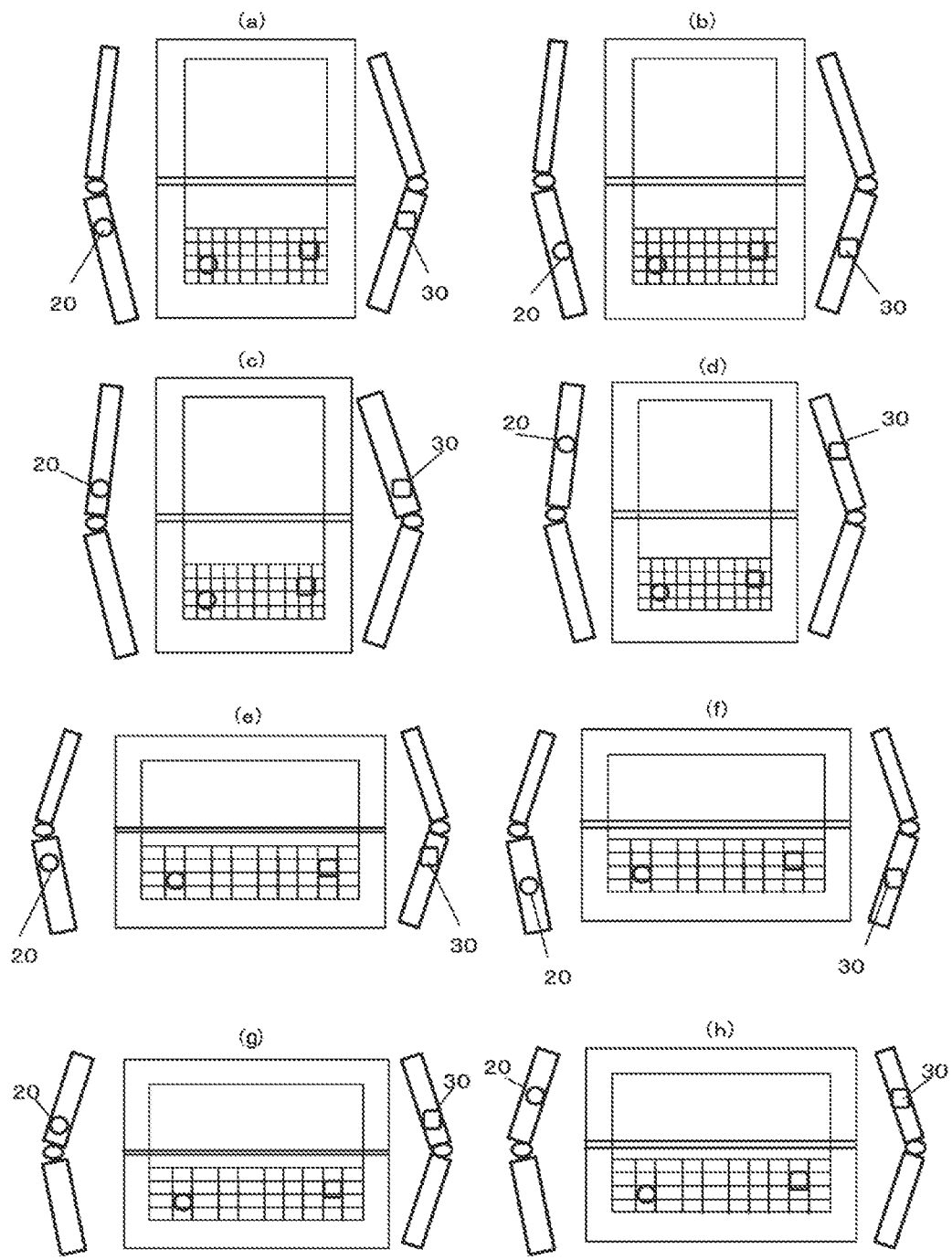
FIG. 30 is a diagram depicting specific examples in which the first indicating button and the second indicating button are disposed on the lateral side of the portable terminal in the clamshell, portable terminal.
Figure 31:
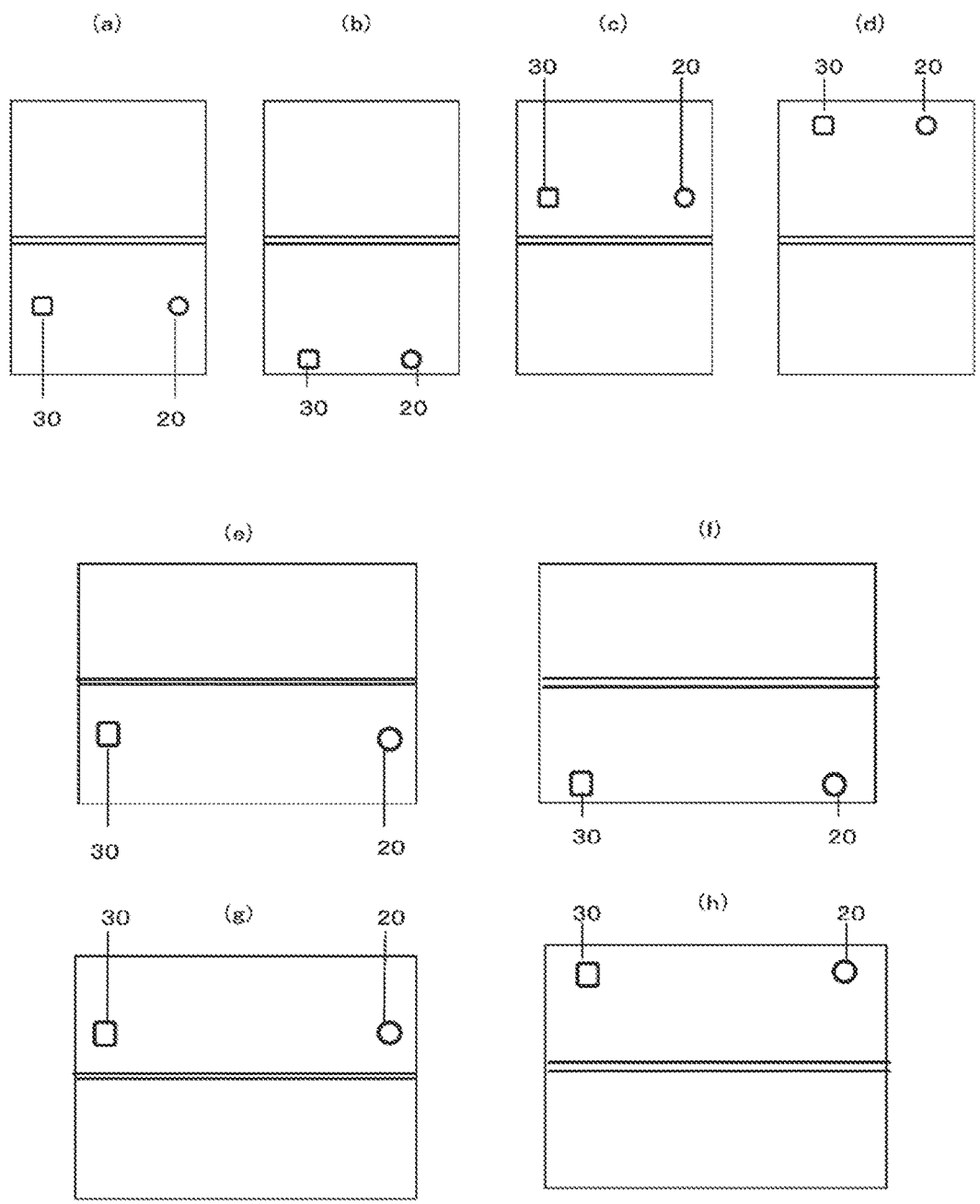
FIG. 31 is a diagram depicting specific examples in which the first indicating button and the second indicating button are disposed on the back side of the portable terminal in the clamshell portable terminal.

Moreover, in the embodiment described above, as the portable terminal, a clamshell portable terminal may be used. Also in this case, the first indicating button 20 and the second indicating button 30 can be provided in predetermined places on the front side, the lateral side, or she back side of the portable terminal. FIG. 29 is a diagram depicting specific examples in which the first indicating button 20 and the second indicating button 30 are disposed on the front side of a portable terminal in a clamshell portable terminal. Here, FIGS. 29(*a*) to (*d*) depict examples in which the entry of a character is performed on the vertically-oriented portable terminal, and FIGS. 29(*e*) to (*h*) depict examples in which the entry of a character is performed on the horizontally-oriented portable terminal. In FIGS. 29(*a*) and (*e*), the first indicating button 20 and the second indicating button 30 are provided at the left and right edges, respectively, on the front side in a lower portion of the portable terminal, and, in FIGS. 29(*b*) and (*f*), the first indicating button 20 and the second indicating button 30 are provided at the lower edge on the front side in the lower portion of the portable terminal. In FIGS. 29(*c*) and (*g*), the first indicating button 20 and the second indicating button 30 are provided on the left and right edges, respectively, on the front side in an upper portion of the portable terminal, and, in FIGS. 29(*d*) and (*h*), the first indicating button 20 and the second indicating button 30 are provided at the upper edge on the front side in the upper portion of the portable terminal. Moreover, FIG. 30 is a diagram depicting specific examples in which the first indicating button 20 and the second indicating button 30 are disposed on the lateral side of the portable terminal in the clamshell portable terminal. Here, FIGS. 30(*a*) to (*d*) depict examples in which the entry of a character is performed on the vertically-oriented portable terminal, and FIGS. 30 (*e*) to (*h*) depict examples in which the entry of a character is performed on the horizontally-oriented portable terminal. In FIGS. 30 (*a*), (*b*), (*e*), and (*f*), the first indicating button 20 and the second indicating button are provided on the left and right lateral sides, respectively, in a lower portion of the portable terminal, and, in FIGS. 30(*c*), (*d*), (*g*), and (*h*), the first indicating button 20 and the second indicating button 30 are provided on the left and right lateral sides, respectively, in an upper portion of the portable terminal. Furthermore, FIG. 31 is a diagram depicting specific examples in which the first indicating button 20 and the second indicating button 30 are disposed on the back side of the portable terminal in the clamshell portable terminal. Here, FIGS. 31 (*a*) to (*d*) depict examples in which the entry of a character is performed on the vertically-oriented portable terminal, and FIGS. 31(*e*) to (*h*) depict examples in which the entry of a character is performed on the horizontally-oriented portable terminal. In FIGS. 31(*a*) and (*e*), the first indicating button 20 and the second indicating button 30 are provided at the right and left edges, respectively, on the back side in a lower portion of the portable terminal, and, in FIGS. 31 (*b*) and (*f*), the first indicating button 20 and the second indicating button 30 are provided at the lower edge on the back side in the lower portion of the portable terminal. In FIGS. 31(*c*) and (*g*), the first indicating button 20 and the second indicating button 30 are provided at the right and left edges, respectively, on the back side in an upper portion of the portable terminal, and, in FIGS. 31(d) and (h), the first indicating button 20 and the second indicating button 30 are provided at the upper edge on the back side in the upper portion of the portable terminal. However, when the first indicating button 20 and the second indicating button 30 are disposed on the back side of the clamshell portable terminal, if the movement direction indicating section of the first indicating button 20 is pressed upward, downward, leftward, or rightward, or other directions when viewed from the front side (the display side) when the portable terminal is opened, the first cursor 101 corresponding to the indicating button moves, on the character entry screen 100, in the direction in which the movement direction indicating section of the first indicating button 20 is pressed. The same goes for the second indicating button 30.

Moreover, in the embodiment described above, as the portable terminal, a portable terminal having the function of rotating the character entry screen with the rotation of the portable terminal when the portable terminal is rotated while the character entry screen is displayed on the display of the display means may be used. In such a portable terminal, it is preferable to provide the first indicating button for a vertically-oriented state and the second indicating button for a vertically-oriented state which are used when the entry of a character is performed with the display of the display means being brought to a vertically-oriented state, and the first indicating button for a horizontally-oriented state and the second indicating button for a horizontally-oriented state which are used when the entry of a character is performed with the display of the display means being brought to a horizontally-oriented state. That is, it is preferable to provide two first indicating buttons and/or two second indicating buttons. By doing so, even when the user uses the portable terminal in any one of the vertically-oriented state and the horizontally-oriented state, the user can perform entry operation quickly by using the first indicating button and the second indicating button in accordance with the state of the portable terminal while holding the portable terminal stably with both hands.

Figure 33:
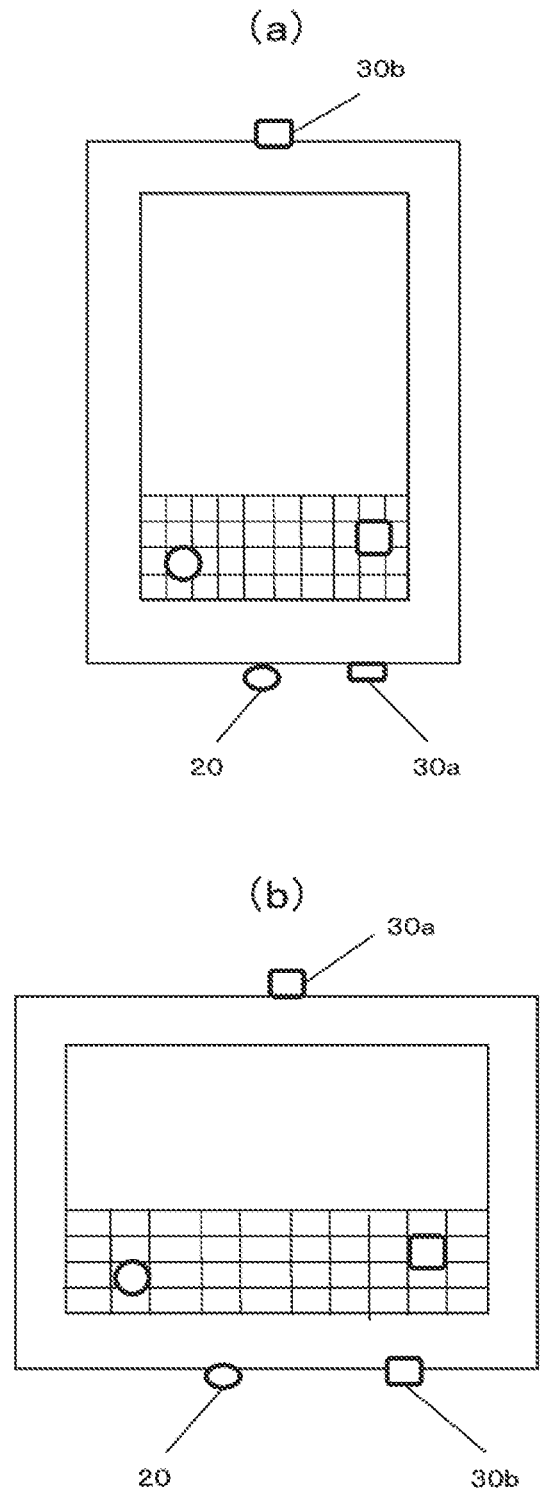
FIG. 33 is a diagram depicting specific examples in which, in the portable terminal provided with one first indicating button and two second indicating buttons, these indicating buttons are disposed on the lateral side of the portable terminal.

Specifically, when one first indicating button and two second indicating buttons are provided, these indicating buttons can be disposed as depicted in FIGS. 32 to 34, for example. FIG. 32 is a diagram depicting specific examples in which, in a portable terminal provided with one first indicating button 20 and two second indicating buttons 30a and 30b, these indicating buttons 20, 30a, and 30b are disposed on the front side of the portable terminal. FIG. 33 is a diagram depicting specific examples in which, in the portable terminal provided with one first indicating button 20 and two second indicating buttons 30a and 30b, these indicating buttons 20, 30a, and 30b are disposed on the lateral sides of the portable terminal. FIG. 34 is a diagram depicting specific examples in which, in the portable terminal provided with one first indicating button 20 and two second indicating buttons 30a and 30b, these indicating buttons 20, 30a, and 30b are disposed on the back side of the portable terminal. Here, for example, in FIG. 32(a), the first indicating button 20 and one second indicating button 30a are provided on left and right at the lower edge on the front side of the portable terminal, and the other second indicating button 30b is provided in the center of the upper edge on the front side of the portable terminal. At this time, the first indicating button 20 is used as the first indicating button for a vertically-oriented state and the first indicating button for a horizontally-oriented state. In addition, one second indicating button 30a is used as the second indicating button for a vertically-oriented state, and the other second indicating button 30b is used as the second indicating button for a horizontally-oriented state. Likewise, also in other examples (FIG. 32 (b), FIG. 33(a), FIG. 33(b), FIG. 34(a), and FIG. 34(b)), the first indicating button 20 is used as the first indicating button for a vertically-oriented state and the first indicating button for a horizontally-oriented state, the second indicating button 30a is used as the second indicating button for a vertically-oriented state, and the second indicating button 30b is used as the second indicating button for a horizontally-oriented state.

Figure 35:
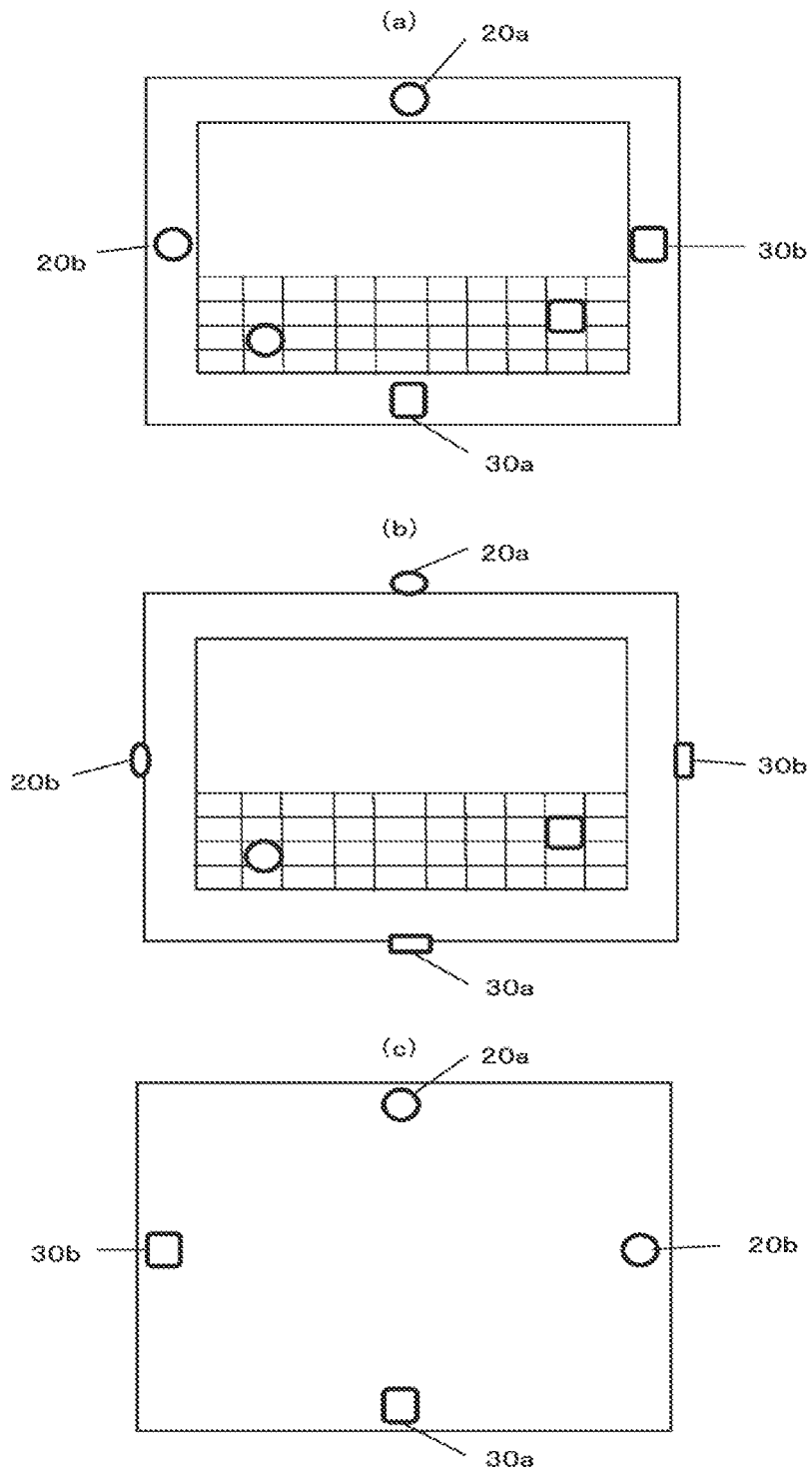
FIG. 35 is a diagram depicting specific examples in which, in a portable terminal provided with two first indicating buttons and two second indicating buttons, these indicating buttons are disposed on a portable terminal.

Moreover, when two first indicating buttons and two second indicating buttons are provided, these indicating buttons can be disposed as depicted in FIG. 35, for example. FIG. 35(a) is a diagram depicting a specific example in which, in a portable terminal, provided with two first indicating buttons 20a and 20b and two second indicating buttons 30a and 30b, these indicating buttons 20a, 20b, 30a, and 30b are disposed on the front side of the portable terminal, FIG. 35(b) is a diagram depicting a specific example in which, in the portable terminal provided with two first indicating buttons 20a and 20b and two second indicating buttons 30a and 30b, these indicating buttons 20a, 20b, 30a, and 30b are disposed on the lateral sides of the portable terminal, and FIG. 35(c) is a diagram depicting a specific example in which, in the portable terminal provided with two first indicating buttons 20a and 20b and two second indicating buttons 30a and 30b, these indicating buttons 20a, 20b, 30a, and 30b are disposed on the back side of the portable terminal. Here, how the portable terminal depicted in FIG. 35(a) looks when the portable terminal is held is depicted in FIGS. 36 (a) and (b). In the examples of FIGS. 35(a), (b), and (c), the first indicating button 20a is used as the first indicating button for a vertically-oriented state, the first indicating button 20b is used as the first indicating button for a horizontally-oriented state, the second indicating button 30a is used as the second indicating button for a vertically-oriented state, and the second indicating button 30b is used as the second indicating button for a horizontally-oriented state.

Figure 37:
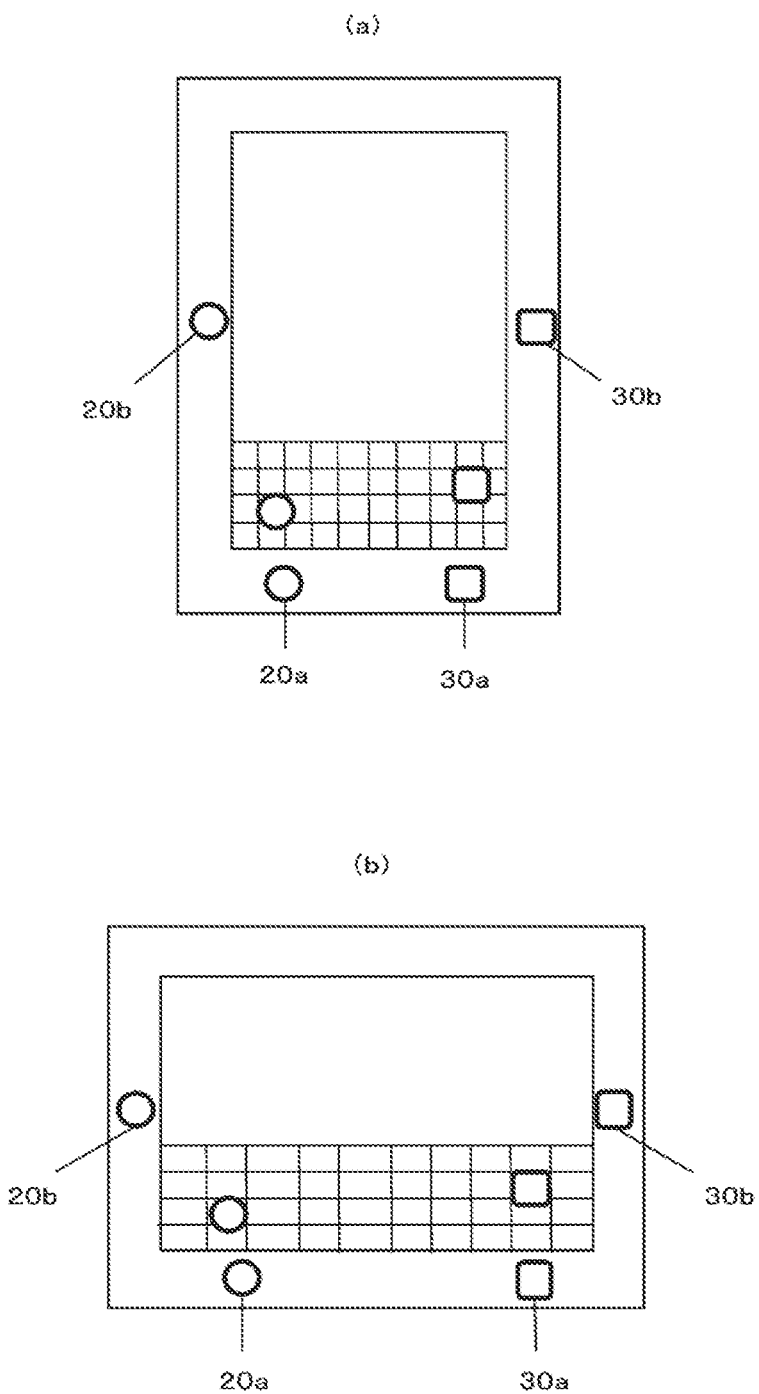
FIG. 37 is a diagram depicting specific examples in which, in a portable terminal provided with two sets of the first indicating button and the second indicating button, these indicating buttons are disposed on the front side of a portable terminal.
Figure 38:
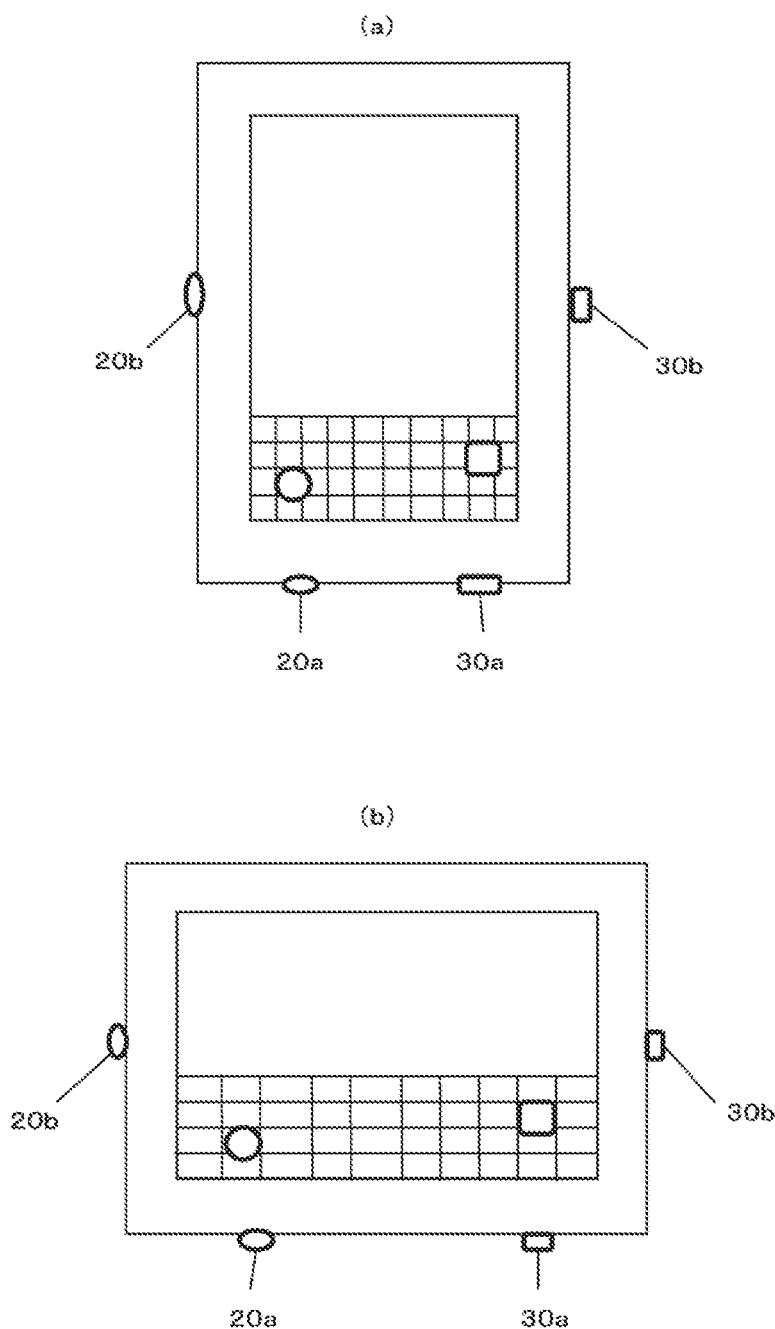
FIG. 38 is a diagram depicting specific examples in which, in the portable terminal provided with the two sets of the first indicating button and the second indicating button, these indicating buttons are disposed on the lateral side of the portable terminal.

Incidentally, also in a case where a portable terminal without the above-described function of rotating the screen is used as the portable terminal, two first indicating buttons and two second indicating buttons may be provided. That is, two sets of the first indicating button and the second indicating button may be provided. FIG. 37 is a diagram depicting specific examples in which, in a portable terminal provided with two sets of the first indicating button and the second indicating button, these indicating button are disposed on the front side of the portable terminal. FIG. 38 is a diagram depicting specific examples in which, in the portable terminal provided with two sets of the first indicating button and the second indicating button, these indicating buttons are disposed on the lateral side of the portable terminal. FIG. 39 is a diagram depicting specific examples in which, in the portable terminal provided with two sets of the first indicating button and the second indicating button, these indicating buttons are disposed on the back side of the portable terminal. Specifically, in FIG. 37(a), for example, the first indicating button 20a and the second indicating button 30a in one set are provided on left and right at the lower edge on the front side of the portable terminal, and the first indicating button 20b and the second indicating button 30b in the other set are provided at the left and right edges, respectively, on the front side of the portable terminal. In this case, the user performs character entry by using any one of the two sets of the first indicating button and the second indicating button, but the user may perform character entry by using any one of the two first indicating buttons 20a and 20b and any one of the two second indicating buttons 30a and 30b.

Moreover, in the embodiment described above, a case where the display of the display means is a touch panel has been described, but the display of the display means does not necessarily have to be a touch panel.

Furthermore, in the embodiment described above, a case where both the first indicating button and the second indicating button double as a role as the cursor operation button and a role as the screen display indicating button has been described, but a configuration may also be adopted in which any one of the first indicating button and the second indicating button functions as the cursor operation button when the character entry screen is displayed on the display of the display means and functions as the screen display indicating button when a screen other than the character entry screen is displayed on the display of the display means; on the other hand, the other indicating button functions as the cursor operation button at all times irrespective of whether or not the character entry screen is displayed on the display of the display means. Moreover, a configuration may also be adopted in which both the first indicating button and the second indicating button function as the cursor operation button at all times irrespective of whether or not the character entry screen is displayed on the display of the display means. In this case, it is preferable to provide an extra screen display indicating button when necessary. In particular, when a screen other than the character entry screen is displayed on the display of the display means, the control means may display the home screen on the display of the display means when the signals are concurrently sent from the selection indicating section of the first indicating button and the selection indicating section of the second indicating button two times in a row. By doing so, it is possible to return to the home screen easily by using the two indicating buttons. Incidentally, FIGS. 40 and 41 are diagrams depicting examples of operation of the two indicating buttons functioning as the cursor operation button when the character entry screen is not displayed on the display of the display means. Here, in FIG. 40, an example in which one of the two indicating buttons is operated is depicted, and, in FIG. 41, an example in which both of the two indicating buttons are operated is depicted.

Incidentally, when the first indicating button or the second indicating button is configured to function as the cursor operation button at all times, the display mode of the cursor may be changed in accordance with the type of the currently-displayed screen. Moreover, when both the first indicating button and the second indicating button are configured to function as the cursor operation button at all times, the display mode of each cursor may be changed in accordance with the type of the currently-displayed screen. For example, when a homepage is displayed on the display of the display means, the cursor movement control means may display each cursor in such way that the cursor surrounds an image or a character string to which a link is put and move each cursor in a unit which is the image or the character string to which a link is put.

Moreover, in the embodiment described above, a case where the indicating button having a pressing-type structure is used as the first indicating button and the second indicating button has been described, but, as these indicating buttons, a touch pad such as an electrostatic pad, a trackball, and so forth may be used. FIG. 42(a) is a diagram depicting an indicating button adopting an electrostatic pad, and FIG. 42 (b) is a diagram depicting an indicating button adopting a trackball, if the electrostatic pad depicted in FIG. 42(a) is adopted as the indicating button, when the surface of the electrostatic pad is scrubbed upward with a finger, the cursor moves upward on the character entry screen; when the surface of the electrostatic pad is scrubbed rightward with a finger, the cursor moves rightward on the character entry screen. To move the cursor downward, leftward, or in an oblique direction, it is necessary simply to scrub the surface of the electrostatic pad in that direction with a finger. In addition, when the surface of the electrostatic pad is pressed vertically with a finger, the key currently indicated by the cursor is selected. On the other hand, if the trackball depicted in FIG. 42(b) is used as the indicating button, when the trackball is rotated upward with a finger, the cursor moves upward on the character entry screen; when the trackball is rotated rightward with a finger, the cursor moves rightward on the character entry screen. To move the cursor downward, leftward, and in an oblique direction, it is necessary simply to rotate the trackball in that direction with a finger. In addition, when the trackball is pressed vertically with a finger, the key currently indicated by the cursor is selected. Moreover, as the first indicating button and the second indicating button, an indicating button having an integrated pressing-type structure depicted in FIG. 42(c) may be used. In the indicating button depicted in FIG. 42(c), the movement direction indicating section and the selection indicating section are not separated from each other outwardly and are integrated together. That is, the periphery of the indicating button depicted in FIG. 42(c) is the movement direction indicating section, and the center of the indicating button depicted in FIG. 42(c) is the selection indicating section. In this case, when the top of the periphery of the indicating button is pressed, the cursor corresponding to the indicating button moves upward. Moreover, when the other part of the periphery of the indicating button is pressed, the cursor corresponding to the indicating button moves in the direction in which the other part of the periphery of the indicating button is pressed. Furthermore, when the whole of the indicating button is pressed vertically downward, an instruction to select the key currently indicated by the cursor is given.

In addition, in the embodiment described above, a case where, as the first indicating button and the second indicating button, an indicating button having one ring-shaped movement direction indicating section and a selection indicating section provided in the center of the movement direction indicating section as depicted in FIG. 5 is used has been described, but both the first indicating button and the second indicating button are not limited to those depicted in FIG. 5 described above. For example, the first indicating button and the second indicating button may be those depicted in FIG. 56. FIG. 56 is a diagram for explaining other examples of the first indicating button and the second indicating button. A first indicating button 200 depicted in FIG. 56(a) has a selection indicating section 220 and four movement direction indicating sections 211 to 214 having a virtually triangular shape, the movement direction indicating sections 211 to 214 provided in separated positions, above and below and on the left and right of the selection indicating section 220. A second indicating button 300 depicted in FIG. 56(b) has a selection indicating section 320 and four movement direction indicating sections 311 to 314 having a virtually rectangular shape, the movement direction indicating sections 311 to 314 provided in separated positions, above and below and on the left and right of the selection indicating section 320. Although the first indicating button 200 and the second indicating button 300 depicted in FIG.

56 have the shapes different from those depicted in FIG. 5, the others such as the functions and the operation method are the same as those depicted in FIG. 5. Moreover, in FIG. 56, the first indicating button 200 and the second indicating button 300 are formed to have different shapes, but the first indicating button 200 and the second indicating button 300 may be formed to have the same shape. Furthermore, the shapes of the selection indicating sections 220 and 320 and the movement direction indicating sections 211 to 214 and 311 to 314 are not limited to those depicted in FIG. 56, and the selection indicating sections 220 and 320 and the movement direction indicating sections 211 to 214 and 311 to 314 may have any shapes such as an oval shape, a pentagonal shape, and a rhombic shape.

Moreover, in the embodiment described above, when the portable terminal has a telephone call function, the character entry screen may be a telephone number entry screen in which a telephone number is to be entered. In this case, on the telephone number entry screen, as the keyboard screen, as depicted in FIG. 43(a) or (b), a screen having numeric keys from "0" to "9", a call key, an end key, and so forth are displayed. The user can enter a telephone number by selecting the numeric keys on the keyboard screen by operating the first indicating button and the second indicating button.

Figure 44:
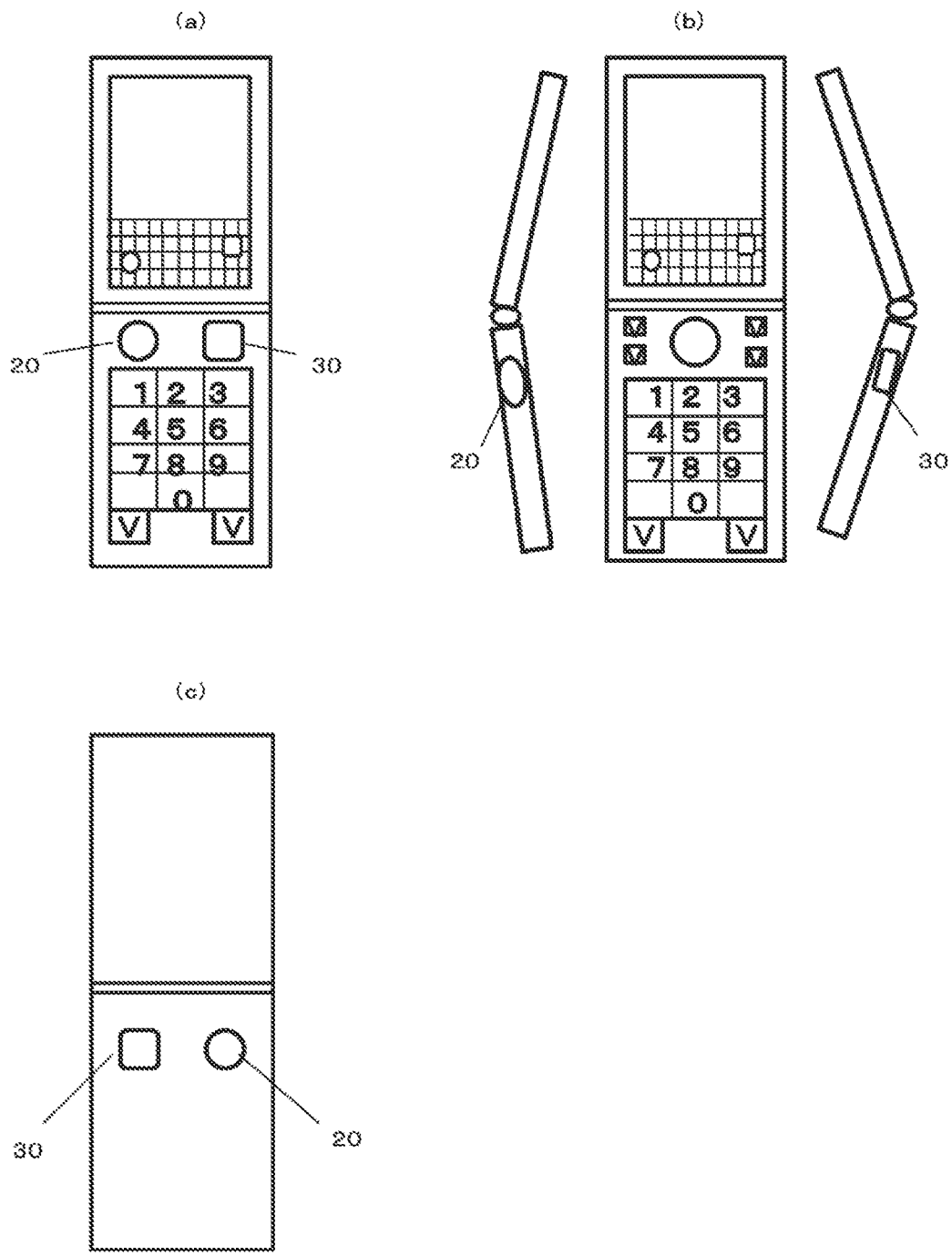
FIG. 44 is a diagram depicting examples of the arrangement of the first indicating button and the second indicating button when the portable terminal of the present invention is a clamshell mobile telephone.

Furthermore, in the embodiment described above, a case where the portable terminal of the present invention is a tablet terminal has been described, but the portable terminal of the present invention is not limited to the tablet terminal, and may be, for example, a mobile telephone, a smartphone, a personal digital assistant, and so forth. Here, examples of the arrangement of the first indicating button and the second indicating button when the portable terminal of the present invention is a clamshell mobile telephone are depicted in FIG. 44. FIG. 44(a) depicts an example in which the first indicating button 20 and the second indicating button 30 are provided on the inside of the mobile telephone in a portion above, the keys. FIG. 44(b) depicts an example in which the first indicating button 20 and the second indicating button 30 are provided on the left and right lateral sides, respectively, of the mobile telephone. FIG. 44 (c) depicts an example in which the first indicating button 20 and the second indicating button 30 are provided on the back side of the mobile telephone.

Figure 46:
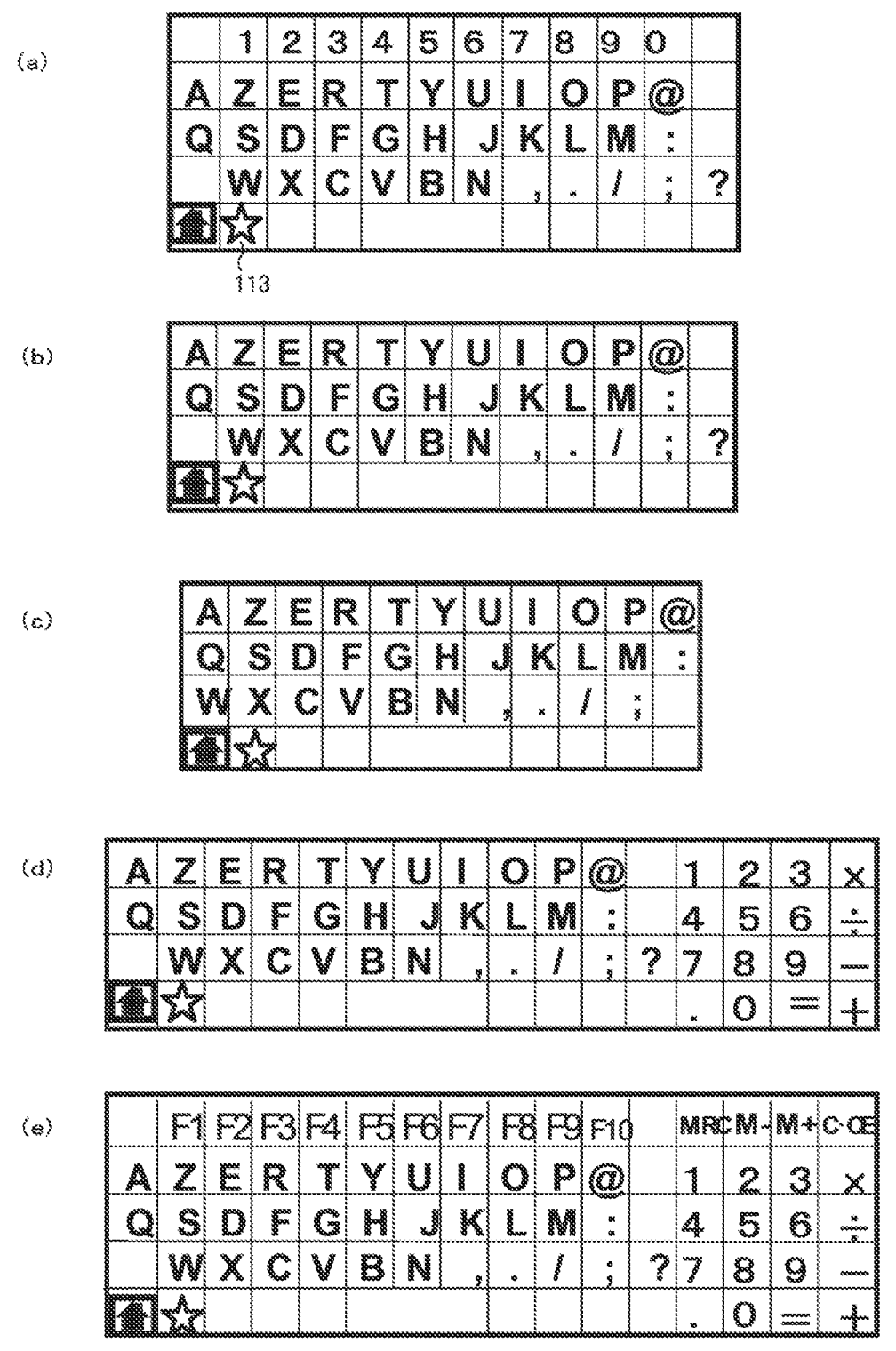
Figure 47:
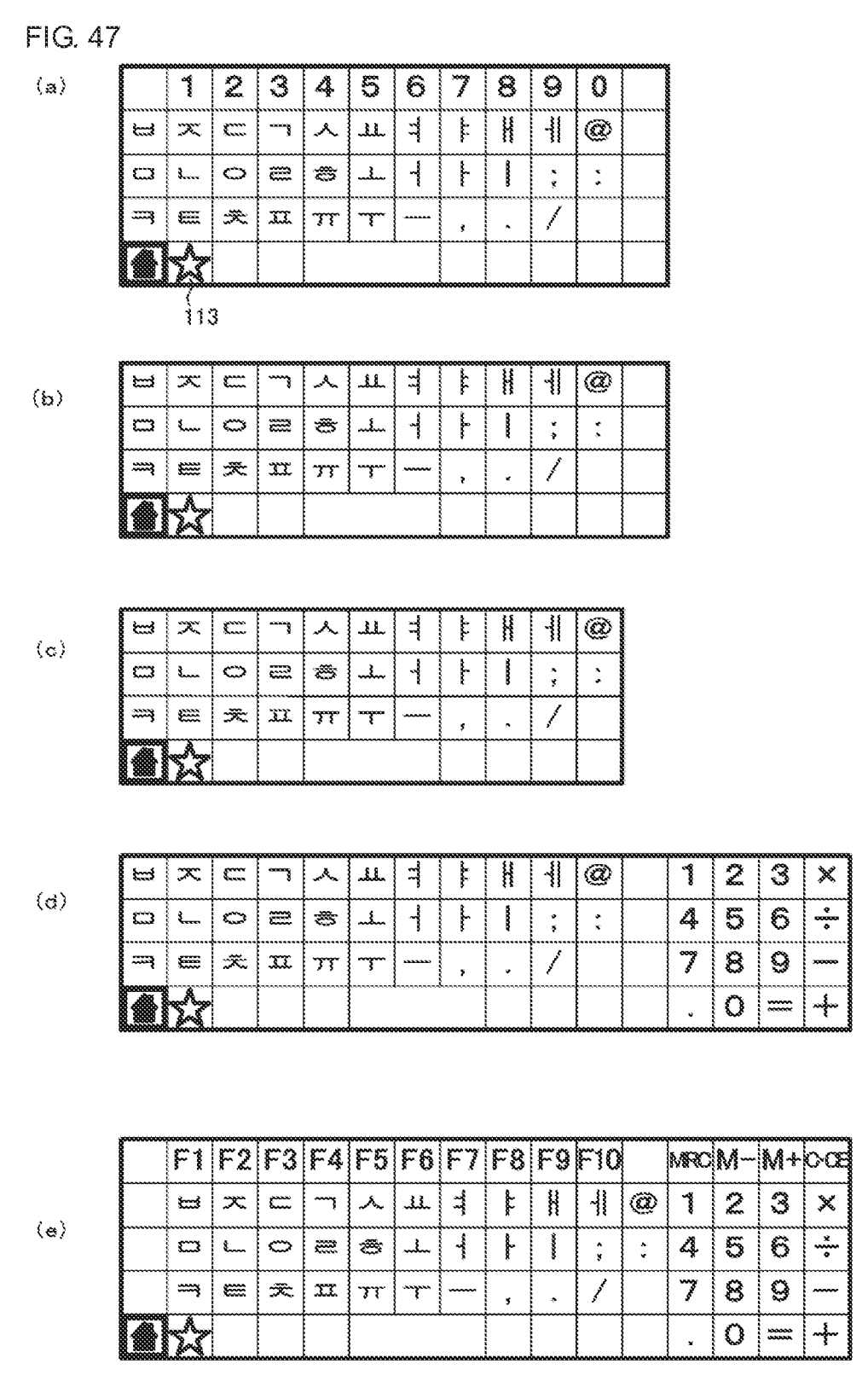

Moreover, in the embodiment described above, a case where switching between the QWERTY keyboard screen and the 50-character hiragana syllabary layout keyboard screen is performed by the keyboard switching key has been described, but, when the portable terminal of the present invention is used in different countries, in place of the 50-character hiragana syllabary layout keyboard screen, a keyboard screen with a layout of the language of each country may be adopted. Specific examples of the keyboard screen with a layout of the language of each country are depicted in FIGS. 45 to 47. FIG. 45 is a diagram depicting examples of a Spanish layout keyboard screen, FIG. 46 is a diagram depicting examples of a French layout keyboard screen, and FIG. 47 is a diagram depicting examples of a Korean layout keyboard screen. Here, in each diagram, the keyboard switching key 113 is used to perform switching between the QWERTY keyboard screen and the language layout keyboard screen. Moreover, a keyboard screen with a layout of another language such as German may be used. Incidentally, when a letter with a diacritical mark or the like is entered by using the keyboard screen with a layout of the language such as German, Spanish, or French, it is necessary simply to hold a character key representing a vowel down, thereby opening a window containing letters with a diacritical mark or the like and select an intended letter from the letters displayed in the window. Moreover, it is also possible to dispose a key representing a diacritical mark or the like on the keyboard screen in advance and directly enter a letter with a diacritical mark or the like by using such a key. Furthermore, when Chinese is entered, for both simplified Chinese used in Mainland China and traditional Chinese used in Taiwan, it is common to enter Roman letters (alphabetical characters) and then convert them into Chinese; therefore, as a keyboard screen for entering Chinese, as in the case of entry of Roman letters (alphabetical characters) and subsequent conversion into Japanese, the keyboard screens depicted in FIGS. 14, 15, 16, and so forth are used. Moreover, a Chinese layout keyboard screen may be used.

Figure 48:
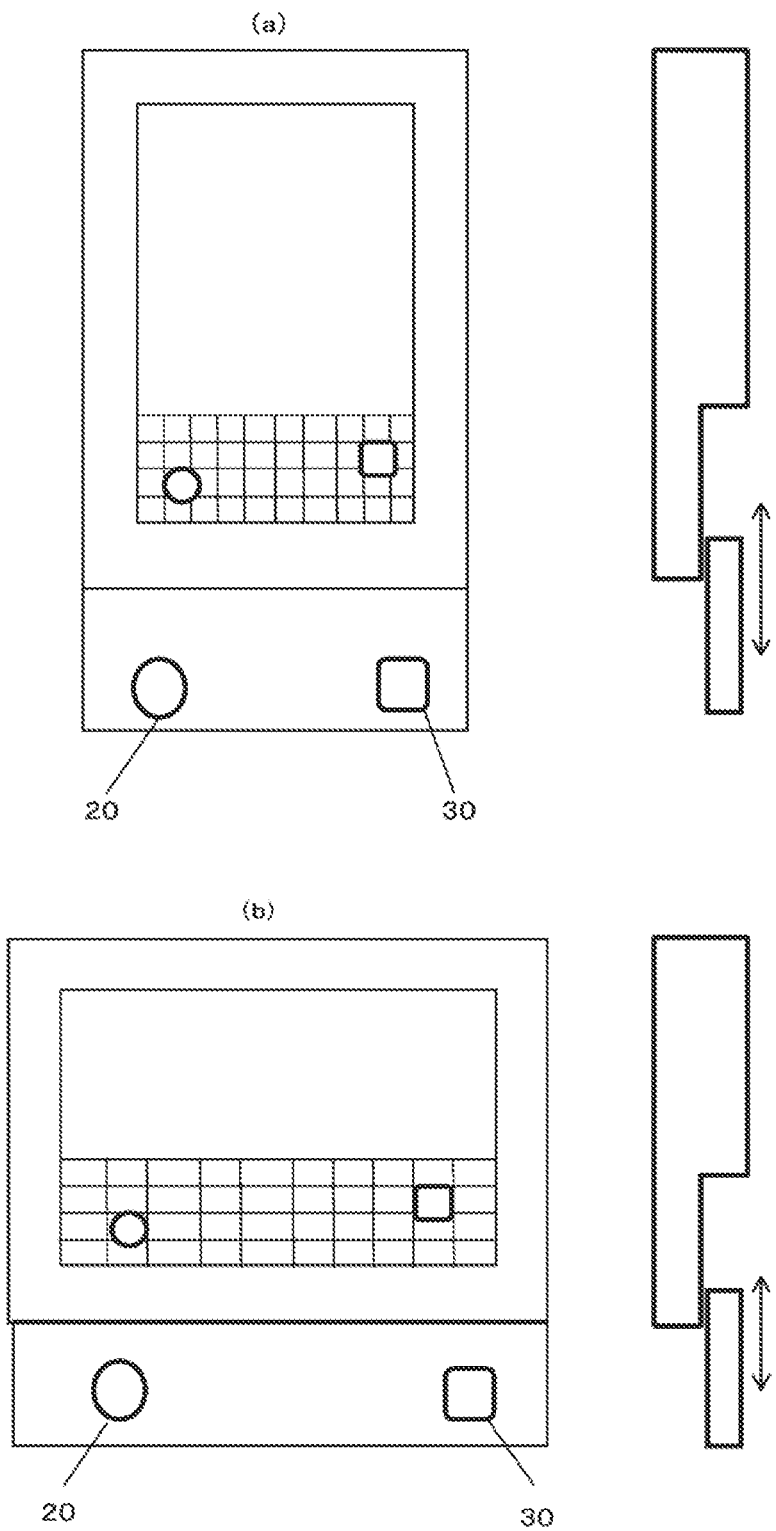
FIG. 48 is a diagram depicting examples of the arrangement of the first indicating button and the second indicating button when the portable terminal of the present invention is a slider portable terminal.
Figure 49:
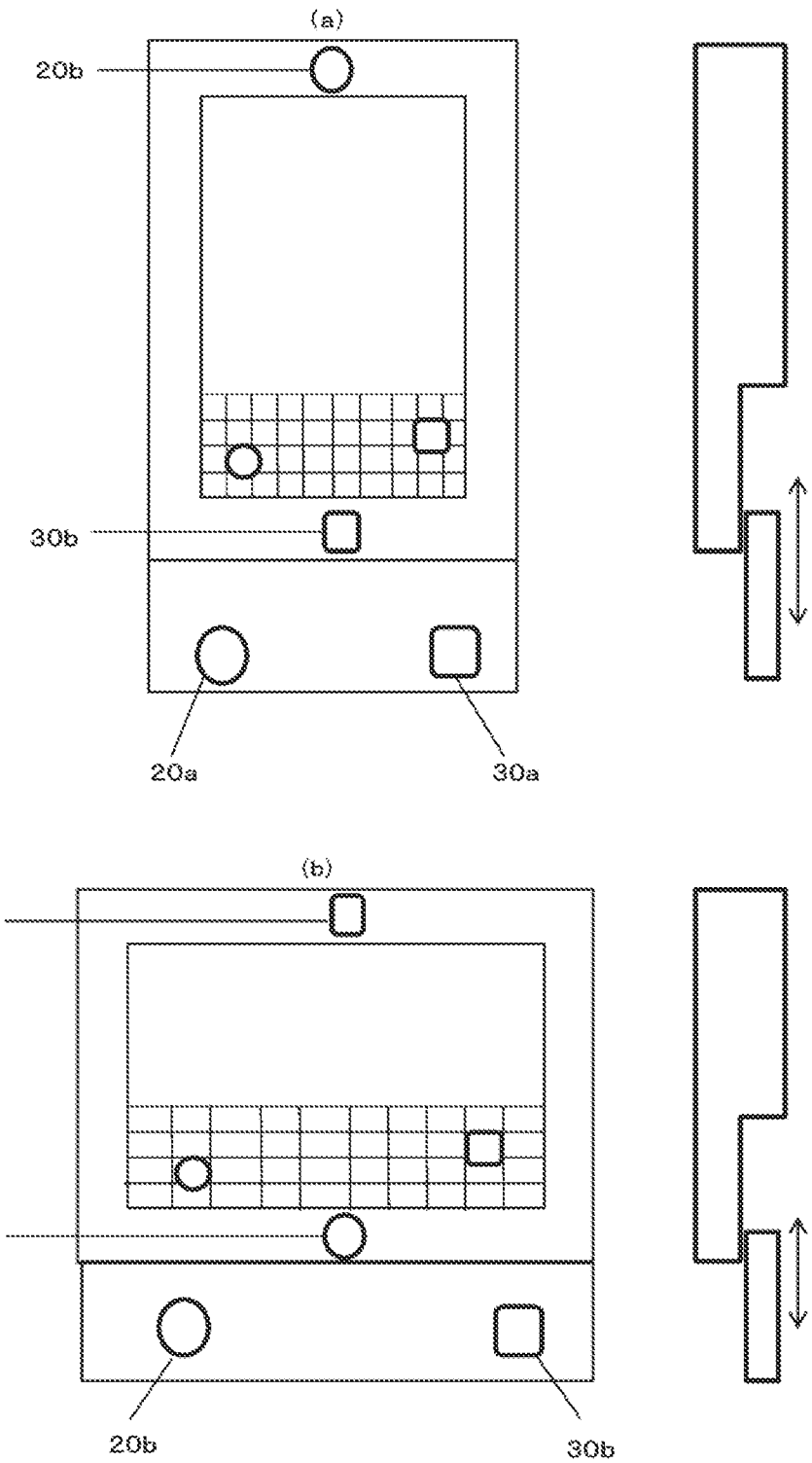
FIG. 49 is a diagram depicting examples of the arrangement of the first indicating button and the second indicating button when the portable terminal of the present invention is a slider portable terminal.
Figure 50:
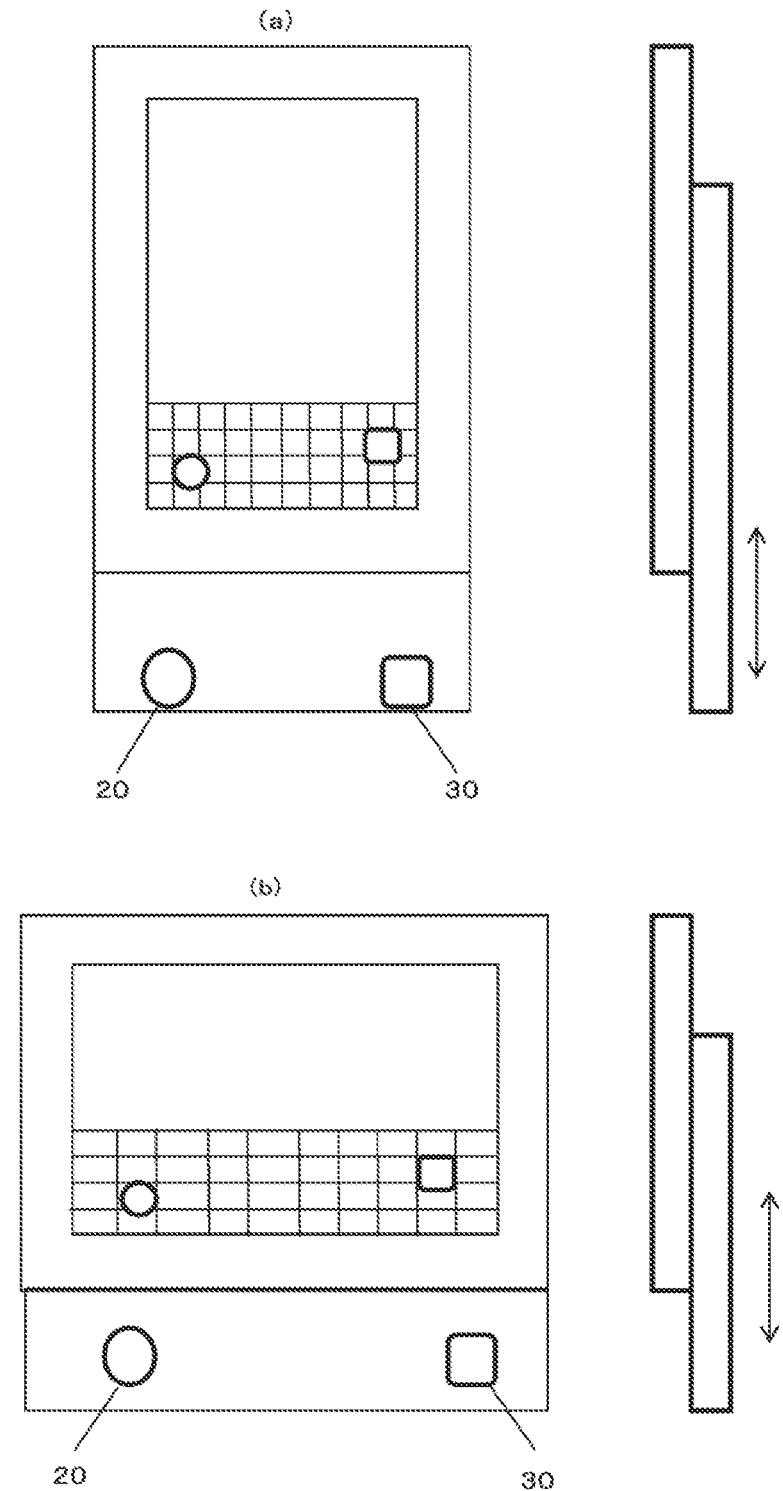
FIG. 50 is a diagram depicting examples of the arrangement of the first indicating button and the second indicating button when the portable terminal of the present invention is a slider portable terminal.
Figure 52:
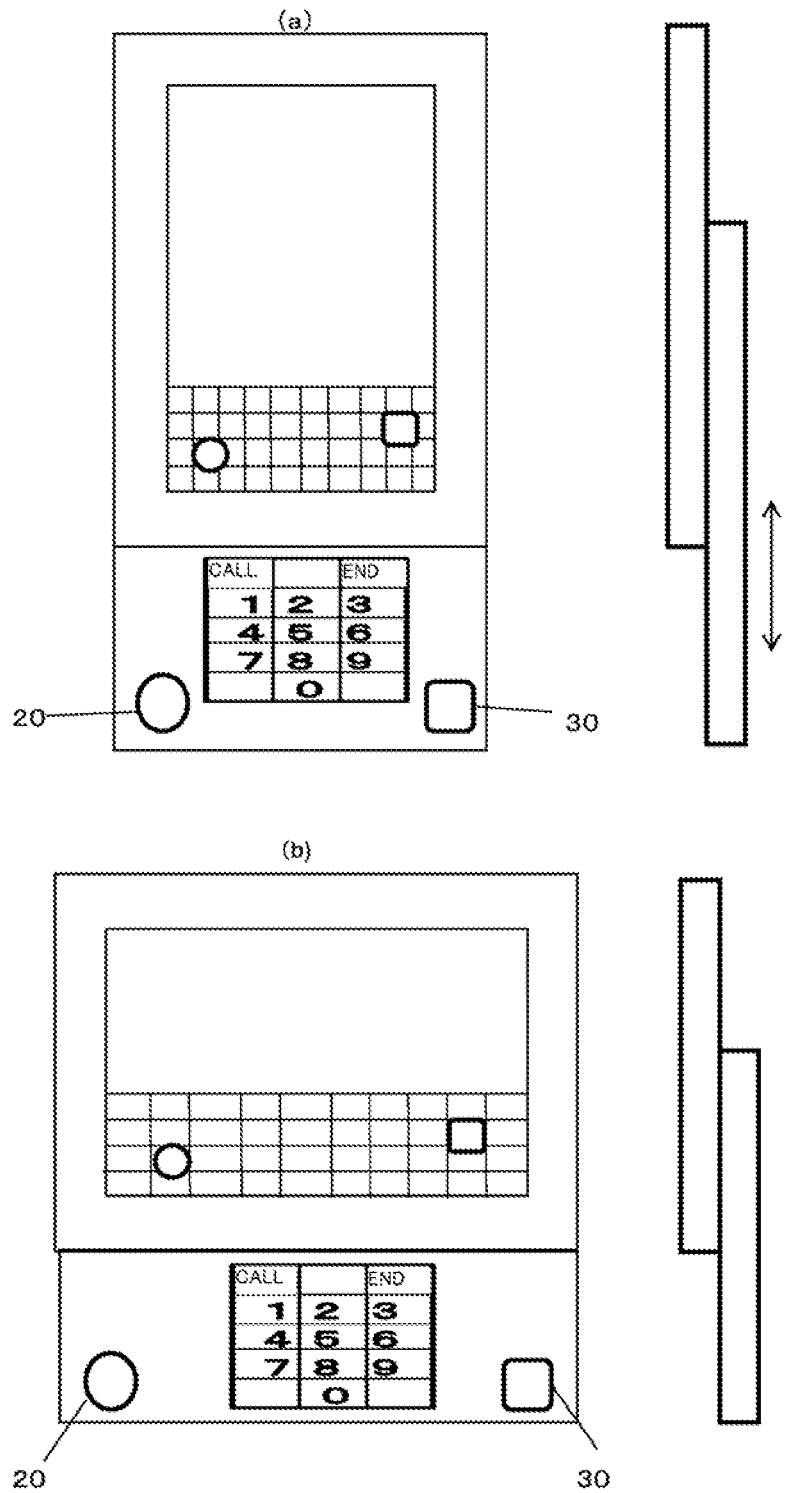
FIG. 52 is a diagram depicting examples of the arrangement of the first indicating button and the second indicating button when the portable terminal of the present invention is a slider portable terminal.

Furthermore, in the embodiment described above, the portable terminal may be configured as a slider portable terminal and the first indicating button and the second indicating button may be provided on the surface of a portion that appears when the portable terminal is slid. FIGS. 48 to 55 are diagrams depicting examples of the arrangement of the first indicating button and the second indicating button when the portable terminal of the present invention is a slider portable terminal. Specifically, in FIGS. 48 and 49, examples of a portable terminal, in which part of a rear part is slid vertically are depicted. In FIGS. 48(a) and (b), when the portable terminal, is slid, the first indicating button 20 and the second indicating button 30 appear in the rear part of the portable terminal. In FIG. 49(a), the first indicating button 20b for a horizontally-oriented state and the second indicating button 30b for a horizontally-oriented state are provided on the surface of the portable terminal, and, when the portable terminal is slid, the first indicating button 20a for a vertically-oriented state and the second indicating button 30a for a vertically-oriented state appear in the rear part of the portable terminal. In FIG. 49(b), the first indicating button 20a for a vertically-oriented state and the second indicating button 30a for a vertically-oriented state are provided on the surface of the portable terminal, and, when the portable terminal is slid, the first indicating button 20b for a horizontally-oriented state and the second indicating button 30b for a horizontally-oriented state appear in the rear part of the portable terminal.

Moreover, in FIGS. 50 to 53, examples of a portable terminal in which the whole of a rear part is slid vertically are depicted. In FIGS. 50(a) and (b), when the portable terminal is slid, the first indicating button 20 and the second indicating button 30 appear in the rear part of the portable terminal. In FIG. 51(a), the first indicating button 20b for a horizontally-oriented state and the second indicating button 30b for a horizontally-oriented state are provided on the surface of the portable terminal, and, when the portable terminal is slid, the first indicating button 20a for a vertically-oriented state and the second indicating button 30a for a vertically-oriented state appear in the rear part, of the portable terminal. In FIG. 51(b), the first indicating button 20a for a vertically-oriented state and the second indicating button 30a for a vertically-oriented state are provided on the surface of the portable terminal, and, when the portable terminal is slid, the first indicating button 20b for a horizontally-oriented state and the second indicating button 30b for a horizontally-oriented state appear in the rear part of the portable terminal. In FIGS. 52(a) and (b), when the portable terminal is slid, pressing-type numeric keys and so forth appear in the rear part of the portable terminal along with the first indicating button 20 and the second indicating button 30. Furthermore, in FIG. 53(a), the first indicating button 20b for a horizontally-oriented state and the second indicating button 30b for a horizontally-oriented state are provided on the surface of the portable terminal, and, when the portable terminal is slid, pressing-type numeric keys and so forth appear in the rear part of the portable terminal along with the first indicating button 20a for a vertically-oriented state and the second indicating button 30a for a vertically-oriented state. In FIG. 53(b), the first indicating button 20a for a vertically-oriented state and the second indicating button 30a for a vertically-oriented state are provided on the surface of the portable terminal, and, when, the portable terminal is slid, pressing-type numeric keys and so forth appear in the rear part of the portable terminal along with the first indicating button 20b for a horizontally-oriented state and the second indicating button 30b for a horizontally-oriented state.

Figure 54:
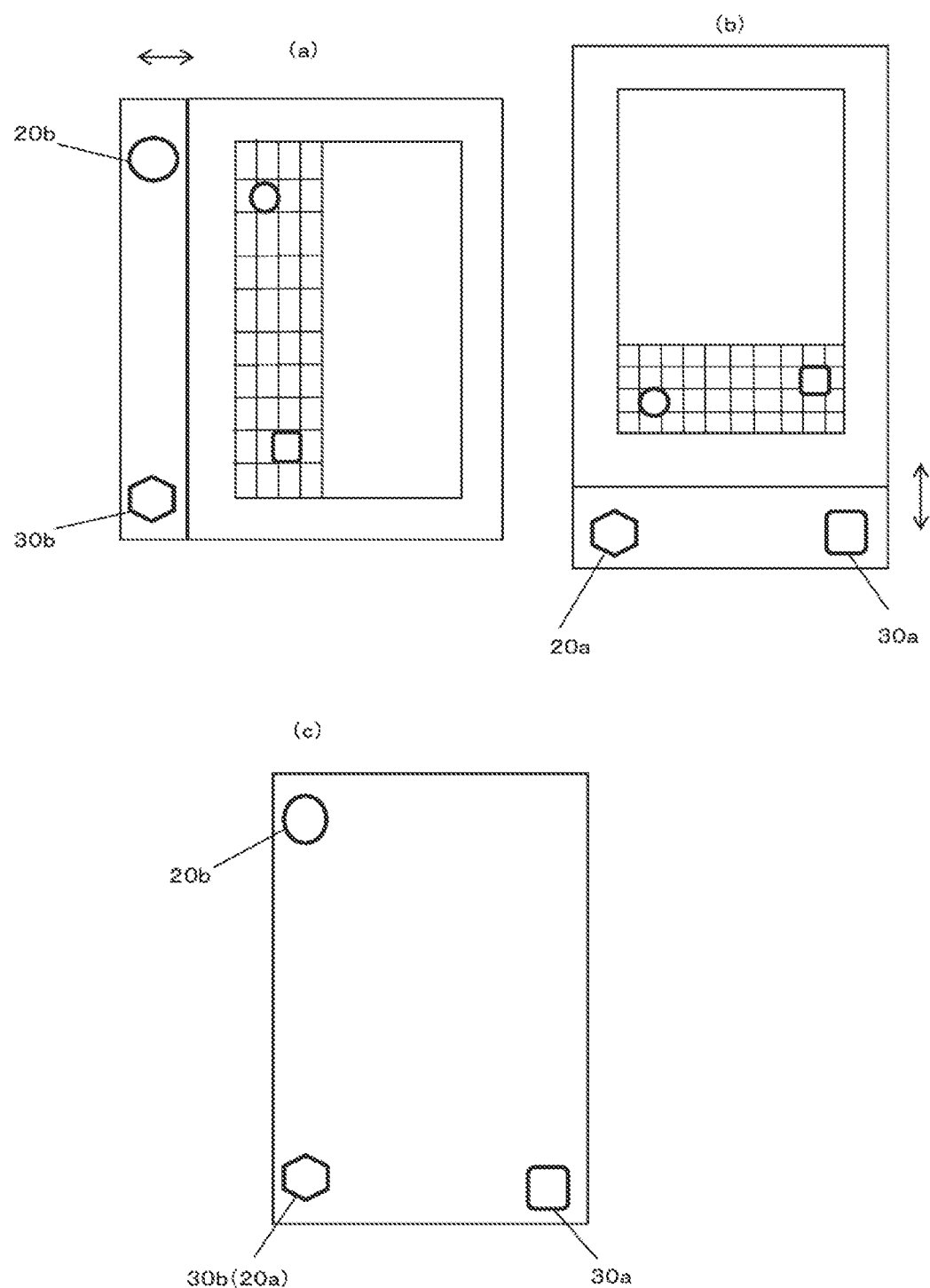
FIG. 54 is a diagram depicting an example of the arrangement of the first indicating button and the second indicating button when the portable terminal of the present invention is a slider portable terminal.
Figure 55:
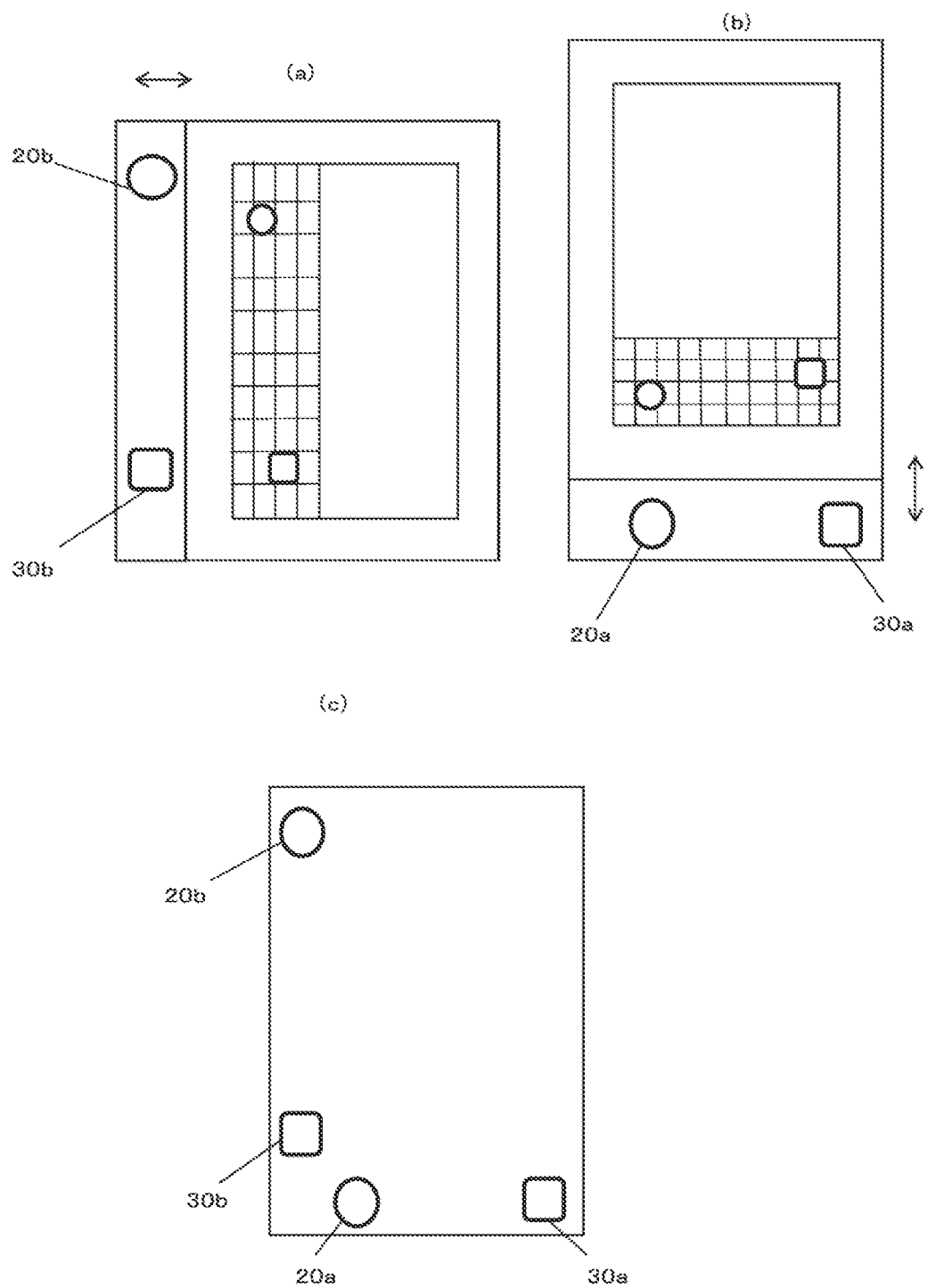
FIG. 55 is a diagram depicting an example of the arrangement of the first indicating button and the second indicating button when the portable terminal of the present invention is a slider portable terminal.

Moreover, FIGS. 54 and 55 depict examples of a portable terminal that is slid vertically and horizontally. In the example or FIG. 54, when a rear part of the portable terminal is slid leftward, as depicted in FIG. 54(a), the first indicating button 20b for a horizontally-oriented state and the second indicating button 30b for a horizontally-oriented state appear; on the other hand, when the rear part, of the portable terminal, is slid downward, as depicted in FIG. 54(b), the first indicating button 20a for a vertically-oriented, state and the second indicating button 30a for a vertically-oriented state appear. Here, the second indicating button 30b for a horizontally-oriented state and the first indicating button 20a for a vertically-oriented state in the example of FIG. 54 are one and the same. That is, in the rear part of the portable terminal of FIG. 54, as depicted in FIG. 54(c), three indicating buttons 20b, 30b (20a), and 30a are disposed, and, when the portable terminal is in a state depicted in FIG. 54(a), the indicating button 30b (20a) functions as the second indicating button for a horizontally-oriented state; when the portable terminal is in a state depicted in FIG. 54(b), the indicating button 30b (20a) functions as the first indicating button for a vertically-oriented state. Furthermore, in the example of FIG. 55, when a rear part of the portable terminal is slid leftward, as depicted in FIG. 55 (a), the first indicating button 20b for a horizontally-oriented state and the second indicating button 30b for a horizontally-oriented state appear; on the other hand, when the rear part of the portable terminal is slid downward, as depicted in FIG. 55(b), the first indicating button 20a for a vertically-oriented state and the second indicating button 30a for a vertically-oriented state appear. Here, unlike the case of FIG. 54, the second indicating button 30b for a horizontally-oriented state and the first indicating button 20a for a vertically-oriented state in the example of FIG. 55 are separate indicating buttons. That is, in the rear part of the portable terminal of FIG. 55, as depicted in FIG. 55(c), four indicating buttons 20b, 30b, 20a, 30a are disposed.

INDUSTRIAL APPLICABILITY

As described above, in the portable terminal of the present invention, the first cursor and the second cursor are displayed on the character entry screen, and the first indicating means for indicating the direction of movement and the like of the first cursor and the second indicating means for indicating the direction of movement and the like of the second cursor are provided in predetermined places of the portable terminal. As a result, since the user holds the periphery of a portion of the portable terminal in which the first indicating means is provided and the periphery of a portion of the portable terminal in which the second indicating means is provided with his/her respective hands at the time of character entry, the user can hold the portable terminal stably with both hands. Moreover, since the user can operate the first indicating means and the second indicating means by using thumbs, index fingers, and so forth of his/her respective hands in a state in which the user holds the portable terminal with both hands in this manner, the user can perform entry operation accurately and quickly. Therefore, the present invention can be applied to portable terminals having a character entry function, such as a mobile telephone, a smartphone, a personal digital assistant, and a tablet terminal.

REFERENCE SIGNS LIST 10 display means
20, 20a, 20b, 200 first indicating button
21, 211 to 214 movement direction indicating section
22, 220 selection indicating section
30, 30a, 30b, 300 second indicating button
31, 311 to 314 movement direction indicating section
32, 320 selection indicating section
40 storing means
50 communication means
60 control means
61 display control means
62 switching control means
63 cursor movement control means
64 entry control means
70 touch panel
100 character entry screen
100a e-mail sending and creation screen
101 first cursor
102 second cursor
110 keyboard screen
111 character entry mode switching key
112 Home key
113 keyboard switching key
115 character conversion candidate displaying section
120 entered character display screen
120a message creation display screen
121 address entry field
122 address entry completion button
123 title entry field
124 title entry completion button
125 message body entry field
126 send button

The invention claimed is:
1. A portable terminal having a character entry function of displaying a character entry screen with a keyboard screen including a plurality of character key images on a display of a display device and performing an entry of a character by using the character key images of the keyboard screen, the portable terminal comprising:
 a first physical button provided separately from the display of the display device in a predetermined place of the portable terminal, the first physical button for indicating a direction of movement of a first cursor that is displayed on the character entry screen and giving an instruction to select a character key image currently indicated by the first cursor on the keyboard screen;
 a second physical button provided separately from the display of the display device in a predetermined place of the portable terminal, the second physical button for indicating a direction of movement of a second cursor that is displayed on the character entry screen and giving an instruction to select a character key image currently indicated by the second cursor on the keyboard screen;

a button-operated cursor movement controller for controlling display of the first cursor and the second cursor operated by the first physical button and the second physical button, respectively, so that the first cursor and the second cursor can respectively move not only in a range of the keyboard screen but also over an entire surface of the character entry screen freely, controlling movement of the first cursor on the character entry screen based on a signal concerning the direction of movement of the first cursor, the signal which is output from the first physical button when the direction of movement of the first cursor is indicated by using the first physical button, and controlling movement of the second cursor on the character entry screen based on a signal concerning the direction of movement of the second cursor, the signal which is output from the second physical button when the direction of movement of the second cursor is indicated by using the second physical button; and a button-operated entry controller for controlling an entry of a character related to a character key image based on a signal from the first physical button concerning selection of the character key image, the signal which is output from the first physical button when the character key image currently indicated by the first cursor is selected by using the first physical button, and controlling an entry of a character related to a character key image based on a signal from the second physical button concerning selection of the character key image, the signal which is output from the second physical button when the character key image currently indicated by the second cursor is selected by using the second physical button, wherein each of the first and second physical buttons includes a first physical button portion for indicating a direction of movement of the corresponding cursor that is displayed on the character entry screen and a second physical button portion for giving an instruction to select a character key image currently indicated by the corresponding cursor on the keyboard screen, or is configured to indicate a direction of movement of the corresponding cursor and a selection of a character key image currently indicated by the corresponding cursor on the keyboard screen in accordance with a user's touch operation of the corresponding physical button, the first physical button portion surrounds the second physical button portion from radially outward of the second physical button portion, selectively enablable free movement setting that allows each of the first and second cursors to move freely on the keyboard screen and selectively enablable key image unit movement setting that allows each of the first and second cursors to move on the keyboard screen in a key image unit by using each key image as one movement range are provided to control the respective movements of the first cursor and the second cursor on the keyboard screen of the character entry screen displayed on the display of the display device, when the free movement setting is currently enabled, the cursor movement controller freely moves each of the first and second cursors on the keyboard screen over a plurality of key images per operation of the first and second buttons, respectively, and when the key image unit movement setting is currently enabled, the cursor movement controller moves each of the first and second cursors on the keyboard screen in a single key image unit by using each key image as one movement range per operation of the first and second buttons, respectively.

2. The portable terminal according to claim 1, wherein the first cursor and the second cursor differ from each other in at least one of elements: a shape, a color, a line drawn on an inside, and a pattern.

3. The portable terminal according to claim 1, wherein the display of the display device is a touch panel, and when a user directly touches a character key image on the keyboard screen with a finger, the entry controller controls an entry of a character for the touched character key image.

4. The portable terminal according to claim 1, wherein when a screen other than the character entry screen is displayed on the display of the display device, the first button and the second button are used respectively as an indicating device for giving an instruction to display a predetermined menu screen and an indicating device for giving an instruction to return to the most recently displayed screen.

5. The portable terminal according to claim 1, comprising: the first button for a vertically-oriented state and the second button for a vertically-oriented state which are used when an entry of a character is performed with the display of the display device being brought to a vertically-oriented state, and the first button for a horizontally-oriented state and the second button for a horizontally-oriented state which are used when an entry of a character is performed with the display of the display device being brought to a horizontally-oriented state.

6. The portable terminal according to claim 1, wherein the keyboard screen includes a plurality of function key images, the first button is provided to give an instruction to select a function key image currently indicated by the first cursor on the keyboard screen, the second button is provided to give an instruction to select a function key image currently indicated by the second cursor on the keyboard screen, and the entry controller controls processing to implement a function provided to a function key image based on a signal concerning selection of the function key image, the signal which is output from the first button when the function key image currently indicated by the first cursor is selected by using the first button, and controls processing to implement a function provided to a function key image based on a signal concerning selection of the function key image, the signal which is output from the second button when the function key image currently indicated by the second cursor is selected by using the second button.

7. The portable terminal according to claim 6, wherein the display of the display device is a touch panel, and when a user directly touches a function key image on the keyboard screen with a finger, the entry controller controls processing to implement a function provided to the touched function key image.

8. The portable terminal according to claim 1, wherein at least one of the first and second buttons is a touch pad type of device.

9. The portable terminal according to claim 8, wherein the touch pad type of device is either an electrostatic pad or a trackball.

10. The portable terminal according to claim 1, wherein at least one of the first and second buttons has an integrated pressing-type structure.

11. The portable terminal according to claim 1, wherein the first and second buttons are physical buttons manually operable by a user.

12. The portable terminal according to claim 1, wherein a shape of the second physical button is different from a shape of the first physical button, a shape of the first cursor corresponds to the shape of the first physical button, and a shape of the second cursor corresponds to the shape of the second physical button.

13. The portable terminal according to claim 1, wherein when the key image unit movement setting is currently enabled, the first cursor and the second cursor on the keyboard screen have a same circular or rectangular shape whose size is substantially same as that of a character key image and differ from each other in at least one of the following elements: a color, a line drawn on an inside, and a pattern.

14. A portable terminal having a character entry function of displaying a character entry screen with a keyboard screen including a plurality of character key images on a display of a display device and performing an entry of a character by using the character key images of the keyboard screen, the portable terminal comprising:
 a first button provided separately from the display of the display device in a predetermined place of the portable terminal, the first button for indicating a direction of movement of a first cursor that is displayed on the character entry screen and giving an instruction to select a character key image currently indicated by the first cursor on the keyboard screen;
 a second button provided separately from the display of the display device in a predetermined place of the portable terminal, the second button for indicating a direction of movement of a second cursor that is displayed on the character entry screen and giving an instruction to select a character key image currently indicated by the second cursor on the keyboard screen;
 a button-operated cursor movement controller for controlling display of the first cursor and the second cursor operated by the first button and the second button, respectively, so that the first cursor and the second cursor can respectively move on the keyboard screen freely, controlling movement of the first cursor on the character entry screen based on a signal concerning the direction of movement of the first cursor, the signal which is output from the first button when the direction of movement of the first cursor is indicated by using the first button, and controlling movement of the second cursor on the character entry screen based on a signal concerning the direction of movement of the second cursor, the signal which is output from the second button when the direction of movement of the second cursor is indicated by using the second button; and
 a button-operated entry controller for controlling an entry of a character related to a character key image based on a signal from the first button concerning selection of the character key image, the signal which is output from the first button when the character key image currently indicated by the first cursor is selected by using the first button, and controlling an entry of a character related to a character key image based on a signal from the second button concerning selection of the character key image, the signal which is output from the second button when the character key image currently indicated by the second cursor is selected by using the second button,
 wherein each of the first and second buttons includes a first button portion for indicating a direction of movement of the corresponding cursor that is displayed on the character entry screen and a second button portion for giving an instruction to select a character key image currently indicated by the corresponding cursor on the keyboard screen, or is configured to indicate a direction of movement of the corresponding cursor and a selection of a character key image currently indicated by the corresponding cursor on the keyboard screen in accordance with a user's touch operation of the corresponding button,
 selectively enablable free movement setting that allows each of the first and second cursors to move freely on the keyboard screen and selectively enablable key image unit movement setting that allows each of the first and second cursors to move on the keyboard screen in a key image unit by using each key image as one movement range are provided to control the respective movements of the first cursor and the second cursor on the keyboard screen of the character entry screen displayed on the display of the display device,
 when the free movement setting is currently enabled, the cursor movement controller freely moves each of the first and second cursors on the keyboard screen over a plurality of key images per operation of the first and second buttons, respectively, and
 when the key image unit movement setting is currently enabled, the cursor movement controller moves each of the first and second cursors on the keyboard screen in a single key image unit by using each key image as one movement range per operation of the first and second buttons, respectively.

15. The portable terminal according to claim 14, wherein the keyboard screen includes a plurality of function key images, the first button is provided to give an instruction to select a function key image currently indicated by the first cursor on the keyboard screen, the second button is provided to give an instruction to select a function key image currently indicated by the second cursor on the keyboard screen, and the entry controller controls processing to implement a function provided to a function key image based on a signal concerning selection of the function key image, the signal which is output from the first button when the function key image currently indicated by the first cursor is selected by using the first button, and controls processing to implement a function provided to a function key image based on a signal concerning selection of the function key image, the signal which is output from the second button when the function key image currently indicated by the second cursor is selected by using the second button.

16. The portable terminal according to claim 15, wherein the display of the display device is a touch panel, and when a user directly touches a function key image on the keyboard screen with a finger, the entry control device controls processing to implement a function provided to the touched function key image.

17. The portable terminal according to claim 14, wherein at least one of the first and second buttons is a touch pad type of device.

18. The portable terminal according to claim 17, wherein the touch pad type of device is either an electrostatic pad or a trackball.

19. The portable terminal according to claim 14, wherein at least one of the first and second buttons has an integrated pressing-type structure.

20. The portable terminal according to claim 14, wherein the first and second buttons are physical buttons manually operable by a user.

21. A portable terminal having a character entry function of displaying a character entry screen with a keyboard screen including a plurality of character key images on a display of a display device and performing an entry of a character by using the character key images of the keyboard screen, the portable terminal comprising:
- a first physical button provided separately from the display of the display device in a predetermined place of the portable terminal, the first physical button for indicating a direction of movement of a first cursor that is displayed on the character entry screen and giving an instruction to select a character key image currently indicated by the first cursor on the keyboard screen;
- a second physical button provided separately from the display of the display device in a predetermined place of the portable terminal, the second physical button for indicating a direction of movement of a second cursor that is displayed on the character entry screen and giving an instruction to select a character key image currently indicated by the second cursor on the keyboard screen, wherein a shape of the second physical button is different from a shape of the first physical button;
- a button-operated cursor movement controller for controlling display of the first cursor and the second cursor operated by the first physical button and the second physical button, respectively, so that the first cursor and the second cursor can respectively move not only in a range of the keyboard screen but also over an entire surface of the character entry screen freely, controlling movement of the first cursor on the character entry screen based on a signal concerning the direction of movement of the first cursor, the signal which is output from the first physical button when the direction of movement of the first cursor is indicated by using the first physical button, and controlling movement of the second cursor on the character entry screen based on a signal concerning the direction of movement of the second cursor, the signal which is output from the second physical button when the direction of movement of the second cursor is indicated by using the second physical button; and
- a button-operated entry controller for controlling an entry of a character related to a character key image based on a signal from the first physical button concerning selection of the character key image, the signal which is output from the first physical button when the character key image currently indicated by the first cursor is selected by using the first physical button, and controlling an entry of a character related to a character key image based on a signal from the second physical button concerning selection of the character key image, the signal which is output from the second physical button when the character key image currently indicated by the second cursor is selected by using the second physical button,
wherein each of the first and second physical buttons includes a first physical button portion for indicating a direction of movement of the corresponding cursor that is displayed on the character entry screen and a second physical button portion for giving an instruction to select a character key image currently indicated by the corresponding cursor on the keyboard screen, or is configured to indicate a direction of movement of the corresponding cursor and a selection of a character key image currently indicated by the corresponding cursor on the keyboard screen in accordance with a user's touch operation of the corresponding physical button,
the first physical button portion surrounds the second physical button portion from radially outward of the second physical button portion,
selectively enablable free movement setting that allows each of the first and second cursors to move freely on the keyboard screen and selectively enablable key image unit movement setting that allows each of the first and second cursors to move on the keyboard screen in a key image unit by using each key image as one movement range are provided to control the respective movements of the first cursor and the second cursor on the keyboard screen of the character entry screen displayed on the display of the display device,
when the free movement setting is currently enabled, the cursor movement controller freely moves each of the first and second cursors on the keyboard screen over a plurality of key images per operation of the first and second buttons, respectively, and
when the key image unit movement setting is currently enabled, the cursor movement controller moves the cursors on the keyboard screen in a single key image unit by using each key image as one movement range per operation of the first and second buttons, respectively.

\* \* \* \* \*